US012632509B2

(12) United States Patent
Whatmough et al.

(10) Patent No.: US 12,632,509 B2
(45) Date of Patent: May 19, 2026

(54) NIBBLE BLOCK FORMAT

(71) Applicant: Arm Limited, Cambridge (GB)

(72) Inventors: Paul Nicholas Whatmough, Cambridge, MA (US); Zhi-Gang Liu, Westford, MA (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 1268 days.

(21) Appl. No.: 17/470,470

(22) Filed: Sep. 9, 2021

(65) Prior Publication Data

US 2023/0076138 A1 Mar. 9, 2023

(51) Int. Cl.
| | |
|---|---|
| *G06F 17/16* | (2006.01) |
| *G06F 7/50* | (2006.01) |
| *G06F 7/523* | (2006.01) |
| *G06F 7/544* | (2006.01) |
| *G06F 9/50* | (2006.01) |

(52) U.S. Cl.
CPC ............... *G06F 17/16* (2013.01); *G06F 7/50* (2013.01); *G06F 7/523* (2013.01); *G06F 7/5443* (2013.01); *G06F 9/5027* (2013.01)

(58) Field of Classification Search
CPC ......... G06F 17/16; G06F 7/5443; H03M 7/30
See application file for complete search history.

(56) References Cited

U.S. PATENT DOCUMENTS

| | | | | |
|---|---|---|---|---|
| 5,200,828 A * | 4/1993 | Jang | ..................... | H04N 23/673 |
| | | | | 396/89 |
| 7,599,975 B1 * | 10/2009 | Donovan | ................ | H03M 7/14 |
| | | | | 708/203 |
| 11,977,885 B2 * | 5/2024 | Maiyuran | ............... | G06F 17/16 |
| 2006/0038879 A1 * | 2/2006 | Kremen | ............... | H04N 13/324 |
| | | | | 348/E13.058 |
| 2019/0182484 A1 * | 6/2019 | Kalevo | ................ | H04N 19/176 |
| 2020/0342632 A1 * | 10/2020 | Frumkin | ................ | G06T 9/002 |
| 2021/0150770 A1 | 5/2021 | Appu et al. | | |

OTHER PUBLICATIONS

A.J. Hussain, Ali Al-Fayadh, Naeem Radi, "Image compression techniques: a survey in lossless and lossy algorithms", Mar. 9, 2018, Elsevier B.V., Neurocomputing 300 (2018) 44-69 (Year: 2018).*
Pothos et al., "Deep Learning Inference with Dynamic Graphs on Heterogeneous Platforms", Int J Parallel Prog 49, 158â176. https://doi.org/10.1007/s10766-020-00654-2 (Year: 2020).*

(Continued)

*Primary Examiner* — Andrew Caldwell
*Assistant Examiner* — Kenny K. Bui
(74) *Attorney, Agent, or Firm* — Leveque Intellectual Property Law, P.C.

(57) ABSTRACT

A matrix multiplication system and method are provided. The system includes a memory that stores one or more weight tensors, a processor and a matrix multiply accelerator (MMA). The processor converts each weight tensor into an encoded block set that is stored in the memory. Each encoded block set includes a number of encoded blocks, and each encoded block includes a data field and an index field. The MMA converts each encoded block set into a reconstructed weight tensor, and convolves each reconstructed weight tensor and an input data tensor to generate an output data matrix.

18 Claims, 23 Drawing Sheets

(56) References Cited

OTHER PUBLICATIONS

Bratt, Ian, "Arm's First-Generation Machine Learning Processor", Hot Chips conference, Cupertino, CA, Aug. 19-20, 2018.

Liu et al., "Systolic Tensor Array: an Efficient Structured-Sparse GEMM Accelerator for Mobile CNN Inference", IEEE Computer Architecture Letters, https://arxiv.org/pdf/2005.08098.pdf, Mar. 12, 2020.

Liu et al., "Layerwise Sparse Coding for Pruned Deep Neural Networks with Extreme Compression Ratio," Proceedings of the AAAI Conference on Artificial Intelligence, 34(04), 2020, 4900-4907, https://doi.org/10.1609/aaai.v34i04.5927.

* cited by examiner

16 Basic Block Matrices (8x1)

16 Basic Block Matrices
(8x1)

16 Basic Block Matrices
(8x1)

16 Basic Block Matrices
(8x1)

16 Encoded Blocks
(4B)

NIBBLE BLOCK FORMAT

BACKGROUND

The present disclosure relates to computer systems. More particularly, the present disclosure relates to a matrix multiplication system and method.

Artificial neural networks (ANNs), such as deep neural networks (DNNs), convolutional neural networks (CNNs), etc., are a popular solution to a wide array of challenging classification, recognition and regression problems. However, many ANN models require a large number of matrix calculations involving a large number of weights and activations, which presents a significant challenge with respect to access, storage and performance, particularly for mobile and other power or storage-constrained devices. An ANN hardware accelerator accelerates these matrix calculations, such as, for example, convolution operations performed by CNNs.

Generally, matrices may be classified as either sparse or dense. Most elements of a sparse matrix have a value of zero, while most elements of a dense matrix have a non-zero value. For the simple matrix multiplication operation $C=A \cdot B$, when matrix A or matrix B is sparse, most of the matrix calculations will include a value of zero for at least one of the operands. When both matrix A and matrix B are sparse, an even greater number of matrix calculations will include a value of zero for at least one of the operands. Since multiplication by an operand that has a value of zero will always result in a product that has a value of zero, applying standard matrix multiplication techniques to sparse matrices is very inefficient due to the large number of operands that have a value of zero. Additionally, sparse matrices are allocated memory storage space in excess of their actual requirements due to the large number of elements that have a value of zero.

ANN matrices may be sparse or dense, with values that range from a minimum value to a maximum value, such as, for example, 0 to 255 for a matrix storing 8-bit unsigned integers, −128 to 127 for a matrix storing signed 8-bit integers, etc. Many ANN matrices, such as CNN weight matrices, include a large number of zero values, a number of small magnitude values, and a small number of large magnitude values. In other words, CNN weight matrices often have very sparse data with some small weight values and an occasional, and important, large weight value. Similar to sparse matrices in general, applying standard matrix multiplication techniques to many ANN matrices is very inefficient, and these matrices are allocated memory storage space in excess of their actual requirements.

DETAILED DESCRIPTION

Figure 1A:
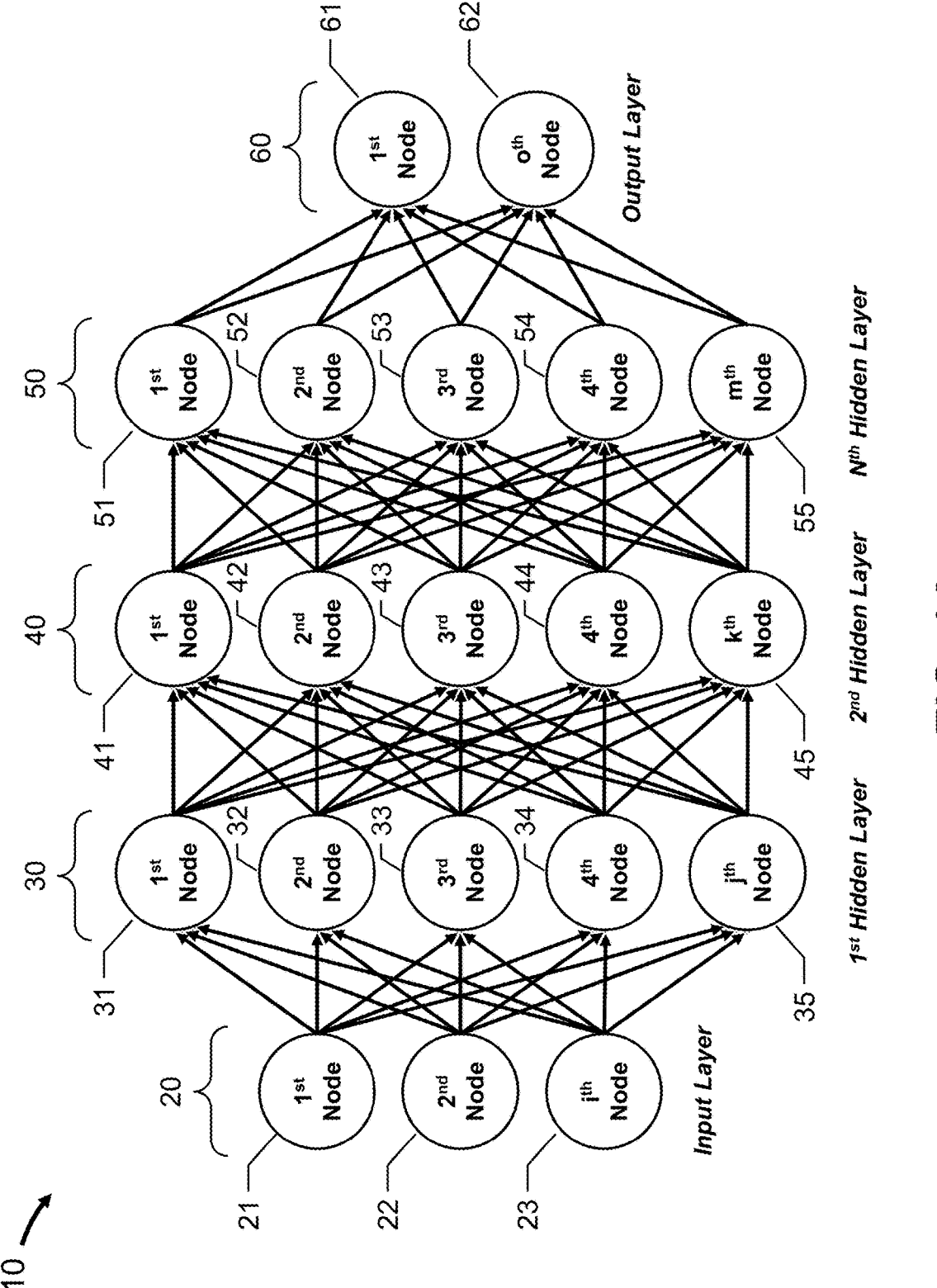
FIG. 1A depicts an ANN, in accordance with an embodiment of the present disclosure.

Embodiments of the present disclosure will now be described with reference to the drawing figures, in which like reference numerals refer to like parts throughout.

Deep neural network inference involves operating on large tensors. Loading and manipulating this data tends to dominate the power consumption of inference tasks, even when running on custom hardware, such as an neural processing unit (NPU), graphics processing unit (GPU), etc. The cost may be advantageously reduced for ANN weight tensors, for example, by quantizing the weights to reduce the number of bits per weight, and pruning the weights to remove small values at or close to zero.

Embodiments of the present disclosure advantageously provide a matrix encoding process that reduces storage requirements and allows for flexibility in both quantization and pruning within a fixed block size format. ANN data, such as ANN weight tensors, tend to have a large number of zeros, a smaller number of non-zeros, and an even smaller number of large magnitude non-zero values. Embodiments of the present disclosure advantageously provide a block-based encoding process for ANN data, such as weight tensors, that is of fixed storage size, but allows trade-off in the tensor elements between zero values, small non-zero values and large non-zero values. Many embodiments of the present disclosure also provide a fixed computation size per block, which is advantageous in many situations.

In one embodiment, a system includes a memory, a processor coupled to the memory and a matrix multiply accelerator (MMA) coupled to the processor and the memory. The memory is configured to store one or more weight tensors, each weight tensor including a number of weights. The processor is configured, for each weight tensor, to generate, based on the weight tensor, a basic block matrix set including a number of basic block matrices, each basic block matrix including a number of weights; to generate, based on the basic block matrix set, an encoded block set, the encoded block set including a number of encoded blocks, each encoded block including a data field and an index field, the data field including a number of encoded weights, the index field including an index associated with each weight in the basic block matrix, the number of encoded weights being less than the number of weights in the basic block matrix, each encoded block having a same size; and to store the encoded block set in the memory. The MMA is configured to convert each encoded block set into a reconstructed weight tensor having a number of weights equal to the number of weights of the respective weight tensor, and convolve each reconstructed weight tensor and an input data tensor to generate an output data matrix.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1A depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1A). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. Typically, native convolution operations are not performed by a CNN due to the complicated dataflow and expensive datapaths that are usually required. Instead, native convolution operations are converted into generic matrix multiplication (GEMM) operations, and then the GEMM operations are executed more efficiently by a central processing unit (CPU), specialized processor, hardware accelerator processing engine, etc., using optimized software libraries or specialized hardware. More particularly, an "IM2COL" software function may be used to convert the filter (weight) matrix and the input feature map (IFM) matrix for each convolution operation into an expanded format that is compatible with a GEMM operation. The IM2COL versions of each filter (weight) matrix and each IFM matrix are generated and stored in memory, and then loaded from memory and processed by the GEMM operation.

A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 1B:
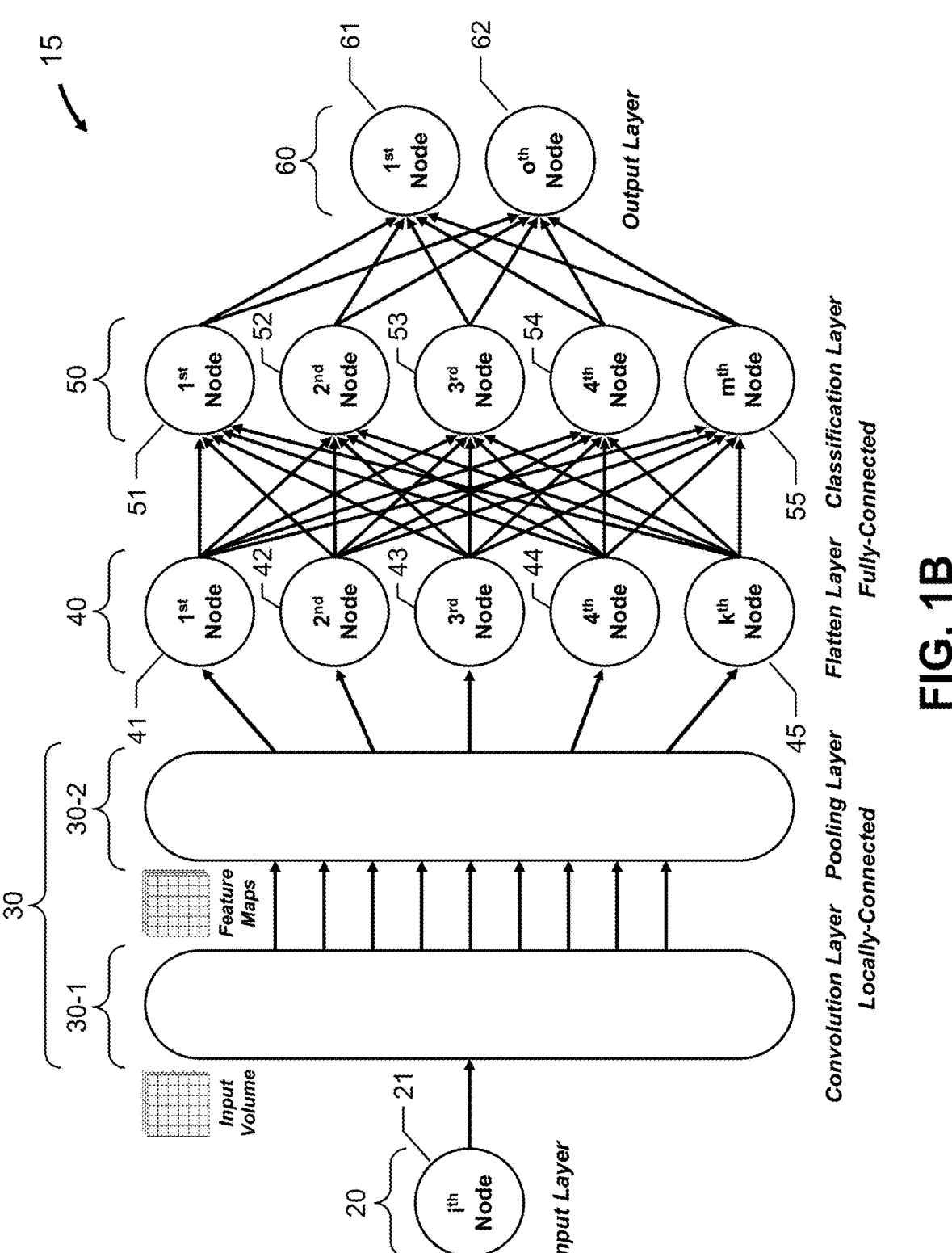
FIG. 1B depicts a CNN, in accordance with an embodiment of the present disclosure.

FIG. 1B depicts CNN 15, in accordance with an embodiment of the present disclosure.

CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 2A:
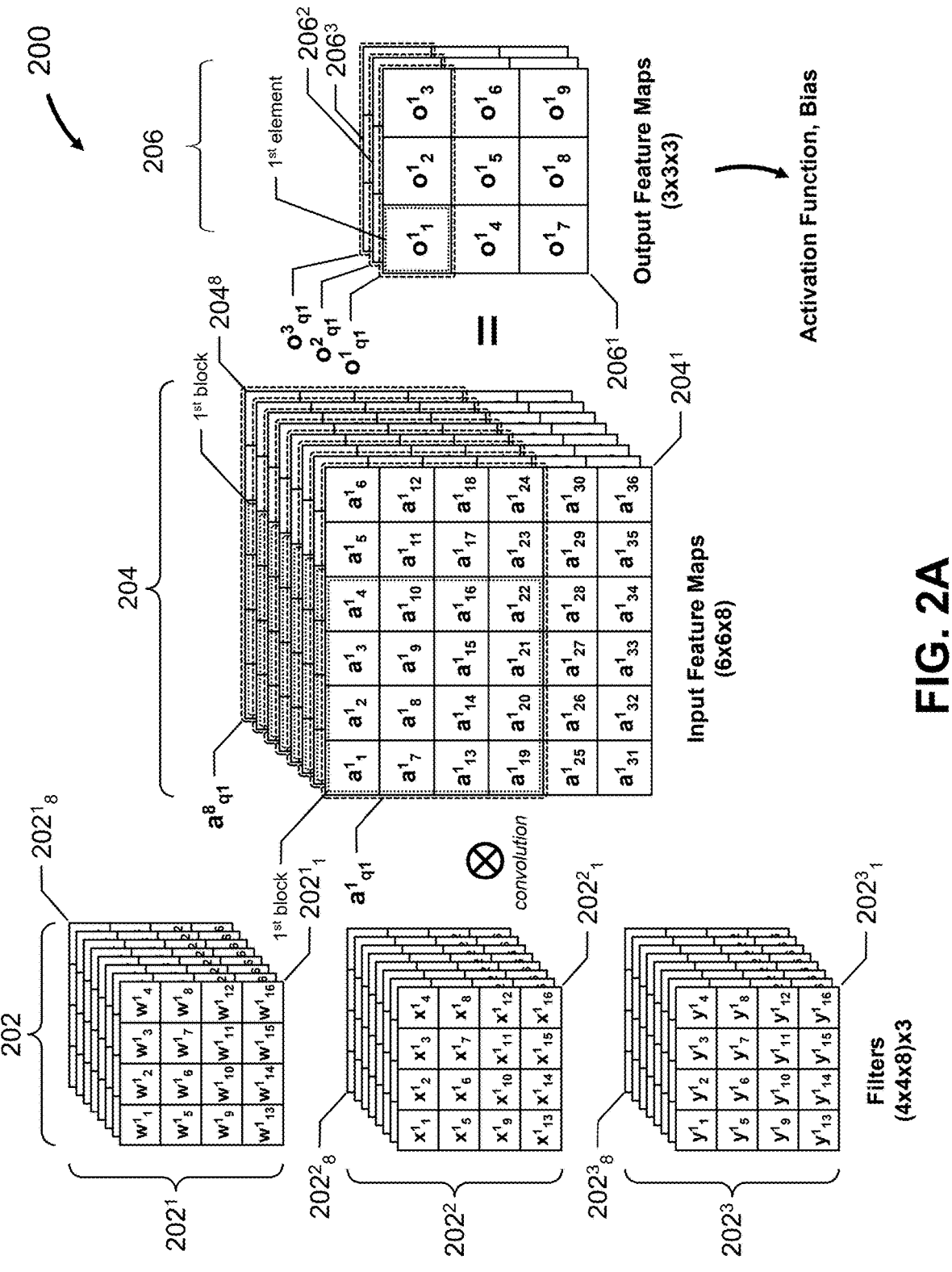
FIG. 2A depicts a convolutional layer calculation for a CNN, in accordance with an embodiment of the present disclosure.

FIG. 2A depicts convolutional layer calculation 200 for a CNN, in accordance with an embodiment of the present disclosure.

Input feature maps form an input data tensor 204 that includes eight input channels and one input data matrix for each channel, i.e., input data matrices $204^1$, $204^2$, $204^3$, $204^4$, $204^5$, $204^6$, $204^7$ and $204^8$. Filter 202 includes three filter or weight tensors $202^1$, $202^2$ and $202^3$, and each filter or weight tensor includes eight weight matrices, one weight matrix for each channel, i.e., weight tensor $202^1$ includes weight matrices $202^1_1$, $202^1_2$, $202^1_3$, $202^1_4$, $202^1_5$, $202^1_6$, $202^1_7$ and $202^1_8$, weight tensor $202^2$ includes weight matrices $202^2_1$, $202^2_2$, $202^2_3$, $202^2_4$, $202^2_5$, $202^2_6$, $202^2_7$ and $202^2_8$, and weight tensor $202^3$ includes weight matrices $202^3_1$, $202^3_2$, $202^3_3$, $202^3_4$, $202^3_5$, $202^3_6$, $202^3_7$ and $202^3_8$. Output feature maps form an output data tensor 206 that includes three output channels and one output data matrix for each filter or weight tensor, i.e., output data matrices $206^1$, $206^2$ and $206^3$. Convolutional layer calculation 200 convolves weight tensors $202^1$, $202^2$ and $202^3$ with input data tensor 204 to produce output data tensor 206.

Each tensor has a height, a width and a depth. The depth of the input data tensor is equal to the number of input channels, the depth of each weight tensor is equal to the number of input channels, and the depth of the output tensor is equal to the number of output channels, i.e., the number of weight tensors in the filter. While the particular dimensions for the tensors and constituent matrices have been selected for clarity of illustration and explanation, embodiments of the present disclosure are not so limited. For example, a convolutional layer calculation may include four input channels and one output channel, a filter with one weight tensor with four weight matrices, an input data tensor with four input data matrices, and an output data tensor with one output data matrix. In this example, the weight tensor is convolved with the input data tensor to generate the output data matrix.

In one embodiment, each input data matrix $204^1$, $204^2$, $204^3$, $204^4$, $204^5$, $204^6$, $204^7$ and $204^8$ is a 6×6 matrix associated with a different input channel and includes 36 activations. For example, input data matrix $204^1$ is associated with the first input channel and includes activations $a^1_1$, $a^1_2$, $a^1_3$, $a^1_4$, $a^1_5$, $a^1_6$, $a^1_7$, $a^1_8$, $a^1_9$, $a^1_{10}$, $a^1_{11}$, $a^1_{12}$, $a^1_{13}$, $a^1_{14}$, $a^1_{15}$, $a^1_{16}$, $a^1_{17}$, $a^1_{18}$, $a^1_{19}$, $a^1_{20}$, $a^1_{21}$, $a^1_{22}$, $a^1_{23}$, $a^1_{24}$, $a^1_{25}$, $a^1_{26}$, $a^1_{27}$, $a^1_{28}$, $a^1_{29}$, $a^1_{30}$, $a^1_{31}$, $a^1_{32}$, $a^1_{33}$, $a^1_{34}$, $a^1_{35}$ and $a^1_{36}$, input data matrix $204^2$ is associated with the second input channel and includes activations $a^2_1$, $a^2_2$, $a^2_3$, $a^2_4$, $a^2_5$, $a^2_6$, $a^2_7$, $a^2_8$, $a^2_9$, $a^2_{10}$, $a^2_{11}$, $a^2_2$, $a^2_{13}$, $a^2_{14}$, $a^2_{15}$, $a^2_{16}$, $a^2_{17}$, $a^2_{18}$, $a^2_{19}$, $a^2_{20}$, $a^2_{21}$, $a^2_{22}$, $a^2_{23}$, $a^2_{24}$, $a^2_{25}$, $a^2_{26}$, $a^2_{27}$, $a^2_{28}$, $a^2_{29}$, $a^2_{30}$, $a^2_{31}$, $a^2_{32}$, $a^2_{33}$, $a^2_{34}$, $a^2_{35}$ and $a^2_{36}$, and so on.

In this embodiment, each weight tensor $202^1$, $202^2$ and $202^3$ includes eight, 4×4 weight matrices, and each weight matrix is associated with a different input channel. Weight tensor $202^1$ includes weight matrices $202^1_1$, $202^1_2$, $202^1_3$, $202^1_4$, $202^1_5$, $202^1_6$, $202^1_7$ and $202^1_8$. The first weight matrix $202^1_1$ is a 4×4 matrix associated with the first channel, and includes weights $w^1_1$, $w^1_2$, $w^1_2$, $w^1_4$, $w^1_5$, $w^1_6$, $w^1_7$, $w^1_8$, $w^1_9$, $w^1_{10}$, $w^1_{11}$, $w^1_{12}$, $w^1_{13}$, $w^1_{14}$, $w^1_{15}$ and $w^1_{16}$, the second weight matrix $202^1_2$ is a 4×4 matrix associated with the second channel, and includes weights $w^2_1$, $w^2_2$, $w^2_3$, $w^2_4$, $w^2_5$, $w^2_6$, $w^2_7$, $w^2_8$, $w^2_9$, $w^2_{10}$, $w^2_{11}$, $w^2_{12}$, $w^2_{13}$, $w^2_{14}$, $w^2_{15}$ and $w^2_{16}$, and so on.

Weight tensor $202^2$ includes weight matrices $202^2_1$, $202^2_2$, $202^2_3$, $202^2_4$, $202^2_5$, $202^2_6$, $202^2_7$ and $202^2_8$. The first weight matrix $202^2_1$ is a 4×4 matrix associated with the first channel, and includes weights $x^1_1$, $x^1_2$, $x^1_3$, $x^1_4$, $x^1_5$, $x^1_6$, $x^1_7$, $x^1_8$, $x^1_9$, $x^1_{10}$, $x^1_{11}$, $x^1_{12}$, $x^1_{13}$, $x^1_{14}$, $x^1_{15}$ and $x^1_{16}$, the second weight matrix $202^1_2$ is a 4×4 matrix associated with the second channel, and includes weights $x^2_1$, $x^2_2$, $x^2_3$, $x^2_4$, $x^2_5$, $x^2_6$, $x^2_7$, $x^2_8$, $x^2_9$, $x^2_{10}$, $x^2_{11}$, $x^2_{12}$, $x^2_{13}$, $x^2_{14}$, $x^2_{15}$ and $x^2_{16}$, and so on.

Weight tensor $202^3$ includes weight matrices $202^3_1$, $202^3_2$, $202^3_3$, $202^3_4$, $202^3_5$, $202^3_6$, $202^3_7$ and $202^3_8$. The first weight matrix $202^3_1$ is a 4×4 matrix associated with the first channel, and includes weights $y^1_1$, $y^1_2$, $y^1_3$, $y^1_4$, $y^1_5$, $y^1_6$, $y^1_7$, $y^1_8$, $y^1_9$, $y^1_{10}$, $y^1_{11}$, $y^1_{12}$, $y^1_{13}$, $y^1_{14}$, $y^1_{15}$ and $y^1_{16}$, the second weight matrix $202^1_2$ is a 4×4 matrix associated with the second channel, and includes weights $y^2_1$, $y^2_2$, $y^2_3$, $y^2_4$, $y^2_5$, $y^2_6$, $y^2_7$, $y^2_8$, $y^2_9$, $y^2_{10}$, $y^2_{11}$, $y^2_{12}$, $y^2_{13}$, $y^2_{14}$, $y^2_{15}$ and $y^2_{16}$, and so on.

In this embodiment, each output data matrix $206^1$, $206^2$ and $206^3$ is a 3×3 matrix associated with a different output channel and includes 9 output elements. For example, output data matrix $206^1$ is associated with the first output channel and includes outputs $o^1_1$, $o^1_2$, $o^1_3$, $o^1_4$, $o^1_5$, $o^1_6$, $o^1_7$, $o^1_8$ and $o^1_9$, output data matrix $206^2$ is associated with the second output channel and includes outputs $o^2_1$, $o^2_2$, $o^2_3$, $o^2_4$, $o^2_5$, $o^2_6$, $o^2_7$, $o^2_8$ and $o^2_9$, and output data matrix $206^3$ is associated with the third output channel and includes outputs $o^3_1$, $o^3_2$, $o^3_3$, $o^3_4$, $o^3_5$, $o^3_6$, $o^3_7$, $o^3_8$ and $o^3_9$.

For ease of explanation, each input data matrix input data matrix $204^1$, $204^2$, $204^3$, $204^4$, $204^5$, $204^6$, $204^7$ and $204^8$ may be divided into three quadrants. The first quadrant spans the top (first) row, second row third row and fourth row, the second quadrant spans the second row, third row, fourth row and fifth row, and the third quadrant spans the third row, fourth row, fifth row and sixth (bottom) row. The first quadrant for input data matrix $204^1$ ($a^1_{q1}$) and the first quadrant for input data matrix $204^8$ ($a^8_{q1}$) are labeled; the remaining quadrants for each input data matrix are not labeled for clarity. The elements of each quadrant for input data matrix $204^1$ are described as follows, and the quadrants of input data matrices $204^2$, $204^3$, $204^4$, $204^5$, $204^6$, $204^7$ and $204^8$ are similarly arranged.

First quadrant $a^1_{q1}$ includes activations $a^1_1$, $a^1_2$, $a^1_3$, $a^1_4$, $a^1_5$, $a^1_6$, $a^1_7$, $a^1_8$, $a^1_9$, $a^1_{10}$, $a^1_{11}$, $a^1_{12}$, $a^1_{13}$, $a^1_{14}$, $a^1_{15}$, $a^1_{16}$, $a^1_{17}$, $a^1_{18}$, $a^1_{19}$, $a^1_{20}$, $a^1_{21}$, $a^1_{22}$, $a^1_{23}$ and $a^1_{24}$, from which three blocks of activations are formed, i.e., a first block (i.e., activations $a^1_1$, $a^1_2$, $a^1_3$, $a^1_4$, $a^1_7$, $a^1_8$, $a^1_9$, $a^1_{10}$, $a^1_{13}$, $a^1_{14}$, $a^1_{15}$, $a^1_{16}$, $a^1_{19}$, $a^1_{20}$, $a^1_{21}$ and $a^1_{22}$), a second block (i.e., activations $a^1_2$, $a^1_3$, $a^1_4$, $a^1_5$, $a^1_8$, $a^1_9$, $a^1_{10}$, $a^1_{11}$, $a^1_{14}$, $a^1_1$, $a^1_{16}$, $a^1_{17}$, $a^1_{20}$, $a^1_{21}$, $a^1_{22}$ and $a^1_{23}$), and a third block (i.e., activations $a^1_3$, $a^1_4$, $a^1_5$, $a^1_6$, $a^1_9$, $a^1_{10}$, $a^1_{11}$, $a^1_{12}$, $a^1_{15}$, $a^1_{16}$, $a^1_{17}$, $a^1_{18}$, $a^1_{21}$, $a^1_{22}$, $a^1_{23}$ and $a^1_{24}$).

Second quadrant $a^1_{q2}$ includes activations $a^1_7$, $a^1_8$, $a^1_9$, $a^1_{10}$, $a^1_{11}$, $a^1_{12}$, $a^1_{13}$, $a^1_{14}$, $a^1_{15}$, $a^1_{16}$, $a^1_{17}$, $a^1_{18}$, $a^1_{19}$, $a^1_{20}$, $a^1_{21}$, $a^1_{22}$, $a^1_{23}$, $a^1_{24}$, $a^1_{25}$, $a^1_{26}$, $a^1_{27}$, $a^1_{28}$, $a^1_{29}$ and $a^1_{30}$, from which three blocks of activations are formed, i.e., a first block (i.e., activations $a^1_7$, $a^1_8$, $a^1_9$, $a^1_{10}$, $a^1_{13}$, $a^1_{14}$, $a^1_{15}$, $a^1_{16}$, $a^1_{19}$, $a^1_{20}$, $a^1_{21}$, $a^1_{22}$, $a^1_{25}$, $a^1_{26}$, $a^1_{27}$ and $a^1_{28}$), a second block (i.e., activations $a^1_8$, $a^1_9$, $a^1_{10}$, $a^1_{11}$, $a^1_{14}$, $a^1_{15}$, $a^1_{16}$, $a^1_{17}$, $a^1_{20}$, $a^1_{21}$, $a^1_{22}$, $a^1_{23}$, $a^1_{26}$, $a^1_{27}$, $a^1_{28}$ and $a^1_{29}$), and a third block (i.e., activations $a^1_9$, $a^1_{10}$, $a^1_{11}$, $a^1_{12}$, $a^1_{15}$, $a^1_{16}$, $a^1_{17}$, $a^1_{18}$, $a^1_{21}$, $a^1_{22}$, $a^1_{23}$, $a^1_{24}$, $a^1_{27}$, $a^1_{28}$, $a^1_{29}$ and $a^1_{30}$).

Third quadrant $a^1_{q3}$ includes activations $a^1_{13}$, $a^1_{14}$, $a^1_{15}$, $a^1_{16}$, $a^1_{17}$, $a^1_{18}$, $a^1_{19}$, $a^1_{20}$, $a^1_{21}$, $a^1_{22}$, $a^1_{23}$, $a^1_{24}$, $a^1_{25}$, $a^1_{26}$, $a^1_{27}$, $a^1_{28}$, $a^1_{29}$, $a^1_{30}$, $a^1_{31}$, $a^1_{32}$, $a^1_{33}$, $a^1_{34}$, $a^1_{35}$ and $a^1_{36}$, from which three blocks of activations are formed, i.e., a first block (i.e., activations $a^1_{13}$, $a^1_{14}$, $a^1_{15}$, $a^1_{16}$, $a^1_{19}$, $a^1_{20}$, $a^1_{21}$, $a^1_{22}$, $a^1_{25}$, $a^1_{26}$, $a^1_{27}$, $a^1_{28}$, $a^1_{31}$, $a^1_{32}$, $a^1_{33}$ and $a^1_{34}$), a second block (i.e., activations $a^1_{14}$, $a^1_{15}$, $a^1_{16}$, $a^1_{17}$, $a^1_{20}$, $a^1_{21}$, $a^1_{22}$, $a^1_{23}$, $a^1_{26}$, $a^1_{27}$, $a^1_{28}$, $a^1_{29}$, $a^1_{32}$, $a^1_{33}$, $a^1_{34}$ and $a^1_{35}$), and a third block (i.e., activations $a^1_{15}$, $a^1_{16}$, $a^1_{17}$, $a^1_{18}$, $a^1_{21}$, $a^1_{22}$, $a^1_{23}$, $a^1_{24}$, $a^1_{27}$, $a^1_{28}$, $a^1_{29}$, $a^1_{30}$, $a^1_{33}$, $a^1_{34}$, $a^1_{35}$ and $a^1_{36}$).

Output data tensor 206 may also be divided into three quadrants; in this case, each quadrant spans all three output data matrices $206^1$, $206^2$ and $206^3$. The first quadrant spans the top (first) row of each output data matrix, the second quadrant spans the second row of each output data matrix, and the third quadrant spans the fourth (bottom) row of each output data matrix. The first quadrant for output data matrices $206^1$, $206^2$ and $206^3$ (i.e., $o^1_{q1}$, $o^2_{q1}$ and $o^3_{q1}$) is labeled; the remaining quadrants are not labeled for clarity.

For output data matrix $206^1$, the first quadrant $o^1_{q1}$ includes $o^1_1$, $o^1_2$, $o^1_3$, the second quadrant $o^1_{q2}$ includes $o^1_4$, $o^1_5$ and $o^1_6$, and the third quadrant $o^1_{q3}$ includes $o^1_7$, $o^1_8$ and $o^1_9$. For output data matrix $206^2$, the first quadrant $o^2_{q1}$ includes $o^2_1$, $o^2_2$, $o^2_3$, the second quadrant $o^2_{q2}$ includes $o^2_4$, $o^2_5$ and $o^2_6$, and the third quadrant $o^2_{q3}$ includes $o^2_7$, $o^2_8$ and $o^2_9$. For output data matrix $206^3$, the first quadrant $o^3_{q1}$ includes $o^3_1$, $o^3_2$, $o^3_3$, the second quadrant $o^3_{q2}$ includes $o^3_4$, $o^3_5$ and $o^3_6$, and the third quadrant $o^3_{q3}$ includes $o^3_7$, $o^3_8$ and $o^3_9$.

Generally, each output element within output data matrices $206^1$, $206^2$ and $206^3$ is the sum of the dot products of one of the weight tensors $202^1$, $202^2$ and $202^3$ and a block of activation elements within a particular quadrant of input data matrices $204^1$, $204^2$, $204^3$, $204^4$, $204^5$, $204^6$, $204^7$ and $204^8$.

The calculation of the output elements in first quadrants $o^1_{q1}$, $o^2_{q1}$ and $o^3_{q1}$ follows.

Output element $o^1_1$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the first block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively. Generally, each weight matrix $202^1_1$ includes weights $w^i_1$, $w^i_2$, $w^i_3$, $w^i_4$, $w^i_5$, $w^i_6$, $w^i_7$, $w^i_8$, $w^i_9$, $w^i_{10}$, $w^i_{11}$, $w^i_{12}$, $w^i_{13}$, $w^i_{14}$, $w^i_{15}$ and $w^i_{16}$, and the first block of activation elements within the first quadrant $a^i_{q1}$ of each input data matrix 204 includes $a^i_1$, $a^i_2$, $a^i_3$, $a^i_4$, $a^i_7$, $a^i_8$, $a^i_9$, $a^i_{10}$, $a^i_{13}$, $a^i_{14}$, $a^i_{15}$, $a^i_{16}$, $a^i_{19}$, $a^i_{20}$, $a^i_{21}$ and $a^i_{22}$.

For example, weight matrix $202^1_1$ includes weights $w^1_1$, $w^1_2$, $w^1_3$, $w^1_4$, $w^1_5$, $w^1_6$, $w^1_7$, $w^1_8$, $w^1_9$, $w^1_{10}$, $w^1_{11}$, $w^1_{12}$, $w^1_{13}$, $w^1_{14}$, $w^1_{15}$ and $w^1_{16}$, weight matrix $202^2_1$ includes weights $w^2_1$, $w^2_2$, $w^2_3$, $w^2_4$, $w^2_5$, $w^2_6$, $w^2_7$, $w^2_8$, $w^2_9$, $w^2_{10}$, $w^2_{11}$, $w^2_{12}$, $w^2_{13}$, $w^2_{14}$, $w^2_{15}$ and $w^2_{16}$, and so on, while the first block of activation elements within the first quadrant $a^1_{q1}$ of input data matrix $204^1$ includes $a^1_1$, $a^1_2$, $a^1_3$, $a^1_4$, $a^1_7$, $a^1_8$, $a^1_9$, $a^1_{10}$, $a^1_{13}$, $a^1_{14}$, $a^1_{15}$, $a^1_{16}$, $a^1_{19}$, $a^1_{20}$, $a^1_{21}$ and $a^1_{22}$, the first block of activation elements within the first quadrant $a^2_{q1}$ of input data matrix $204^2$ includes $a^2_1$, $a^2_2$, $a^2_3$, $a^2_4$, $a^2_7$, $a^2_8$, $a^2_9$, $a^2_{10}$, $a^2_{13}$, $a^2_{14}$, $a^2_{15}$, $a^2_{16}$, $a^2_{19}$, $a^2_{20}$, $a^2_{21}$ and $a^2_{22}$, and so on.

More particularly, the following dot products are summed to generate output element $o^1_1$: the dot product of the first weight matrix $202^1_1$ of weight tensor $202^1$ and the first block of quadrant $a^1_{q1}$ of input data matrix $204^1$ (i.e., $w^1_1 \cdot a^1_1 + w^1_2 \cdot a^1_2 + w^1_3 \cdot a^1_3 + w^1_4 \cdot a^1_4 + w^1_5 \cdot a^1_7 + w^1_6 \cdot a^1_8 + w^1_7 \cdot a^1_9 + w^1_8 \cdot a^1_{10} + w^1_9 \cdot a^1_{13} + w^1_{10} \cdot a^1_{14} + w^1_{11} \cdot a^1_{15} + w^1_{12} \cdot a^1_{16} + w^1_{13} \cdot a^1_{19} + w^1_{14} \cdot a^1_{20} + w^1_{15} \cdot a^1_{21} + w^1_{16} \cdot a^1_{22}$), the dot product of the second weight matrix $202^1_2$ of weight tensor $202^1$ and the first block of quadrant $a^2_{q1}$ of input data matrix $204^2$ (i.e., $w^2_1 \cdot a^2_1 + w^2_2 \cdot a^2_2 + w^2_3 \cdot a^2_3 + w^2_4 \cdot a^2_4 + w^2_5 \cdot a^2_7 + w^2_6 \cdot a^2_8 + w^2_7 \cdot a^2_9 + w^2_8 \cdot a^2_{10} + w^2_9 \cdot a^2_{13} + w^2_{10} \cdot a^2_{14} + w^2_{11} \cdot a^2_{15} + w^2_{12} \cdot a^2_{16} + w^2_{13} \cdot a^2_{19} + w^2_{14} \cdot a^2_{20} + w^2_{15} \cdot a^2_{21} + w^2_{16} \cdot a^2_{22}$), the dot product of the third weight matrix $202^1_3$ of weight tensor $202^1$ and the first block of quadrant $a^3_{q1}$ of input data matrix $204^3$ (i.e., $w^3_1 \cdot a^3_1 + w^3_2 \cdot a^3_2 + w^3_3 \cdot a^3_3 + w^3_4 \cdot a^3_4 + w^3_5 \cdot a^3_7 + w^3_6 \cdot a^3_8 + w^3_7 \cdot a^3_9 + w^3_8 \cdot a^3_{10} + w^3_9 \cdot a^3_{13} + w^3_{10} \cdot a^3_{14} + w^3_{11} \cdot a^3_{15} + w^3_{12} \cdot a^3_{16} + w^3_{13} \cdot a^3_{19} + w^3_{14} \cdot a^3_{20} + w^3_{15} \cdot a^3_{21} + w^3_{16} \cdot a^3_{22}$), the dot product of the fourth weight matrix $202^1_4$ of weight tensor $202^1$ and the first block of quadrant $a^4_{q1}$ of input data matrix $204^4$ (i.e., $w^4_1 \cdot a^4_1 + w^4_2 \cdot a^4_2 + w^4_3 \cdot a^4_3 + w^4_4 \cdot a^4_4 + w^4_5 \cdot a^4_7 + w^4_6 \cdot a^4_8 + w^4_7 \cdot a^4_9 + w^4_8 \cdot a^4_{10} + w^4_9 \cdot a^4_{13} + w^4_{10} \cdot a^4_{14} + w^4_{11} \cdot a^4_{15} + w^4_{12} \cdot a^4_{16} + w^4_{13} \cdot a^4_{19} + w^4_{14} \cdot a^4_{20} + w^4_{15} \cdot a^4_{21} + w^4_{16} \cdot a^4_{22}$), the dot product of the fifth weight matrix $202^1_5$ of weight tensor $202^1$ and the first block of quadrant $a^5_{q1}$ of input data matrix $204^5$ (i.e., $w^5_1 \cdot a^5_1 + w^5_2 \cdot a^5_2 + w^5_3 \cdot a^5_3 + w^5_4 \cdot a^5_4 + w^5_5 \cdot a^5_7 + w^5_6 \cdot a^5_8 + w^5_7 \cdot a^5_9 + w^5_8 \cdot a^5_{10} + w^5_9 \cdot a^5_{13} + w^5_{10} \cdot a^5_{14} + w^5_{11} \cdot a^5_{15} + w^5_{12} \cdot a^5_{16} + w^5_{13} \cdot a^5_{19} + w^5_{14} \cdot a^5_{20} + w^5_{15} \cdot a^5_{21} + w^5_{16} \cdot a^5_{22}$), the dot product of the sixth weight matrix $202^1_6$ of weight tensor $202^1$ and the first block of quadrant $a^6_{q1}$ of input data matrix $204^6$ (i.e., $w^6_1 \cdot a^6_1 + w^6_2 \cdot a^6_2 + w^6_3 \cdot a^6_3 + w^6_4 \cdot a^6_4 + w^6_5 \cdot a^6_7 + w^6_6 \cdot a^6_8 + w^6_7 \cdot a^6_9 + w^6_8 \cdot a^6_{10} + w^6_9 \cdot a^6_{13} + w^6_{10} \cdot a^6_{14} + w^6_{11} \cdot a^6_{15} + w^6_{12} \cdot a^6_{16} + w^6_{13} \cdot a^6_{19} + w^6_{14} \cdot a^6_{20} + w^6_{15} \cdot a^6_{21} + w^6_{16} \cdot a^6_{22}$), the dot product of the seventh weight matrix $202^1_7$ of weight tensor $202^1$ and the first block of quadrant $a^7_{q1}$ of input data matrix $204^7$ (i.e., $w^7_1 \cdot a^7_1 + w^7_2 \cdot a^7_2 + w^7_3 \cdot a^7_3 + w^7_4 \cdot a^7_4 + w^7_5 \cdot a^7_7 + w^7_6 \cdot a^7_8 + w^7_7 \cdot a^7_9 + w^7_8 \cdot a^7_{10} + w^7_9 \cdot a^7_{13} + w^7_{10} \cdot a^7_{14} + w^7_{11} \cdot a^7_{15} + w^7_{12} \cdot a^7_{16} + w^7_{13} \cdot a^7_{19} + w^7_{14} \cdot a^7_{20} + w^7_{15} \cdot a^7_{21} + w^7_{16} \cdot a^7_{22}$), and the dot product of the eighth weight matrix $202^1_8$ of weight tensor $202^1$ and the first block of quadrant $a^8_{q1}$ of input data matrix $204^8$ (i.e., $w^8_1 \cdot a^8_1 + w^8_2 \cdot a^8_2 + w^8_3 \cdot a^8_3 + w^8_4 \cdot a^8_4 + w^8_5 \cdot a^8_7 + w^8_6 \cdot a^8_8 + w^8_7 \cdot a^8_9 + w^8_8 \cdot a^8_{10} + w^8_9 \cdot a^8_{13} + w^8_{10} \cdot a^8_{14} + w^8_{11} \cdot a^8_{15} + w^8_{12} \cdot a^8_{16} + w^8_{13} \cdot a^8_{19} + w^8_{14} \cdot a^8_{20} + w^8_{15} \cdot a^8_{21} + w^8_{16} \cdot a^8_{22}$).

Similarly, output element $o^2_1$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the first block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively.

And, output element $o^3_1$ of output data matrix $206^3$ is the sum of the dot products of weight tensor $202^3$, i.e., weight matrices $202^3_1$, $202^3_2$, $202^3_3$, $202^3_4$, $202^3_5$, $202^3_6$, $202^3_7$ and $202^3_8$, and the first block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively.

Output element $o^1_2$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the second block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively. Generally, the second block of activation elements within the first quadrant $a^i_{q1}$ of each input data matrix $204^i$ includes $a^i_2$, $a^i_3$, $a^i_4$, $a^i_5$, $a^i_8$, $a^i_9$, $a^i_{10}$, $a^i_{11}$, $a^i_{14}$, $a^i_{15}$, $a^i_{16}$, $a^i_{17}$, $a^i_{20}$, $a^i_{21}$, $a^i_{22}$ and $a^i_{23}$. For example, the second block of activation elements within the first quadrant $a^1_{q1}$ of input data matrix $204^1$ includes $a^1_2$, $a^1_3$, $a^1_4$, $a^1_5$, $a^1_8$, $a^1_9$, $a^1_{10}$, $a^1_{11}$, $a^1_{14}$, $a^1_{15}$, $a^1_{16}$, $a^1_{17}$, $a^1_{20}$, $a^1_{21}$, $a^1_{22}$ and $a^1_{23}$, the second block of activation elements within the first quadrant $a^2_{q1}$ of input data matrix $204^2$ includes $a^2_2$, $a^2_3$, $a^2_4$, $a^2_5$, $a^2_8$, $a^2_9$, $a^2_{10}$, $a^2_{11}$, $a^2_{14}$, $a^2_{15}$, $a^2_{16}$, $a^2_{17}$, $a^2_{20}$, $a^2_{21}$, $a^2_{22}$ and $a^2_{23}$, and so on.

More particularly, the following dot products are summed to generate output element $o^1_2$: the dot product of the first weight matrix $202^1_1$ of weight tensor $202^1$ and the second block of quadrant $a^1_{q1}$ of input data matrix $204^1$ (i.e., $w^1_1 \cdot a^1_2 + w^1_2 \cdot a^1_3 + w^1_3 \cdot a^1_4 + w^1_4 \cdot a^1_5 + w^1_5 \cdot a^1_8 + w^1_6 \cdot a^1_9 + w^1_7 \cdot a^1_{10} + w^1_8 \cdot a^1_{11} + w^1_9 \cdot a^1_{14} + w^1_{10} \cdot a^1_{15} + w^1_{11} \cdot a^1_{16} + w^1_{12} \cdot a^1_{17} + w^1_{13} \cdot a^1_{20} + w^1_{14} \cdot a^1_{21} + w^1_{15} \cdot a^1_{22} + w^1_{16} \cdot a^1_{23}$), the dot product of the second weight matrix $202^1_2$ of weight tensor $202^1$ and the second block of quadrant $a^2_{q1}$ of input data matrix $204^2$ (i.e., $w^2_1 \cdot a^2_2 + w^2_2 \cdot a^2_3 + w^2_3 \cdot a^2_4 + w^2_4 \cdot a^2_5 + w^2_5 \cdot a^2_8 + w^2_6 \cdot a^2_9 + w^2_7 \cdot a^2_{10} + w^2_8 \cdot a^2_{11} + w^2_9 \cdot a^2_{14} + w^2_{10} \cdot a^2_{15} + w^2_{11} \cdot a^2_{16} + w^2_{12} \cdot a^2_{17} + w^2_{13} \cdot a^2_{20} + w^2_{14} \cdot a^2_{21} + w^2_{15} \cdot a^2_{22} + w^2_{16} \cdot a^2_{23}$), the dot product of the third weight matrix $202^1_3$ of weight tensor $202^1$ and the second block of quadrant $a^3_{q1}$ of input data matrix $204^3$ (i.e., $w^3_1 \cdot a^3_2 + w^3_2 \cdot a^3_3 + w^3_3 \cdot a^3_4 + w^3_4 \cdot a^3_5 + w^3_5 \cdot a^3_8 + w^3_6 \cdot a^3_9 + w^3_7 \cdot a^3_{10} + w^3_8 \cdot a^3_{11} + w^3_9 \cdot a^3_{14} + w^3_{10} \cdot a^3_{15} + w^3_{11} \cdot a^3_{16} + w^3_{12} \cdot a^3_{17} + w^3_{13} \cdot a^3_{20} + w^3_{14} \cdot a^3_{21} + w^3_{15} \cdot a^3_{22} + w^3_{16} \cdot a^3_{23}$), the dot product of the fourth weight matrix $202^1_4$ of weight tensor $202^1$ and the second block of quadrant $a^4_{q1}$ of input data matrix $204^4$ (i.e., $w^4_1 \cdot a^4_2 + w^4_2 \cdot a^4_3 + w^4_3 \cdot a^4_4 + w^4_4 \cdot a^4_5 + w^4_5 \cdot a^4_8 + w^4_6 \cdot a^4_9 + w^4_7 \cdot a^4_{10} + w^4_8 \cdot a^4_{11} + w^4_9 \cdot a^4_{14} + w^4_{10} \cdot a^4_{15} + w^4_{11} \cdot a^4_{16} + w^4_{12} \cdot a^4_{17} + w^4_{13} \cdot a^4_{20} + w^4_{14} \cdot a^4_{21} + w^4_{15} \cdot a^4_{22} + w^4_{16} \cdot a^4_{23}$), the dot product of the fifth weight matrix $202^1_5$ of weight tensor $202^1$ and the second block of quadrant $a^5_{q1}$ of input data matrix $204^5$ (i.e., $w^5_1 \cdot a^5_2 + w^5_2 \cdot a^5_3 + w^5_3 \cdot a^5_4 + w^5_4 \cdot a^5_5 + w^5_5 \cdot a^5_8 + w^5_6 \cdot a^5_9 + w^5_7 \cdot a^5_{10} + w^5_8 \cdot a^5_{11} + w^5_9 \cdot a^5_{14} + w^5_{10} \cdot a^5_{15} + w^5_{11} \cdot a^5_{16} + w^5_{12} \cdot a^5_{17} + w^5_{13} \cdot a^5_{20} + w^5_{14} \cdot a^5_{21} + w^5_{15} \cdot a^5_{22} + w^5_{16} \cdot a^5_{23}$), the dot product of the sixth weight matrix $202^1_6$ of weight tensor $202^1$ and the second block of quadrant $a^6_{q1}$ of input data matrix $204^6$ (i.e., $w^6_1 \cdot a^6_2 + w^6_2 \cdot a^6_3 + w^6_3 \cdot a^6_4 + w^6_4 \cdot a^6_5 + w^6_5 \cdot a^6_8 + w^6_6 \cdot a^6_9 + w^6_7 \cdot a^6_{10} + w^6_8 \cdot a^6_{11} + w^6_9 \cdot a^6_{14} + w^6_{10} \cdot a^6_{15} + w^6_1 \cdot a^6_{16} + w^6_{12} \cdot a^6_{17} + w^6_{13} \cdot a^6_{20} + w^6_{14} \cdot a^6_{21} + w^6_{15} \cdot a^6_{22} + w^6_{16} \cdot a^6_{23}$), the dot product of the seventh weight matrix $202^1_7$ of weight tensor $202^1$ and the second block of quadrant $a^7_{q1}$ of input data matrix $204^7$ (i.e., $w^7_1 \cdot a^7_2 + w^7_2 \cdot a^7_3 + w^7_3 \cdot a^7_4 + w^7_4 \cdot a^7_5 + w^7_5 \cdot a^7_8 + w^7_6 \cdot a^7_9 + w^7_7 \cdot a^7_{10} + w^7_8 \cdot a^7_{110} + w^7_9 \cdot a^7_{14} + w^7_{10} \cdot a^7_{15} + w^7_{11} \cdot a^7_{16} + w^7_{12} \cdot a^7_{17} + w^7_{13} \cdot a^7_{20} + w^7_{14} \cdot a^7_{21} + w^7_{15} \cdot a^7_{22} + w^7_{16} \cdot a^7_{23}$), and the dot product of the eighth weight matrix $202^1_8$ of weight tensor $202^1$ and the second block of quadrant $a^8_{q1}$ of input data matrix $204^8$ (i.e., $w^8_1 \cdot a^8_2 + w^8_2 \cdot a^8_3 + w^8_3 \cdot a^8_4 + w^8_4 \cdot a^8_5 + w^8_5 \cdot a^8_8 + w^8_6 \cdot a^8_9 + w^8_7 \cdot a^8_{10} + w^8_8 \cdot a^8_{11} + w^8_9 \cdot a^8_{14} + w^8_{10} \cdot a^8_{15} + w^8_{11} \cdot a^8_{16} + w^8_{12} \cdot a^8_{17} + w^8_{13} \cdot a^8_{20} + w^8_{14} \cdot a^8_{210} + w^8_{15} \cdot a^8_{22} + w^8_{16} \cdot a^8_{23}$).

Similarly, output element $o^2_2$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the second block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively.

And, output element $o^3_2$ of output data matrix $206^3$ is the sum of the dot products of weight tensor $202^3$, i.e., weight matrices $202^3_1$, $202^3_2$, $202^3_3$, $202^3_4$, $202^3_5$, $202^3_6$, $202^3_7$ and $202^3_8$, and the second block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively.

Output element $o^3_1$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the third block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively. Generally, the third block of activation elements within the first quadrant $a^1_{q1}$ of each input data matrix $204^i$ includes $a^i_3$, $a^i_4$, $a^i_5$, $a^i_6$, $a^i_9$, $a^i_{10}$, $a^i_{11}$, $a^i_{12}$, $a^i_{15}$, $a^i_{16}$, $a^i_{17}$, $a^i_{18}$, $a^i_{21}$, $a^i_{22}$, $a^i_{23}$ and $a^i_{24}$. For example, the third block of activation elements within the first quadrant $a^1_{q1}$ of input data matrix $204^1$ includes $a^1_3$, $a^1_4$, $a^1_5$, $a^1_6$, $a^1_9$, $a^1_{10}$, $a^1_{11}$, $a^1_{12}$, $a^1_{15}$, $a^1_{16}$, $a^1_{17}$, $a^1_{18}$, $a^1_{21}$, $a^1_{22}$, $a^1_{23}$ and $a^1_{24}$, the third block of activation elements within the first quadrant $a^2_{q1}$ of input data matrix $204^2$ includes $a^2_3$, $a^2_4$, $a^2_5$, $a^2_6$, $a^2_9$, $a^2_{10}$, $a^2_{11}$, $a^2_{12}$, $a^2_{15}$, $a^2_{16}$, $a^2_{17}$, $a^2_{18}$, $a^2_{21}$, $a^2_{22}$, $a^2_{23}$ and $a^2_{24}$, and so on.

More particularly, the following dot products are summed to generate output element $o^1_3$: the dot product of the first weight matrix $202^1_1$ of weight tensor $202^1$ and the third block of quadrant $a^1_{q1}$ of input data matrix $204^1$ (i.e., $w^1_1 \cdot a^1_3 + w^1_2 \cdot a^1_4 + w^1_3 \cdot a^1_5 + w^1_4 \cdot a^1_6 + w^1_5 \cdot a^1_9 + w^1_6 \cdot a^1_{10} + w^1_7 \cdot a^1_{11} + w^1_8 \cdot a^1_{12} + w^1_9 \cdot a^1_{15} + w^1_{10} \cdot a^1_{16} + w^1_{11} \cdot a^1_{17} + w^1_{12} \cdot a^1_{18} + w^1_{13} \cdot a^1_{21} + w^1_{14} \cdot a^1_{22} + w^1_{15} \cdot a^1_{23} + w^1_{16} \cdot a^1_{24}$), the dot product of the second weight matrix $202^1_2$ of weight tensor $202^1$ and the third block of quadrant $a^2_{q1}$ of input data matrix $204^2$ (i.e., $w^2_1 \cdot a^2_3 + w^2_2 \cdot a^2_4 + w^2_3 \cdot a^2_5 + w^2_4 \cdot a^2_6 + w^2_5 \cdot a^2_9 + w^2_6 \cdot a^2_{10} + w^2_7 \cdot a^2_{11} + w^2_8 \cdot a^2_{12} + w^2_9 \cdot a^2_{15} + w^2_{10} \cdot a^2_{16} + w^2_{11} \cdot a^2_{17} + w^2_{12} \cdot a^2_{18} + w^2_{13} \cdot a^2_{21} + w^2_{14} \cdot a^2_{22} + w^2_{15} \cdot a^2_3 + w^2_{16} \cdot a^2_{24}$), the dot product of the third weight matrix $202^1_3$ of weight tensor $202^1$ and the third block of quadrant $a^3_{q1}$ of input data matrix $204^3$ (i.e., $w^3_1 \cdot a^3_3 + w^3_2 \cdot a^3_4 + w^3_3 \cdot a^3_5 + w^3_4 \cdot a^3_6 + w^3_5 \cdot a^3_9 + w^3_6 \cdot a^3_{10} + w^3_7 \cdot a^3_{11} + w^3_8 \cdot a^3_{12} + w^3_9 \cdot a^3_{15} + w^3_{10} \cdot a^3_{16} + w^3_{11} \cdot a^3_{17} + w^3_{12} \cdot a^3_{18} + w^3_{13} \cdot a^3_{21} + w^3_{14} \cdot a^3_2 + w^3_{15} \cdot a^3_2 + w^3_{16} \cdot a^3_{24}$), the dot product of the fourth weight matrix $202^1_4$ of weight tensor $202^1$ and the third block of quadrant $a^4_{q1}$ of input data matrix $204^4$ (i.e., $w^4_1 \cdot a^4_3 + w^4_2 \cdot a^4_4 + w^4_3 \cdot a^4_5 + w^4_4 \cdot a^4_6 + w^4_5 \cdot a^4_9 + w^4_6 \cdot a^4_{10} + w^4_7 \cdot a^4_{11} + w^4_8 \cdot a^4_{12} + w^4_9 \cdot a^4_{15} + w^4_{10} \cdot a^4_{16} + w^4_{11} \cdot a^4_{17} + w^4_{12} \cdot a^4_{18} + w^4_{13} \cdot a^4_{21} + w^4_{14} \cdot a^4_{22} + w^4_{15} \cdot a^4_{23} + w^4_{16} \cdot a^4_{24}$), the dot product of the fifth weight matrix $202^1_5$ of weight tensor $202^1$ and the third block of quadrant $a^5_{q1}$ of input data matrix $204^5$ (i.e., $w^5_1 \cdot a^5_3 + w^5_2 \cdot a^5_4 + w^5_3 \cdot a^5_5 + w^5_4 \cdot a^5_6 + w^5_5 \cdot a^5_9 + w^5_6 \cdot a^5_{10} + w^5_7 \cdot a^5_{11} + w^5_8 \cdot a^5_{12} + w^5_9 \cdot a^5_{15} + w^5_{10} \cdot a^5_{16} + w^5_{11} \cdot a^5_{17} + w^5_{12} \cdot a^5_{18} + w^5_{13} \cdot a^5_{21} + w^5_{14} \cdot a^5_{22} + w^5_{15} \cdot a^5_{23} + w^5_{16} \cdot a^5_{24}$), the dot product of the sixth weight matrix $202^1_6$ of weight tensor $202^1$ and the third block of quadrant $a^6_{q1}$ of input data matrix $204^6$ (i.e., $w^6_1 \cdot a^6_3 + w^6_2 \cdot a^6_4 + w^6_3 \cdot a^6_5 + w^6_4 \cdot a^6_6 + w^6_5 \cdot a^6_9 + w^6_6 \cdot a^6_{10} + w^6_7 \cdot a^6_{11} + w^6_8 \cdot a^6_{12} + w^6_9 \cdot a^6_{15} + w^6_{10} \cdot a^6_{16} + w^6_{11} \cdot a^6_{17} + w^6_{12} \cdot a^6_{18} + w^6_{13} \cdot a^6_{21} + w^6_{14} \cdot a^6_{22} + w^6_{15} \cdot a^6_{23} + w^6_{16} \cdot a^6_{24}$), the dot product of the seventh weight matrix $202^1_7$ of weight tensor $202^1$ and the third block of quadrant $a^7_{q1}$ of input data matrix $204^7$ (i.e., $w^7_1 \cdot a^7_3 + w^7_2 \cdot a^7_4 + w^7_3 \cdot a^7_5 + w^7_4 \cdot a^7_6 + w^7_5 \cdot a^7_9 + w^7_6 \cdot a^7_{10} + w^7_7 \cdot a^7_{11} + w^7_8 \cdot a^7_{12} + w^7_9 \cdot a^7_{15} + w^7_{10} \cdot a^7_{16} + w^7_{11} \cdot a^7_{17} + w^7_{12} \cdot a^7_{18} + w^7_{13} \cdot a^7_{21} + w^7_{14} \cdot a^7_{22} + w^7_{15} \cdot a^7_{23} + w^7_{16} \cdot a^7_{24}$), and the dot product of the eighth weight matrix $202^1_8$ of weight tensor $202^1$ and the third block of quadrant $a^8_{q1}$ of input data matrix $204^8$ (i.e., $w^8_1 \cdot a^8_3 + w^8_2 \cdot a^8_4 + w^8_3 \cdot a^8_5 + w^8_4 \cdot a^8_6 + w^8_5 \cdot a^8_9 + w^8_6 \cdot a^8_{10} + w^8_7 \cdot a^8_{11} + w^8_8 \cdot a^8_{12} + w^8_9 \cdot a^8_{15} + w^8_{10} \cdot a^8_{16} + w^8_{11} \cdot a^8_{17} + w^8_{12} \cdot a^8_{18} + w^8_{13} \cdot a^8_{21} + w^8_{14} \cdot a^8_{22} + w^8_{15} \cdot a^8_{23} + w^8_{16} \cdot a^8_{24}$).

Similarly, output element $o^2_3$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the third block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively.

And, output element $o^3$ of output data matrix $206^3$ is the sum of the dot products of weight tensor $202^3$, i.e., weight matrices $202^3_1$, $202^3_2$, $202^3$, $202^3_4$, $202^3_5$, $202^3_6$, $202^3_7$ and $202^3_8$, and the third block of activation elements within first quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$ of input data matrices $204^1$, $204^2$, $204^3$, $204^4$, $204^5$, $204^6$, $204^7$ and $204^8$, respectively.

The calculation of the output elements in second quadrants $o^1_{q2}$, $o^2_{q2}$ and $o^3_{q2}$ follows.

Output element $o^1_4$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the first block of activation elements within second quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$ of input data matrices $204^1$, $204^2$, $204^3$, $204^4$, $204^5$, $204^6$, $204^7$ and $204^8$, respectively. Similarly, output element $o^2_4$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the first block of activation elements within second quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$ of input data matrices $204^1$, $204^2$, $204^3$, $204^4$, $204^5$, $204^6$, $204^7$ and $204^8$, respectively. And, output element $o^3_4$ of output data matrix $206^3$ is the sum of the dot products of weight tensor $202^3$, i.e., weight matrices $202^3_1$, $202^3_2$, $202^3$, $202^3_4$, $202^3_5$, $202^3_6$, $202^3_7$ and $202^3_8$, and the first block of activation elements within second quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$ of input data matrices $204^1$, $204^2$, $204^3$, $204^4$, $204^5$, $204^6$, $204^7$ and $204^8$, respectively.

Output element $o^1_5$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the second block of activation elements within second quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$ of input data matrices $204^1$, $204^2$, $204^3$, $204^4$, $204^5$, $204^6$, $204^7$ and $204^8$, respectively. Similarly, output element $o^2_5$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the second block of activation elements within second quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$ of input data matrices $204^1$, $204^2$, $204^3$, $204^4$, $204^5$, $204^6$, $204^7$ and $204^8$, respectively.

And, output element $o^3_5$ of output data matrix $206^3$ is the sum of the dot products of weight tensor $202^3$, i.e., weight matrices $202^3_1$, $202^3_2$, $202^3$, $202^3_4$, $202^3_5$, $202^3_6$, $202^3_7$ and $202^3_8$, and the second block of activation elements within second quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$ of input data matrices $204^1$, $204^2$, $204^3$, $204^4$, $204^5$, $204^6$, $204^7$ and $204^8$, respectively.

Output element $o^1_6$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the third block of activation elements within second quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$ of input data matrices $204^1$, $204^2$, $204^3$, $204^4$, $204^5$, $204^6$, $204^7$ and $204^8$, respectively. Output element $o^2_6$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the third block of activation elements within second quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$ of input data matrices $204^1$, $204^2$, $204^3$, $204^4$, $204^5$, $204^6$, $204^7$ and $204^8$, respectively. Output element $o^3_6$ of output data matrix $206^3$ is the sum of the dot products of weight tensor $202^3$, i.e., weight matrices $202^3$, $202^3_2$, $202^3$, $202^3_4$, $202^3_5$, $202^3_6$, $202^3_7$ and $202^3_8$, and the third block of activation elements within second quadrants $a^1_{q2}$, $a^2_{q2}$, $a^3_{q2}$, $a^4_{q2}$, $a^5_{q2}$, $a^6_{q2}$, $a^1_{q2}$ and $a^8_{q2}$ of input data matrices $204^1$, $204^2$, $204^3$, $204^4$, $204^5$, $204^6$, $204^7$ and $204^8$, respectively.

The calculation of the output elements in third quadrants $o^1_{q3}$, $o^2_{q3}$ and $o^3_{q3}$ follows.

Output element $o^1_7$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the first block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively. Output element $o^2_7$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the first block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively. And, output element $o^3_4$ of output data matrix $206^3$ is the sum of the dot products of weight tensor $202^3$, i.e., weight matrices $202^3_1$, $202^3_2$, $202^3_3$, $202^3_4$, $202^3_5$, $202^3_6$, $202^3_7$ and $202^3_8$, and the first block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively.

Output element $o^1_8$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the second block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively. Similarly, output element $o^2_8$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the second block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively. And, output element $o^3_8$ of output data matrix $206^3$ is the sum of the dot products of weight tensor $202^3$, i.e., weight matrices $202^3_1$, $202^3_2$, $202^3_3$, $202^3_4$, $202^3_5$, $202^3_6$, $202^3_7$ and $202^3_8$, and the second block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively.

Output element $o^1_9$ of output data matrix $206^1$ is the sum of the dot products of weight tensor $202^1$, i.e., weight matrices $202^1_1$, $202^1_2$, $202^1_3$, $202^1_4$, $202^1_5$, $202^1_6$, $202^1_7$ and $202^1_8$, and the third block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively. Output element $o^2_9$ of output data matrix $206^2$ is the sum of the dot products of weight tensor $202^2$, i.e., weight matrices $202^2_1$, $202^2_2$, $202^2_3$, $202^2_4$, $202^2_5$, $202^2_6$, $202^2_7$ and $202^2_8$, and the third block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively. Output element $o^3_9$ of output data matrix $206^3$ is the sum of the dot products of weight tensor $202^3$, i.e., weight matrices $202^3_1$, $202^3_2$, $202^3$, $202^3_4$, $202^3_5$, $202^3_6$, $202^3_7$ and $202^3_8$, and the third block of activation elements within third quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$ of input data matrices $204^1$, $204^2$, $204^3$, $204^4$, $204^5$, $204^6$, $204^7$ and $204^8$, respectively.

Figure 2B:
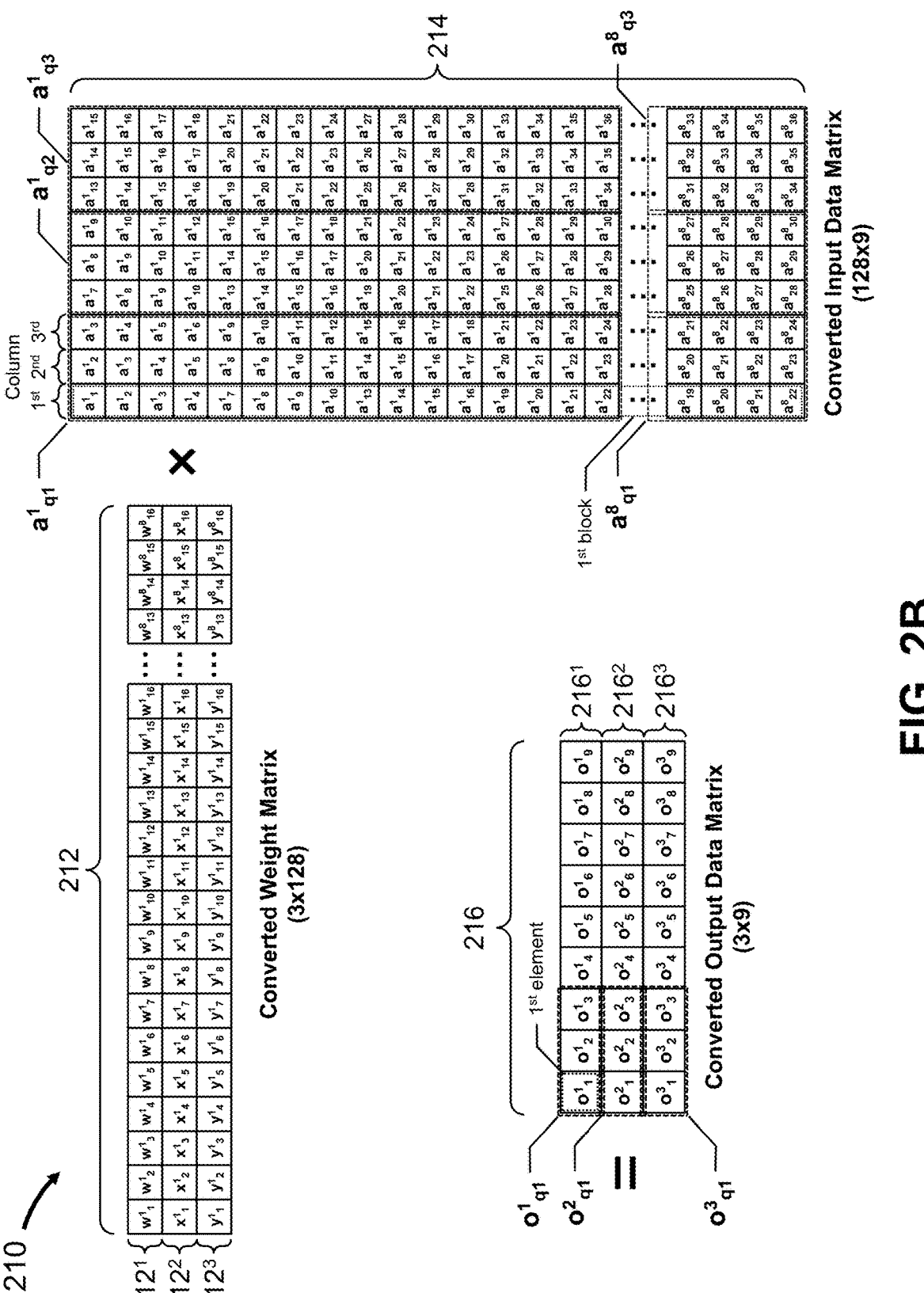
FIG. 2B depicts a converted convolutional layer calculation for a CNN, in accordance with an embodiment of the present disclosure.

FIG. 2B depicts converted convolutional layer calculation $210$ for a CNN, in accordance with an embodiment of the present disclosure.

In one embodiment, the convolutional layer calculations for CNNs executing on central processor units (CPUs), GPUs, NPUs, etc. may be converted into generic matrix multiplication (GEMM) operations, which may leverage GEMM-optimized software libraries. Convolution layer calculation $200$ is converted into a GEMM operation by converting filter $202$ into converted weight matrix $212$, converting input data tensor $204$ into converted input data matrix $214$, and then multiplying converted weight matrix $212$ and converted input data matrix $214$ to generate converted output data matrix $216$. Because simple matrix multiplication is performed rather than a convolution operation, each output element within converted output data matrix $216$ is the dot product of one row of converted weight matrix $212$ and one column of converted input data matrix $214$. Converted output data matrix $216$ is then reformed into output data tensor $206$.

Converted weight matrix $212$ is a $3\times128$ matrix, and includes converted weight tensors $212^1$, $212^2$ and $212^3$. Weight tensor $202^1$ is flattened to form converted weight tensor $212^1$, i.e., the first row, weight tensor $202^2$ is flattened to form converted weight tensor $212^2$, i.e., the second row, and weight tensor $202^3$ is flattened to form converted weight tensor $212^3$, i.e., the third row.

The first row of converted weight matrix $212$ includes weights $w^1_1$, $w^1_2$, $w^1_3$, $w^1_4$, $w^1_5$, $w^1_6$, $w^1_7$, $w^1_8$, $w^1_9$, $w^1_{10}$, $w^1_{11}$, $w^1_{12}$, $w^1_{13}$, $w^1_{14}$, $w^1_{15}$, $w^1_{16}$, $w^2_1$, $w^2_2$, $w^2_3$, $w^2_4$, $w^2_5$, $w^2_6$, $w^2_7$, $w^2_8$, $w^2_9$, $w^2_{10}$, $w^2_{11}$, $w^2_{12}$, $w^2_{13}$, $w^2_{14}$, $w^2_{15}$, $w^2_{16}$, $w^3_1$, $w^3_2$, $w^3_3$, $w^3_4$, $w^3_5$, $w^3_6$, $w^3_7$, $w^3_8$, $w^3_9$, $w^3_{10}$, $w^3_{11}$, $w^3_{12}$, $w^3_{13}$, $w^3_{14}$, $w^3_{15}$, $w^3_{16}$, $w^4_1$, $w^4_2$, $w^4_3$, $w^4_4$, $w^4_5$, $w^4_6$, $w^4_7$, $w^4_8$, $w^4_9$, $w^4_{10}$, $w^4_{11}$, $w^4_{12}$, $w^4_{13}$, $w^4_{14}$, $w^4_{15}$, $w^4_{16}$, $w^5_1$, $w^5_2$, $w^5_3$, $w^5_4$, $w^5_5$, $w^5_6$, $w^5_7$, $w^5_8$, $w^5_9$, $w^5_{10}$, $w^5_{11}$, $w^5_{12}$, $w^5_{13}$, $w^5_{14}$, $w^5_{15}$, $w^5_{16}$, $w^6_1$, $w^6_2$, $w^6_3$, $w^6_4$, $w^6_5$, $w^6_6$, $w^6_7$, $w^6_8$, $w^6_9$, $w^6_{10}$, $w^6_{11}$, $w^6_{12}$, $w^6_{13}$, $w^6_{14}$, $w^6_{15}$, $w^6_{16}$, $w^7_1$, $w^7_2$, $w^7_3$, $w^7_4$, $w^7_5$, $w^7_6$, $w^7_7$, $w^7_8$, $w^7_9$, $w^7_{10}$, $w^7_{11}$, $w^7_{12}$, $w^7_{13}$, $w^7_{14}$, $w^7_{15}$, $w^7_{16}$, $w^8_1$, $w^8_2$, $w^8_3$, $w^8_4$, $w^8_5$, $w^8_6$, $w^8_7$, $w^8_8$, $w^8_9$, $w^8_{10}$, $w^8_{11}$, $w^8_{12}$, $w^8_{13}$, $w^8_{14}$, $w^8_{15}$ and $w^8_{16}$.

The second row of converted weight matrix $212$ includes weights $x^1_1$, $x^1_2$, $x^1_3$, $x^1_4$, $x^1_5$, $x^1_6$, $x^1_7$, $x^1_8$, $x^1_9$, $x^1_{10}$, $x^1_{11}$, $x^1_{12}$, $x^1_{13}$, $x^1_{14}$, $x^1_{15}$, $x^1_{16}$, $x^2_1$, $x^2_2$, $x^2_3$, $x^2_4$, $x^2_5$, $x^2_6$, $x^2_7$, $x^2_8$, $x^2_9$, $x^2_{10}$, $x^2_{11}$, $x^2_{12}$, $x^2_{13}$, $x^2_{14}$, $x^2_{15}$, $x^2_{16}$, $x^3_1$, $x^3_2$, $x^3_3$, $x^3_4$, $x^3_5$, $x^3_6$, $x^3_7$, $x^3_8$, $x^3_9$, $x^3_{10}$, $x^3_{11}$, $x^3_{12}$, $x^3_{13}$, $x^3_{14}$, $x^3_{15}$, $x^3_{16}$, $x^4_1$, $x^4_2$, $x^4_3$, $x^4_4$, $x^4_5$, $x^4_6$, $x^4_7$, $x^4_8$, $x^4_9$, $x^4_{10}$, $x^4_{11}$, $x^4_{12}$, $x^4_{13}$, $x^4_{14}$, $x^4_{15}$, $x^4_{16}$, $x^5_1$, $x^5_2$, $x^5_3$, $x^5_4$, $x^5_5$, $x^5_6$, $x^5_7$, $x^5_8$, $x^5_9$, $x^5_{10}$, $x^5_{11}$, $x^5_{12}$, $x^5_{13}$, $x^5_{14}$, $x^5_{15}$, $x^5_{16}$, $x^6_1$, $x^6_2$, $x^6_3$, $x^6_4$, $x^6_5$, $x^6_6$, $x^6_7$, $x^6_8$, $x^6_9$, $x^6_{10}$, $x^6_{11}$, $x^6_{12}$, $x^6_{13}$, $x^6_{14}$, $x^6_{15}$, $x^6_{16}$, $x^7_1$, $x^7_2$, $x^7_3$, $x^7_4$, $x^7_5$, $x^7_6$, $x^7_7$, $x^7_8$, $x^7_9$, $x^7_{10}$, $x^7_{11}$, $x^7_{12}$, $x^7_{13}$, $x^7_{14}$, $x^7_{15}$, $x^7_{16}$, $x^8_1$, $x^8_2$, $x^8_3$, $x^8_4$, $x^8_5$, $x^8_6$, $x^8_7$, $x^8_8$, $x^8_9$, $x^8_{10}$, $x^8_{11}$, $x^8_{12}$, $x^8_{13}$, $x^8_{14}$, $x^8_{15}$ and $x^8_{16}$.

The third row of converted weight matrix $212$ includes weights $y^1_1$, $y^1_2$, $y^1_3$, $y^1_4$, $y^1_5$, $y^1_6$, $y^1_7$, $y^1_8$, $y^1_9$, $y^1_{10}$, $y^1_{11}$, $y^1_{12}$, $y^1_{13}$, $y^1_{14}$, $y^1_{15}$, $y^1_{16}$, $y^2_1$, $y^2_2$, $y^2_3$, $y^2_4$, $y^2_5$, $y^2_6$, $y^2_7$, $y^2_8$, $y^2_9$, $y^2_{10}$, $y^2_{11}$, $y^2_{12}$, $y^2_{13}$, $y^2_{14}$, $y^2_{15}$, $y^2_{16}$, $y^3_1$, $y^3_2$, $y^3_3$, $y^3_4$, $y^3_5$, $y^3_6$, $y^3_7$, $y^3_8$, $y^3_9$, $y^1_{10}$, $y^3_{11}$, $y^3_{12}$, $y^3_{13}$, $y^3_{14}$, $y^3_{15}$, $y^1_6$, $y^4_1$, $y^4_2$, $y^4_3$, $y^4_4$, $y^4_5$, $y^4_6$, $y^4_7$, $y^4_8$, $y^4_9$, $y^4_{10}$, $y^4_{11}$, $y^4_{12}$, $y^4_{13}$, $y^4_{14}$, $y^4_{15}$, $y^4_{16}$, $y^5_1$, $y^5_2$, $y^5_3$, $y^5_4$, $y^5_5$, $y^5_6$, $y^5_7$, $y^5_8$, $y^5_9$, $y^5_{10}$, $y^5_{11}$, $y^5_{12}$, $y^5_{13}$, $y^5_{14}$, $y^5_{15}$, $y^5_{16}$, $y^6_1$, $y^6_2$, $y^6_3$, $y^6_4$, $y^6_5$, $y^6_6$, $y^6_7$, $y^6_8$, $y^6_9$, $y^6_{10}$, $y^6_{11}$, $y^6_{12}$, $y^6_{13}$, $y^6_{14}$, $y^6_{15}$, $y^6_{16}$, $y^7_1$, $y^7_2$, $y^7_3$, $y^7_4$, $y^7_5$, $y^7_6$, $y^7_7$, $y^7_8$, $y^7_9$, $y^7_{10}$, $y^7_{11}$, $y^7_{12}$, $y^7_{13}$, $y^7_{14}$, $y^1_5$, $y^1_6$, $y^8_1$, $y^8_2$, $y^8_3$, $y^8_4$, $y^8_5$, $y^8_6$, $y^8_7$, $y^8_8$, $y^8_9$, $y^8_{10}$, $y^8_{11}$, $y^8_{12}$, $y^8_{13}$, $y^8_{14}$, $y^8_{15}$ and $y^8_{16}$.

Converted input data matrix $214$ is a $128\times9$ matrix, and includes the blocks of each quadrant of input data matrices $204^1$, $204^2$, $204^3$, $204^4$, $204^5$, $204^6$, $204^7$, $204^8$, i.e., quadrants $a^1_{q1}$, $a^1_{q2}$, $a^1_{q3}$, $a^2_{q1}$, $a^2_{q2}$, $a^2_{q3}$, $a^3_{q1}$, $a^3_{q2}$, $a^3_{q3}$, $a^4_{q1}$, $a^4_{q2}$, $a^4_{q3}$, $a^5_{q1}$, $a^5_{q2}$, $a^5_{q3}$, $a^6_{q1}$, $a^6_{q2}$, $a^6_{q3}$, $a^7_{q1}$, $a^7_{q2}$, $a^7_{q3}$, $a^8_{q1}$, $a^8_{q2}$, and $a^8_{q3}$, respectively. Generally, each block is flattened to form a portion of a single column of converted input data matrix $214$.

More particularly, the first column of converted input data matrix 214 includes the first blocks from quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$, the second column of converted input data matrix 214 includes the second blocks from quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$, and the third column of converted input data matrix 214 includes the third blocks from quadrants $a^1_{q1}$, $a^2_{q1}$, $a^3_{q1}$, $a^4_{q1}$, $a^5_{q1}$, $a^6_{q1}$, $a^7_{q1}$ and $a^8_{q1}$.

For example, the first column of converted input data matrix 214 includes activations $a^1_1$, $a^1_2$, $a^1_3$, $a^1_4$, $a^1_7$, $a^1_8$, $a^1_9$, $a^1_{10}$, $a^1_{13}$, $a^1_{14}$, $a^1_{15}$, $a^1_{16}$, $a^1_{19}$, $a^1_{20}$, $a^1_{21}$, $a^1_{22}$, $a^2_1$, $a^2_2$, $a^2_3$, $a^2_4$, $a^2_7$, $a^2_8$, $a^2_9$, $a^2_{10}$, $a^2_{13}$, $a^2_4$, $a^2_{15}$, $a^2_{16}$, $a^2_{19}$, $a^2_{20}$, $a^2_{21}$, $a^2_{22}$, $a^3_1$, $a^3_2$, $a^3_3$, $a^3_4$, $a^3_7$, $a^3_8$, $a^3_9$, $a^3_{10}$, $a^3_{13}$, $a^3_{14}$, $a^3_{15}$, $a^3_{16}$, $a^3_{19}$, $a^3_{20}$, $a^3_{21}$, $a^3_{22}$, $a^4_1$, $a^4_2$, $a^4_3$, $a^4_4$, $a^4_7$, $a^4_8$, $a^4_9$, $a^4_{10}$, $a^4_{13}$, $a^4_{14}$, $a^4_{15}$, $a^4_{16}$, $a^4_{19}$, $a^4_{20}$, $a^4_{21}$, $a^4_{22}$, $a^5_1$, $a^5_2$, $a^5_3$, $a^5_4$, $a^5_7$, $a^5_8$, $a^5_9$, $a^5_{10}$, $a^5_{13}$, $a^5_{14}$, $a^5_{15}$, $a^5_{16}$, $a^5_{19}$, $a^5_{20}$, $a^5_{21}$, $a^5_{22}$, $a^6_1$, $a^6_2$, $a^6_3$, $a^6_4$, $a^6_7$, $a^6_8$, $a^6_9$, $a^6_{10}$, $a^6_{13}$, $a^6_{14}$, $a^6_{15}$, $a^6_{16}$, $a^6_{19}$, $a^6_{20}$, $a^6_{21}$, $a^6_{22}$, $a^7_1$, $a^7_2$, $a^7_3$, $a^7_4$, $a^7_7$, $a^7_8$, $a^7_9$, $a^7_{10}$, $a^7_{13}$, $a^7_{14}$, $a^7_{15}$, $a^7_{16}$, $a^7_{19}$, $a^7_{20}$, $a^7_{21}$, $a^7_{22}$, $a^8$, $a^8_2$, $a^8_3$, $a^8_4$, $a^8_7$, $a^8_8$, $a^8_9$, $a^8_{10}$, $a^8_{13}$, $a^8_4$, $a^8_{15}$, $a^8_{16}$, $a^8_{19}$, $a^8_{20}$, $a^8_{21}$ and $a^8_{22}$.

The second column of converted input data matrix 214 includes activations $a^1$, $a^1$, $a^1$, $a^1$, $a^1$, $a^1$, $a^1_1$, $a^1_1$, $a^1_{14}$, $a^1_{15}$, $a^1_{16}$, $a^1_{17}$, $a^1_{20}$, $a^1_{21}$, $a^1_{22}$, $a^1_{23}$, $a^2_2$, $a^2_3$, $a^2_4$, $a^2_5$, $a^2_8$, $a^2_9$, $a^2_{10}$, $a^2_{11}$, $a^2_{14}$, $a^2_{15}$, $a^2_{16}$, $a^2_{17}$, $a^2_{20}$, $a^2_{21}$, $a^2_{22}$, $a^2_{23}$, $a^3_2$, $a^3_3$, $a^3_4$, $a^3_5$, $a^3_8$, $a^3_9$, $a^3_{10}$, $a^3_{11}$, $a^3_{14}$, $a^3_{15}$, $a^3_{16}$, $a^3_{17}$, $a^3_{20}$, $a^3_{21}$, $a^3_{22}$, $a^3_{23}$, $a^4_2$, $a^4_3$, $a^4_4$, $a^4_5$, $a^4_8$, $a^4_9$, $a^4_{10}$, $a^4_{11}$, $a^4_{14}$, $a^4_{15}$, $a^4_{16}$, $a^4_{17}$, $a^4_{20}$, $a^4_{21}$, $a^4_{22}$, $a^4_{23}$, $a^5_2$, $a^5_3$, $a^5_4$, $a^5_5$, $a^5_8$, $a^5_9$, $a^5_{10}$, $a^5_{11}$, $a^5_{14}$, $a^5_{15}$, $a^5_{16}$, $a^5_{17}$, $a^5_{20}$, $a^5_{21}$, $a^5_{22}$, $a^5_{23}$, $a^6_2$, $a^6_3$, $a^6_4$, $a^6_5$, $a^6_8$, $a^6_9$, $a^6_{10}$, $a^6_{11}$, $a^6_{14}$, $a^6_{15}$, $a^6_{16}$, $a^6_{17}$, $a^6_{20}$, $a^6_{21}$, $a^6_{22}$, $a^6_{23}$, $a^7_2$, $a^7_3$, $a^7_4$, $a^7_5$, $a^7_8$, $a^7_9$, $a^7_{10}$, $a^7_{11}$, $a^7_{14}$, $a^7_{15}$, $a^7_{16}$, $a^7_{17}$, $a^7_{20}$, $a^7_{21}$, $a^7_{22}$, $a^7_{23}$, $a^8_2$, $a^8_3$, $a^8_4$, $a^8_5$, $a^8_8$, $a^8_9$, $a^8_{10}$, $a^8_{11}$, $a^8_{14}$, $a^8_{15}$, $a^8_{16}$, $a^8_{17}$, $a^8_{20}$, $a^8_{21}$, $a^8_{22}$ and $a^8_{23}$.

The third column of converted input data matrix 214 includes activations $a^1_3$, $a^1_4$, $a^1_5$, $a^1_6$, $a^1_9$, $a^1_{10}$, $a^1_{11}$, $a^1_{12}$, $a^1_{15}$, $a^1_{16}$, $a^1_{17}$, $a^1_{18}$, $a^1_{21}$, $a^1_{22}$, $a^1_{23}$, $a^1_{24}$, $a^2_3$, $a^2_4$, $a^2_5$, $a^2_6$, $a^2_9$, $a^2_{10}$, $a^2_{11}$, $a^2_{12}$, $a^2_{15}$, $a^2_{16}$, $a^2_7$, $a^2_{18}$, $a^2_{21}$, $a^2_{22}$, $a^2_{23}$, $a^2_{24}$, $a^3_3$, $a^3_4$, $a^3_5$, $a^3_6$, $a^3_9$, $a^3_{10}$, $a^3_{11}$, $a^3_{12}$, $a^3_{15}$, $a^3_{16}$, $a^3_7$, $a^3_{18}$, $a^3_{21}$, $a^3_{22}$, $a^3_{23}$, $a^3_{24}$, $a^4_3$, $a^4_4$, $a^4_5$, $a^4_6$, $a^4_9$, $a^4_{10}$, $a^4_{11}$, $a^4_{12}$, $a^4_{15}$, $a^4_{16}$, $a^4_{17}$, $a^4_{18}$, $a^4_{21}$, $a^4_{22}$, $a^4_{23}$, $a^4_{24}$, $a^5_3$, $a^5_4$, $a^5_5$, $a^5_6$, $a^5_9$, $a^5_{10}$, $a^5_{11}$, $a^5_{12}$, $a^5_{15}$, $a^5_{16}$, $a^5_{17}$, $a^5_{18}$, $a^5_{21}$, $a^5_{22}$, $a^5_{23}$, $a^5_{24}$, $a^6_3$, $a^6_4$, $a^6_5$, $a^6_6$, $a^6_9$, $a^6_{10}$, $a^6$, $a^6_{12}$, $a^6_{15}$, $a^6_{16}$, $a^6_{17}$, $a^6_{18}$, $a^6_{21}$, $a^6_{22}$, $a^6_{23}$, $a^6_{24}$, $a^7_3$, $a^7_4$, $a^7_5$, $a^7_6$, $a^7_9$, $a^7_{10}$, $a^7_{11}$, $a^7_{12}$, $a^7_{15}$, $a^7_{16}$, $a^7_{17}$, $a^7_{18}$, $a^7_{21}$, $a^7_{22}$, $a^7_{23}$, $a^7_{24}$, $a^8_3$, $a^8_4$, $a^8_5$, $a^8_6$, $a^8_9$, $a^8_{10}$, $a^8$, $a^8_{12}$, $a^8_{15}$, $a^8_{16}$, $a^8_{17}$, $a^8_{18}$, $a^8_{21}$, $a^8_{22}$, $a^8_{23}$ and $a^8_{24}$.

The remaining columns of converted input data matrix 214 are formed in a similar manner. The fourth column of converted input data matrix 214 includes the first blocks from quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$, the fifth column of converted input data matrix 214 includes the second blocks from quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$, and the sixth column of converted input data matrix 214 includes the third blocks from quadrants $a^1_{q2}$, $a^2_{q2}$, $a^3_{q2}$, $a^4_{q2}$, $a^5_{q2}$, $a^6_{q2}$, $a^7_{q2}$ and $a^8_{q2}$. The seventh column of converted input data matrix 214 includes the first blocks from quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$, the eighth column of converted input data matrix 214 includes the second blocks from quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$, and the ninth column of converted input data matrix 214 includes the third blocks from quadrants $a^1_{q3}$, $a^2_{q3}$, $a^3_{q3}$, $a^4_{q3}$, $a^5_{q3}$, $a^6_{q3}$, $a^7_{q3}$ and $a^8_{q3}$.

Converted output data matrix 216 is a 3×9 matrix, and includes flattened versions of output data matrices 206¹, 206² and 206³, i.e., converted output data matrices 216¹, 216² and 216³. Converted output data matrix 216 may also be arranged into three quadrants; in this case, each quadrant spans all three converted output data matrices 216¹, 216² and

216³. The first quadrant spans the first three columns of converted output data matrix 216, the second quadrant spans the next three columns of converted output data matrix 216, and the third quadrant spans the last three columns of converted output data matrix 216. The first quadrant for each converted output data matrix 216¹, 216² and 216³ (i.e., $o^1$, $o^2_{q1}$ and $o^3_{q1}$) is labeled; the remaining quadrants are not labeled for clarity.

For converted output data matrix 216¹, the first quadrant $o^1_{q1}$ includes $o^1_1$, $o^1_2$, $o^1_3$, the second quadrant $o^1_{q2}$ includes $o^1_4$, $o^1_5$ and $o^1_6$, and the third quadrant $o^1_{q3}$ includes $o^1_7$, $o^1_8$ and $o^1_9$. For converted output data matrix 216², the first quadrant $o^2_{q1}$ includes $o^2_1$, $o^2_2$, $o^2_3$, the second quadrant $o^2_{q2}$ includes $o^2_4$, $o^2_5$ and $o^2_6$, and the third quadrant $o^2_{q3}$ includes $o^2_7$, $o^2_8$ and $o^2_9$. For converted output data matrix 216³, the first quadrant $o^3_{q1}$ includes $o^3_1$, $o^3_2$, $o^3_3$, the second quadrant $o^3_{q2}$ includes $o^3_4$, $o^3_5$ and $o^3_6$, and the third quadrant $o^3_{q3}$ includes $o^3_7$, $o^3_8$ and $o^3_9$.

The calculation of the output elements in quadrant $o^1_{q1}$ of converted output data matrix 216¹ follows.

Output element $o^1_1$ is the dot product of the first row of converted weight matrix 212, i.e., converted weight tensor 212¹, and the first column of converted input data matrix 214.

More particularly, output element $o^1_1$ is equal to $w^1_1{\cdot}a^1_1+$ $w^1_2{\cdot}a^1_2+w^1_3{\cdot}a^1_3+w^1_4{\cdot}a^1_4+w^1_5{\cdot}a^1_7+w^1_6{\cdot}a^1_8+w^1_7{\cdot}a^1_9+$ $w^1_8{\cdot}a^1_{10}+w^1_9{\cdot}a^1_{13}+w^1_{10}{\cdot}a^1_{14}+w^1_{11}{\cdot}a^1_{15}+w^1_{12}{\cdot}a^1_{16}+$ $w^1_{13}{\cdot}a^1_{19}+w^1_{14}{\cdot}a^1_{20}+w^1_{15}{\cdot}a^1_{21}+w^1_{16}{\cdot}a^1_{22}+w^2_1{\cdot}a^2_1+$ $w^2_2{\cdot}a^2_2+w^2_3{\cdot}a^2_3+w^2_4{\cdot}a^2_4+w^2_5{\cdot}a^2_7+w^2_6{\cdot}a^2_8+w^2_7{\cdot}a^2_9+$ $w^2_8{\cdot}a^2_{10}+w^2_9{\cdot}a^2_{13}+w^2_{10}{\cdot}a^2_{14}+w^2_{11}{\cdot}a^2_{15}+w^2_{12}{\cdot}a^2_{16}+$ $w^2_{13}{\cdot}a^2_{19}+w^2_{14}{\cdot}a^2_{20}+w^2_{15}{\cdot}a^2_{21}+w^2_{16}{\cdot}a^2_{22}+w^3_1{\cdot}a^3_1+$ $w^3_2{\cdot}a^3_2+w^3_3{\cdot}a^3_3+w^3_4{\cdot}a^3_4+w^3_5{\cdot}a^3_7+w^3_6{\cdot}a^3_8+w^3_7{\cdot}a^3_9+$ $w^3_8{\cdot}a^3_{10}+w^3_9{\cdot}a^3_{13}+w^3_{10}{\cdot}a^3_{14}+w^3_{11}{\cdot}a^3_{15}+w^3_{12}{\cdot}a^3_{16}+$ $w^3_{13}{\cdot}a^3_{19}+w^3_{14}{\cdot}a^3_{20}+w^3_{15}{\cdot}a^3_{21}+w^3_{16}{\cdot}a^3_{22}+w^4_1{\cdot}a^4_1+$ $w^4_2{\cdot}a^4_2+w^4_3{\cdot}a^4_3+w^4_4{\cdot}a^4_4+w^4_5{\cdot}a^4_7+w^4_6{\cdot}a^4_8+w^4_7{\cdot}a^4_9+$ $w^4_8{\cdot}a^4_{10}+w^4_9{\cdot}a^4_{13}+w^4_{10}{\cdot}a^4_{14}+w^4_{11}{\cdot}a^4_{15}+w^4_{12}{\cdot}a^4_{16}+$ $w^4_{13}{\cdot}a^4_{19}+w^4_{14}{\cdot}a^4_{20}+w^4_{15}{\cdot}a^4_{21}+w^4_{16}{\cdot}a^4_{22}+w^5_1{\cdot}a^5_1+w^5_2{\cdot}a^5_2+$ $w^5_3{\cdot}a^5_3+w^5_4{\cdot}a^5_4+w^5_5{\cdot}a^5_7+w^5_6{\cdot}a^5_8+w^5_7{\cdot}a^5_9+w^5_8{\cdot}a^5_{10}+$ $w^5_9{\cdot}a^5_{13}+w^5_{10}{\cdot}a^5_{14}+w^5_{11}{\cdot}a^5_{15}+w^5_{12}{\cdot}a^5_{16}+w^5_{13}{\cdot}a^5_{19}+$ $w^5_{14}{\cdot}a^5_{20}+w^5_{15}{\cdot}a^5_{21}+w^5_{16}{\cdot}a^5_{22}+w^6_1{\cdot}a^6_1+w^6_2{\cdot}a^6_2+w^6_3{\cdot}a^6_3+$ $w^6_4{\cdot}a^6_4+w^6_5{\cdot}a^6_7+w^6_6{\cdot}a^6_8+w^6_7{\cdot}a^6_9+w^6_8{\cdot}a^6_{10}+w^6_9{\cdot}a^6_{13}+$ $w^6_{10}{\cdot}a^6_{14}+w^6_{11}{\cdot}a^6_{15}+w^6_{12}{\cdot}a^6_{16}+w^6_{13}{\cdot}a^6_{19}+w^6_{14}{\cdot}a^6_{20}+$ $w^6_{15}{\cdot}a^6_{21}+w^6_{16}{\cdot}a^6_{22}+w^7_1{\cdot}a^7_1+w^7_2{\cdot}a^7_2+w^7_3{\cdot}a^7_3+w^7_4{\cdot}a^7_4+$ $w^7_5{\cdot}a^7_7+w^7_6{\cdot}a^7_8+w^7_7{\cdot}a^7_9+w^7_8{\cdot}a^7_{10}+w^7_9{\cdot}a^7_{13}+w^7_{10}{\cdot}a^7_{14}+$ $w^7_{11}{\cdot}a^7_{15}+w^7_{12}{\cdot}a^7_{16}+w^7_{13}{\cdot}a^7_{19}+w^7_{14}{\cdot}a^7_{20}+w^7_{15}{\cdot}a^7_{21}+$ $w^7_{16}{\cdot}a^7_{22}+w^8_1{\cdot}a^8_1+w^8_2{\cdot}a^8_2+w^8_3{\cdot}a^8_3+w^8_4{\cdot}a^8_4+w^8_5{\cdot}a^8_7+$ $w^8_6{\cdot}a^8_8+w^8_7{\cdot}a^8_9+w^8_8{\cdot}a^8_{10}+w^8_9{\cdot}a^8_{13}+w^8_{10}{\cdot}a^8_{14}+w^8_{11}{\cdot}a^8_{15}+$ $w^8_{12}{\cdot}a^8_{16}+w^8_{13}{\cdot}a^8_{19}+w^8_{14}{\cdot}a^8_{20}+w^8_{15}{\cdot}a^8_{21}+w^8_{16}{\cdot}a^8_{22}$.

As shown above, output element $o^1_1$ of converted output data matrix 216 is equal to output element $o^1_1$ of output data matrix 206¹.

Output element $o^1_2$ is the dot product of the first row of converted weight matrix 212, i.e., converted weight tensor 212¹, and the second column of converted input data matrix 214.

More particularly, output element $o^1_2$ is equal to $w^1_1{\cdot}a^1_2+$ $w^1_2{\cdot}a^1_3+w^1_3{\cdot}a^1_4+w^1_4{\cdot}a^1_5+w^1_5{\cdot}a^1_8+w^1_6{\cdot}a^1_9+w^1_7{\cdot}a^1_{10}+$ $w^1_8{\cdot}a^1_{11}+w^1_9{\cdot}a^1_{14}+w^1_{10}{\cdot}a^1_{15}+w^1_{11}{\cdot}a^1_6+w^1_{12}{\cdot}a^1_{17}+$ $w^1_{13}{\cdot}a^1_{20}+w^1_{14}{\cdot}a^2_1+w^1_{15}{\cdot}a^1_{22}+w^1_{16}{\cdot}a^1_{23}+w^2_1{\cdot}a^2_2+w^2_2{\cdot}a^2_3+$ $w^2_3{\cdot}a^2_4+w^2_4{\cdot}a^2_5+w^2_5{\cdot}a^2_8+w^2_6{\cdot}a^2_9+w^2_7{\cdot}a^2_{10}+w^2_8{\cdot}a^2_{11}+$ $w^2_9{\cdot}a^2_{14}+w^2_{10}{\cdot}a^2_{15}+w^2_{11}{\cdot}a^2_{16}+w^2_{12}{\cdot}a^2_{17}+w^2_{13}{\cdot}a^2_{20}+$ $w^2_{14}{\cdot}a^2_{21}+w^2_{15}{\cdot}a^2_{22}+w^2_{16}{\cdot}a^2_{23}+w^3_1{\cdot}a^3_2+w^3_2{\cdot}a^3_3+w^3_3{\cdot}a^3_4+$ $w^3_4{\cdot}a^3_5+w^3_5{\cdot}a^3_8+w^3_6{\cdot}a^3_9+w^3_7{\cdot}a^3_{10}+w^3_8{\cdot}a^3_{11}+w^3_9{\cdot}a^3_{14}+$ $w^3_{10}{\cdot}a^3_{15}+w^3_{11}{\cdot}a^3_{16}+w^3_{12}{\cdot}a^3_{17}+w^3_{13}{\cdot}a^3_{20}+w^3_{14}{\cdot}a^3_{21}+$ $w^3_{15}{\cdot}a^3_{22}+w^3_{16}{\cdot}a^3_{23}+w^4_1{\cdot}a^4_2+w^4_2{\cdot}a^4_3+w^4_3{\cdot}a^4_4+w^4_4{\cdot}a^4_5+$ $w^4_5{\cdot}a^4_8+w^4_6{\cdot}a^4_9+w^4_7{\cdot}a^4_{10}+w^4_8{\cdot}a^4_{11}+w^4_9{\cdot}a^4_{14}+w^4_{10}{\cdot}a^4_{15}+$ $w^4_{11}{\cdot}a^4_{16}+w^4_{12}{\cdot}a^4_{17}+w^4_{13}{\cdot}a^4_{20}+w^4_{14}{\cdot}a^4_{21}+w^4_{15}{\cdot}a^4_{22}+$ $$w^4_{16} \cdot a^4_{23} + w^5_1 \cdot a^5_2 + w^5_2 \cdot a^5_3 + w^5_3 \cdot a^5_4 + w^5_4 \cdot a^5_5 + w^5_5 \cdot a^5_8 +$$
$$w^5_6 \cdot a^5_9 + w^5_7 \cdot a^5_{10} + w^5_8 \cdot a^5_{11} + w^5_9 \cdot a^5_{14} + w^5_{10} \cdot a^5_{15} + w^5_{11} \cdot a^5_{16} +$$
$$w^5_{12} \cdot a^5_{17} + w^5_{13} \cdot a^5_{20} + w^5_{14} \cdot a^5_{21} + w^5_{15} \cdot a^5_{22} + w^5_{16} \cdot a^5_{23} +$$
$$w^6_1 \cdot a^6_2 + w^6_2 \cdot a^6_3 + w^6_3 \cdot a^6_4 + w^6_4 \cdot a^6_5 + w^6_5 \cdot a^6_8 + w^6_6 \cdot a^6_9 +$$
$$w^6_7 \cdot a^6_{10} + w^6_8 \cdot a^6_{11} + w^6_9 \cdot a^6_{14} + w^6_{10} \cdot a^6_{15} + w^6_{11} \cdot a^6_{16} +$$
$$w^6_{12} \cdot a^6_{17} + w^6_{13} \cdot a^6_{20} + w^6_{14} \cdot a^6_{21} + w^6_{15} \cdot a^6_{22} + w^6_{16} \cdot a^6_{23} +$$
$$w^7_1 \cdot a^7_2 + w^7_2 \cdot a^7_3 + w^7_3 \cdot a^7_4 + w^7_4 \cdot a^7_5 + w^7_5 \cdot a^7_8 + w^7_6 \cdot a^7_9 +$$
$$w^7_7 \cdot a^7_{10} + w^7_8 \cdot a^7_{110} + w^7_9 \cdot a^7_{14} + w^7_{10} \cdot a^7_{15} + w^7_{11} \cdot a^7_{16} +$$
$$w^7_{12} \cdot a^7_{17} + w^7_{13} \cdot a^7_{20} + w^7_{14} \cdot a^7_{21} + w^7_{15} \cdot a^7_{22} + w^7_{16} \cdot a^7_{23} +$$
$$w^8_1 \cdot a^8_2 + w^8_2 \cdot a^8_3 + w^8_3 \cdot a^8_4 + w^8_4 \cdot a^8_5 + w^8_5 \cdot a^8_8 + w^8_6 \cdot a^8_9 +$$
$$w^8_7 \cdot a^8_{10} + w^8_8 \cdot a^8_{11} + w^8_9 \cdot a^8_{14} + w^8_{10} \cdot a^8_{15} + w^8_{11} \cdot a^8_{16} +$$
$$w^8_{12} \cdot a^8_{17} + w^8_{13} \cdot a^8_{20} + w^8_{14} \cdot a^8_{210} + w^8_{15} \cdot a^8_{22} + w^8_{16} \cdot a^8_{23}.$$

As shown above, output element $o^1_2$ of converted output data matrix 216 is equal to output element $o^1_2$ of output data matrix 206$^1$.

Output element $o^1_3$ is the dot product of the first row of converted weight matrix 212, i.e., converted weight tensor 212$^1$, and the third column of converted input data matrix 214.

More particularly, output element $o^1_3$ is equal to $w^1_1 \cdot a^1_3 +$ $$w^1_2 \cdot a^1_4 + w^1_3 \cdot a^1_5 + w^1_4 \cdot a^1_6 + w^1_5 \cdot a^1_9 + w^1_6 \cdot a^1_{10} + w^1_7 \cdot a^1_{11} +$$
$$w^1_8 \cdot a^1_{12} + w^1_9 \cdot a^1_{15} + w^1_{10} \cdot a^1_{16} + w^1_{11} \cdot a^1_{17} + w^1_{12} \cdot a^1_{18} +$$
$$w^1_{13} \cdot a^1_{21} + w^1_{14} \cdot a^1_{22} + w^1_{15} \cdot a^1_{23} + w^1_{16} \cdot a^1_{24} + w^2_1 \cdot a^2_3 +$$
$$w^2_2 \cdot a^2_4 + w^2_3 \cdot a^2_5 + w^2_4 \cdot a^2_6 + w^2_5 \cdot a^2_9 + w^2_6 \cdot a^2_{10} + w^2_7 \cdot a^2_{11} +$$
$$w^2_8 \cdot a^2_{12} + w^2_9 \cdot a^2_{15} + w^2_{10} \cdot a^2_{16} + w^2_{11} \cdot a^2_{17} + w^2_{12} \cdot a^2_{18} +$$
$$w^2_{13} \cdot a^2_{21} + w^2_{14} \cdot a^2_{22} + w^2_{15} \cdot a^2_{23} + w^2_{16} \cdot a^2_{24} + w^3_1 \cdot a^3_3 +$$
$$w^3_2 \cdot a^3_4 + w^3_3 \cdot a^3_5 + w^3_4 \cdot a^3_6 + w^3_5 \cdot a^3_9 + w^3_6 \cdot a^3_{10} + w^3_7 \cdot a^3_{11} +$$
$$w^3_8 \cdot a^3_{12} + w^3_9 \cdot a^3_{15} + w^3_{10} \cdot a^3_{16} + w^3_{11} \cdot a^3_{17} + w^3_{12} \cdot a^3_{18} +$$
$$w^3_{13} \cdot a^3_{21} + w^3_{14} \cdot a^3_{22} + w^3_{15} \cdot a^3_{23} + w^3_{16} \cdot a^3_{24} + w^4_1 \cdot a^4_3 +$$
$$w^4_2 \cdot a^4_4 + w^4_3 \cdot a^4_5 + w^4_4 \cdot a^4_6 + w^4_5 \cdot a^4_9 + w^4_6 \cdot a^4_{10} + w^4_7 \cdot a^4_{11} +$$
$$w^4_8 \cdot a^4_{12} + w^4_9 \cdot a^4_{15} + w^4_{10} \cdot a^4_{16} + w^4_{11} \cdot a^4_{17} + w^4_{12} \cdot a^4_{18} +$$
$$w^4_{13} \cdot a^4_{21} + w^4_{14} \cdot a^4_{22} + w^4_{15} \cdot a^4_{23} + w^4_{16} \cdot a^4_{24} + w^5_1 \cdot a^5_3 +$$
$$w^5_2 \cdot a^5_4 + w^5_3 \cdot a^5_5 + w^5_4 \cdot a^5_6 + w^5_5 \cdot a^5_9 + w^5_6 \cdot a^5_{10} + w^5_7 \cdot a^5_{11} +$$
$$w^5_8 \cdot a^5_{12} + w^5_9 \cdot a^5_{15} + w^5_{10} \cdot a^5_{16} + w^5_{11} \cdot a^5_{17} + w^5_{12} \cdot a^5_{18} +$$
$$w^5_{13} \cdot a^5_{21} + w^5_{14} \cdot a^5_{22} + w^5_{15} \cdot a^5_{23} + w^5_{16} \cdot a^5_{24} + w^6_1 \cdot a^6_3 +$$
$$w^6_2 \cdot a^6_4 + w^6_3 \cdot a^6_5 + w^6_4 \cdot a^6_6 + w^6_5 \cdot a^6_9 + w^6_6 \cdot a^6_{10} + w^6_7 \cdot a^6_{11} +$$
$$w^6_8 \cdot a^6_{12} + w^6_9 \cdot a^6_{15} + w^6_{10} \cdot a^6_{16} + w^6_{11} \cdot a^6_{17} + w^6_{12} \cdot a^6_{18} +$$
$$w^6_{13} \cdot a^6_{21} + w^6_{14} \cdot a^6_{22} + w^6_{15} \cdot a^6_{23} + w^6_{16} \cdot a^6_{24} + w^7_1 \cdot a^7_3 +$$
$$w^7_2 \cdot a^7_4 + w^7_3 \cdot a^7_5 + w^7_4 \cdot a^7_6 + w^7_5 \cdot a^7_9 + w^7_6 \cdot a^7_{10} + w^7_7 \cdot a^7_{11} +$$
$$w^7_8 \cdot a^7_{12} + w^7_9 \cdot a^7_{15} + w^7_{10} \cdot a^7_{16} + w^7_{11} \cdot a^7_{17} + w^7_{12} \cdot a^7_{18} +$$
$$w^7_{13} \cdot a^7_{21} + w^7_{14} \cdot a^7_{22} + w^7_{15} \cdot a^7_{23} + w^7_{16} \cdot a^7_{24} + w^8_1 \cdot a^8_3 +$$
$$w^8_2 \cdot a^8_4 + w^8_3 \cdot a^8_5 + w^8_4 \cdot a^8_6 + w^8_5 \cdot a^8_9 + w^8_6 \cdot a^8_{10} + w^8_7 \cdot a^8_{11} +$$
$$w^8_8 \cdot a^8_{12} + w^8_9 \cdot a^8_{15} + w^8_{10} \cdot a^8_{16} + w^8_{11} \cdot a^8_{17} + w^8_{12} \cdot a^8_{18} +$$
$$w^8_{13} \cdot a^8_{21} + w^8_{14} \cdot a^8_{22} + w^8_{15} \cdot a^8_{23} + w^8_{16} \cdot a^8_{24}.$$

As shown above, output element $o^1_3$ of converted output data matrix 216 is equal to output element $o^1_3$ of output data matrix 206$^1$.

The calculation of the output elements in quadrant $o^2_{q1}$ of converted output data matrix 216$^2$ follows.

Output element $o^2_1$ is the dot product of the second row of converted weight matrix 212, i.e., converted weight tensor 212$^2$, and the first column of converted input data matrix 214.

More particularly, output element $o^2_1$ is equal to $x^1_1 \cdot a^1_1 +$ $$x^1_2 \cdot a^1_2 + x^1_3 \cdot a^1_3 + x^1_4 \cdot a^1_4 + x^1_5 \cdot a^1_7 + x^1_6 \cdot a^1_8 + x^1_7 \cdot a^1_9 + x^1_8 \cdot a^1_{10} +$$
$$x^1_9 \cdot a^1_{13} + x^1_{10} \cdot a^1_{14} + x^1_{11} \cdot a^1_{15} + x^1_{12} \cdot a^1_{16} + x^1_{13} \cdot a^1_{19} +$$
$$x^1_{14} \cdot a^1_{20} + x^1_{15} \cdot a^1_{21} + x^1_{16} \cdot a^1_{22} + x^2_1 \cdot a^2_1 + x^2_2 \cdot a^2_2 + x^2_3 \cdot a^2_3 +$$
$$x^2_4 \cdot a^2_4 + x^2_5 \cdot a^2_7 + x^2_6 \cdot a^2_8 + x^2_7 \cdot a^2_9 + x^2_8 \cdot a^2_{10} + x^2_9 \cdot a^2_{13} +$$
$$x^2_{10} \cdot a^2_{14} + x^2_{11} \cdot a^2_{15} + x^2_{12} \cdot a^2_{16} + x^2_{13} \cdot a^2_{19} + x^2_{14} \cdot a^2_{20} +$$
$$x^2_{15} \cdot a^2_{21} + x^2_{16} \cdot a^2_{22} + x^3_1 \cdot a^3_1 + x^3_2 \cdot a^3_2 + x^3_3 \cdot a^3_3 + x^3_4 \cdot a^3_4 +$$
$$x^3_5 \cdot a^3_7 + x^3_6 \cdot a^3_8 + x^3_7 \cdot a^3_9 + x^3_8 \cdot a^3_{10} + x^3_9 \cdot a^3_{13} + x^3_{10} \cdot a^3_{14} +$$
$$x^3_{11} \cdot a^3_{15} + x^3_{12} \cdot a^3_{16} + x^3_{13} \cdot a^3_{19} + x^3_{14} \cdot a^3_{20} + x^3_{15} \cdot a^3_{21} +$$
$$x^3_{16} \cdot a^3_{22} + x^4_1 \cdot a^4_1 + x^4_2 \cdot a^4_2 + x^4_3 \cdot a^4_3 + x^4_4 \cdot a^4_4 + x^4_5 \cdot a^4_7 + x^4_6 \cdot a^4_8 +$$
$$x^4_7 \cdot a^4_9 + x^4_8 \cdot a^4_{10} + x^4_9 \cdot a^4_{13} + x^4_{10} \cdot a^4_{14} + x^4_{11} \cdot a^4_{15} + x^4_{12} \cdot a^4_{16} +$$
$$x^4_{13} \cdot a^4_{19} + x^4_{14} \cdot a^4_{20} + x^4_{15} \cdot a^4_{21} + x^4_{16} \cdot a^4_{22} + x^5_1 \cdot a^5_1 + x^5_2 \cdot a^5_2 +$$
$$x^5_3 \cdot a^5_3 + x^5_4 \cdot a^5_4 + x^5_5 \cdot a^5_7 + x^5_6 \cdot a^5_8 + x^5_7 \cdot a^5_9 + x^5_8 \cdot a^5_{10} + x^5_9 \cdot a^5_{13} +$$
$$x^5_{10} \cdot a^5_{14} + x^5_1 \cdot a^5_{15} + x^5_{12} \cdot a^5_{16} + x^5_{13} \cdot a^5_{19} + x^5_{14} \cdot a^5_{20} +$$

$$x^5_{15} \cdot a^5_{21} + x^5_{16} \cdot a^5_{22} + x^6_1 \cdot a^6_1 + x^6_2 \cdot a^6_2 + x^6_3 \cdot a^6_3 + x^6_4 \cdot a^6_4 +$$
$$x^6_5 \cdot a^6_7 + x^6_6 \cdot a^6_8 + x^6_7 \cdot a^6_9 + x^6_8 \cdot a^6_{10} + x^6_9 \cdot a^6_{13} + x^6_{10} \cdot a^6_{14} +$$
$$x^6_{11} \cdot a^6_{15} + x^6_{12} \cdot a^6_{16} + x^6_{13} \cdot a^6_{19} + x^6_{14} \cdot a^6_{20} + x^6_{15} \cdot a^6_{21} +$$
$$x^6_{16} \cdot a^6_{22} + x^7_1 \cdot a^7_1 + x^7_2 \cdot a^7_2 + x^7_3 \cdot a^7_3 + x^7_4 \cdot a^7_4 + x^7_5 \cdot a^7_7 + x^7_6 \cdot a^7_8 +$$
$$x^7_7 \cdot a^7_9 + x^7_8 \cdot a^7_{10} + x^7_9 \cdot a^7_{13} + x^7_{10} \cdot a^7_{14} + x^7_{11} \cdot a^7_{15} + x^7_{12} \cdot a^7_{16} +$$
$$x^7_{13} \cdot a^7_{19} + x^7_{14} \cdot a^7_{20} + x^7_{15} \cdot a^7_{21} + x^7_{16} \cdot a^7_{22} + x^8_1 \cdot a^8_1 + x^8_2 \cdot a^8_2 +$$
$$x^8_3 \cdot a^8_3 + x^8_4 \cdot a^8_4 + x^8_5 \cdot a^8_7 + x^8_6 \cdot a^8_8 + x^8_7 \cdot a^8_9 + x^8_8 \cdot a^8_{10} + x^8_9 \cdot a^8_{13} +$$
$$x^8_{10} \cdot a^8_{14} + x^8_{11} \cdot a^8_{15} + x^8_{12} \cdot a^8_{16} + x^8_{13} \cdot a^8_{19} + x^8_{14} \cdot a^8_{20} +$$
$$x^8_{15} \cdot a^8_{21} + x^8_{16} \cdot a^8_{22}.$$

As shown above, output element $o^2_1$ of converted output data matrix 216 is equal to output element $o^2_1$ of output data matrix 206$^2$.

Output element $o^2_2$ is the dot product of the second row of converted weight matrix 212, i.e., converted weight tensor 212$^2$, and the second column of converted input data matrix 214.

More particularly, output element $o^2_2$ is equal to $x^1_1 \cdot a^1_2 +$ $$x^1_2 \cdot a^1_3 + x^1_3 \cdot a^1_4 + x^1_4 \cdot a^1_5 + x^1_5 \cdot a^1_8 + x^1_6 \cdot a^1_9 + x^1_7 \cdot a^1_{10} + x^1_8 \cdot a^1_{11} +$$
$$x^1_9 \cdot a^1_{14} + x^1_{10} \cdot a^1_{15} + x^1_{11} \cdot a^1_{16} + x^1_{12} \cdot a^1_{17} + x^1_{13} \cdot a^1_{20} +$$
$$x^1_{14} \cdot a^1_{21} + x^1_{15} \cdot a^1_{22} + x^1_{16} \cdot a^1_{23} + x^2_1 \cdot a^2_2 + x^2_2 \cdot a^2_3 + x^2_3 \cdot a^2_4 +$$
$$x^2_4 \cdot a^2_5 + x^2_5 \cdot a^2_8 + x^2_6 \cdot a^2_9 + x^2_7 \cdot a^2_{10} + x^2_8 \cdot a^2_{11} + x^2_9 \cdot a^2_{14} +$$
$$x^2_{10} \cdot a^2_{15} + x^2_{11} \cdot a^2_{16} + x^2_{12} \cdot a^2_{17} + x^2_{13} \cdot a^2_{20} + x^2_{14} \cdot a^2_{21} +$$
$$x^2_{15} \cdot a^2_{22} + x^2_{16} \cdot a^2_{23} + x^3_1 \cdot a^3_2 + x^3_2 \cdot a^3_3 + x^3_3 \cdot a^3_4 + x^3_4 \cdot a^3_5 +$$
$$x^3_5 \cdot a^3_8 + x^3_6 \cdot a^3_9 + x^3_7 \cdot a^3_{10} + x^3_8 \cdot a^3_{11} + x^3_9 \cdot a^3_{14} + x^3_{10} \cdot a^3_{15} +$$
$$x^3_{11} \cdot a^3_{16} + x^3_{12} \cdot a^3_{17} + x^3_{13} \cdot a^3_{20} + x^3_{14} \cdot a^3_{21} + x^3_{15} \cdot a^3_{22} +$$
$$x^3_{16} \cdot a^3_{23} + x^4_1 \cdot a^4_2 + x^4_2 \cdot a^4_3 + x^4_3 \cdot a^4_4 + x^4_4 \cdot a^4_5 + x^4_5 \cdot a^4_8 + x^4_6 \cdot a^4_9 +$$
$$x^4_7 \cdot a^4_{10} + x^4_8 \cdot a^4_{11} + x^4_9 \cdot a^4_{14} + x^4_{10} \cdot a^4_{15} + x^4_{11} \cdot a^4_{16} + x^4_{12} \cdot a^4_{17} +$$
$$x^4_{13} \cdot a^4_{20} + x^4_{14} \cdot a^4_{21} + x^4_{15} \cdot a^4_{22} + x^4_{16} \cdot a^4_{23} + x^5_1 \cdot a^5_2 + x^5_2 \cdot a^5_3 +$$
$$x^5_3 \cdot a^5_4 + x^5_4 \cdot a^5_5 + x^5_5 \cdot a^5_8 + x^5_6 \cdot a^5_9 + x^5_7 \cdot a^5_{10} + x^5_8 \cdot a^5_{11} + x^5_9 \cdot a^5_{14} +$$
$$x^5_{10} \cdot a^5_{15} + x^5_1 \cdot a^5_{16} + x^5_{12} \cdot a^5_{17} + x^5_{13} \cdot a^5_{20} + x^5_{14} \cdot a^5_{21} +$$
$$x^5_{15} \cdot a^5_{22} + x^5_{16} \cdot a^5_{23} + x^6_1 \cdot a^6_2 + x^6_2 \cdot a^6_3 + x^6_3 \cdot a^6_4 + x^6_4 \cdot a^6_5 +$$
$$x^6_5 \cdot a^6_8 + x^6_6 \cdot a^6_9 + x^6_7 \cdot a^6_{10} + x^6_8 \cdot a^6_{11} + x^6_9 \cdot a^6_{14} + x^6_{10} \cdot a^6_{15} +$$
$$x^6_{11} \cdot a^6_{16} + x^6_{12} \cdot a^6_{17} + x^6_{13} \cdot a^6_{20} + x^6_{14} \cdot a^6_{21} + x^6_{15} \cdot a^6_{22} +$$
$$x^6_{16} \cdot a^6_{23} + x^7_1 \cdot a^7_2 + x^7_2 \cdot a^7_3 + x^7_3 \cdot a^7_4 + x^7_4 \cdot a^7_5 + x^7_5 \cdot a^7_8 + x^7_6 \cdot a^7_9 +$$
$$x^7_7 \cdot a^7_{10} + x^7_8 \cdot a^7_{110} + x^7_9 \cdot a^7_{14} + x^7_{10} \cdot a^7_{15} + x^7_{11} \cdot a^7_{16} + x^7_{12} \cdot a^7_{17} +$$
$$x^7_{13} \cdot a^7_{20} + x^7_{14} \cdot a^7_{21} + x^7_{15} \cdot a^7_{22} + x^7_{16} \cdot a^7_{23} + x^8_1 \cdot a^8_2 + x^8_2 \cdot a^8_3 +$$
$$x^8_3 \cdot a^8_4 + x^8_4 \cdot a^8_5 + x^8_5 \cdot a^8_8 + x^8_6 \cdot a^8_9 + x^8_7 \cdot a^8_{10} + x^8_8 \cdot a^8_{11} +$$
$$x^8_9 \cdot a^8_{14} + x^8_{10} \cdot a^8_{15} + x^8_{11} \cdot a^8_{16} + x^8_{12} \cdot a^8_{17} + x^8_{13} \cdot a^8_{20} +$$
$$x^8_{14} \cdot a^8_{210} + x^8_{15} \cdot a^8_{22} + x^8_{16} \cdot a^8_{23}.$$

As shown above, output element $o^2_2$ of converted output data matrix 216 is equal to output element $o^2_2$ of output data matrix 206$^2$.

Output element $o^2_3$ is the dot product of the second row of converted weight matrix 212, i.e., converted weight tensor 212$^2$, and the third column of converted input data matrix 214.

More particularly, output element $o^2_3$ is equal to $x^1_1 \cdot a^1_3 +$ $$x^1_2 \cdot a^1_4 + x^1_3 \cdot a^1_5 + x^1_4 \cdot a^1_6 + x^1_5 \cdot a^1_9 + x^1_6 \cdot a^1_{10} + x^1_7 \cdot a^1_{11} +$$
$$x^1_8 \cdot a^1_{12} + x^1_9 \cdot a^1_{15} + x^1_{10} \cdot a^1_{16} + x^1_{11} \cdot a^1_{17} + x^1_{12} \cdot a^1_{18} + x^1_{13} \cdot a^1_{21} +$$
$$x^1_{14} \cdot a^1_{22} + x^1_{15} \cdot a^1_{23} + x^1_{16} \cdot a^1_{24} + x^2_1 \cdot a^2_3 + x^2_2 \cdot a^2_4 + x^2_3 \cdot a^2_5 +$$
$$x^2_4 \cdot a^2_6 + x^2_5 \cdot a^2_9 + x^2_6 \cdot a^2_{10} + x^2_7 \cdot a^2_{11} + x^2_8 \cdot a^2_{12} + x^2_9 \cdot a^2_{15} +$$
$$x^2_{10} \cdot a^2_{16} + x^2_{11} \cdot a^2_{17} + x^2_{12} \cdot a^2_{18} + x^2_{13} \cdot a^2_{21} + x^2_{14} \cdot a^2_{22} +$$
$$x^2_{15} \cdot a^2_{23} + x^2_{16} \cdot a^2_{24} + x^3_1 \cdot a^3_3 + x^3_2 \cdot a^3_4 + x^3_3 \cdot a^3_5 + x^3_4 \cdot a^3_6 +$$
$$x^3_5 \cdot a^3_9 + x^3_6 \cdot a^3_{10} + x^3_7 \cdot a^3_{11} + x^3_8 \cdot a^3_{12} + x^3_9 \cdot a^3_{15} + x^3_{10} \cdot a^3_{16} +$$
$$x^3_{11} \cdot a^3_{17} + x^3_{12} \cdot a^3_{18} + x^3_{13} \cdot a^3_{21} + x^3_{14} \cdot a^3_{22} + x^3_{15} \cdot a^3_{23} +$$
$$x^3_{16} \cdot a^3_{24} + x^4_1 \cdot a^4_3 + x^4_2 \cdot a^4_4 + x^4_3 \cdot a^4_5 + x^4_4 \cdot a^4_6 + x^4_5 \cdot a^4_9 +$$
$$x^4_6 \cdot a^4_{10} + x^4_7 \cdot a^4_{11} + x^4_8 \cdot a^4_{12} + x^4_9 \cdot a^4_{15} + x^4_{10} \cdot a^4_{16} + x^4_{11} \cdot a^4_{17} +$$
$$x^4_{12} \cdot a^4_{18} + x^4_{13} \cdot a^4_{21} + x^4_{14} \cdot a^4_{22} + x^4_{15} \cdot a^4_{23} + x^4_{16} \cdot a^4_{24} + x^5_1 \cdot a^5_3 +$$
$$x^5_2 \cdot a^5_4 + x^5_3 \cdot a^5_5 + x^5_4 \cdot a^5_6 + x^5_5 \cdot a^5_9 + x^5_6 \cdot a^5_{10} + x^5_7 \cdot a^5_{11} +$$
$$x^5_8 \cdot a^5_{12} + x^5_9 \cdot a^5_{15} + x^5_{10} \cdot a^5_{16} + x^5_1 \cdot a^5_{17} + x^5_{12} \cdot a^5_{18} + x^5_{13} \cdot a^5_{21} +$$
$$x^5_{14} \cdot a^5_{22} + x^5_{15} \cdot a^5_{23} + x^5_{16} \cdot a^5_{24} + x^6_1 \cdot a^6_3 + x^6_2 \cdot a^6_4 + x^6_3 \cdot a^6_5 +$$
$$x^6_4 \cdot a^6_6 + x^6_5 \cdot a^6_9 + x^6_6 \cdot a^6_{10} + x^6_7 \cdot a^6_{11} + x^6_8 \cdot a^6_{12} + x^6_9 \cdot a^6_{15} +$$
$$x^6_{10} \cdot a^6_{16} + x^6_{11} \cdot a^6_{17} + x^6_{12} \cdot a^6_{18} + x^6_{13} \cdot a^6_{21} + x^6_{14} \cdot a^6_{22} +$$
$$x^6_{15} \cdot a^6_{23} + x^6_{16} \cdot a^6_{24} + x^7_1 \cdot a^7_3 + x^7_2 \cdot a^7_4 + x^7_3 \cdot a^7_5 + x^7_4 \cdot a^7_6 +$$
$$x^7_5 \cdot a^7_9 + x^7_6 \cdot a^7_{10} + x^7_7 \cdot a^7_{11} + x^7_8 \cdot a^7_{12} + x^7_9 \cdot a^7_{15} + x^7_{10} \cdot a^7_{16} +$$
$$x^7_{11} \cdot a^7_{17} + x^7_{12} \cdot a^7_{18} + x^7_{13} \cdot a^7_{21} + x^7_{14} \cdot a^7_{22} + x^7_{15} \cdot a^7_{23} +$$
$$x^7_{16} \cdot a^7_{24} + x^8_1 \cdot a^8_3 + x^8_2 \cdot a^8_4 + x^8_3 \cdot a^8_5 + x^8_4 \cdot a^8_6 + x^8_5 \cdot a^8_9 +$$

$x^8_6 \cdot a^8_{10} + x^8_7 \cdot a^8_{11} + x^8_8 \cdot a^8_{12} + x^8_9 \cdot a^8_{15} + x^8_{10} \cdot a^8_{16} + x^8_1 \cdot a^8_{17} + x^8_{12} \cdot a^8_{18} + x^8_{13} \cdot a^8_{21} + x^8_{14} \cdot a^8_{22} + x^8_{15} \cdot a^8_{23} + x^8_{16} \cdot a^8_{24}$.

As shown above, output element $o^2_3$ of converted output data matrix 216 is equal to output element $o^2_3$ of output data matrix 206$^2$.

The calculation of the output elements in quadrant $o^3_{q1}$ of converted output data matrix 216$^3$ follows.

Output element $o^3_1$ is the dot product of the third row of converted weight matrix 212, i.e., converted weight tensor 212$^3$, and the first column of converted input data matrix 214.

More particularly, output element $o^3_1$ is equal to $y^1_1 \cdot a^1_1 + y^1_2 \cdot a^1_2 + y^1_3 \cdot a^1_3 + y^1_4 \cdot a^1_4 + y^1_5 \cdot a^1_7 + y^1_6 \cdot a^1_8 + y^1_7 \cdot a^1_9 + y^1_8 \cdot a^1_{10} + y^1_9 \cdot a^1_{13} + y^1_{10} \cdot a^1_{14} + y^1_{11} \cdot a^1_{15} + y^1_{12} \cdot a^1_{16} + y^1_{13} \cdot a^1_{19} + y^1_{14} \cdot a^2_{20} + y^1_{15} \cdot a^2_{21} + y^1_{16} \cdot a^2_{22} + a^2_1 + y^2_2 \cdot a^2_2 + y^2_3 \cdot a^2_3 + y^2_4 \cdot a^2_4 + y^2_5 \cdot a^2_7 + y^2_6 \cdot a^2_8 + y^2_7 \cdot a^2_9 + y^2_8 \cdot a^2_{10} + y^2_9 \cdot a^2_{13} + y^2_{10} \cdot a^2_{14} + y^2_{11} \cdot a^2_{15} + y^2_{12} \cdot a^2_{16} + y^2_{13} \cdot a^2_{19} + y^2_{14} \cdot a^2_{20} + y^2_{15} \cdot a^2_{21} + y^2_{16} \cdot a^2_{22} + y^3_1 \cdot a^3_1 + y^3_2 \cdot a^3_3 + y^3_3 \cdot a^3_3 + y^3_4 \cdot a^3_4 + y^3_5 \cdot a^3_7 + y^3_6 \cdot a^3_8 + y^3_7 \cdot a^3_9 + y^3_8 \cdot a^3_{10} + y^3_9 \cdot a^3_{13} + y^3_{10}, \quad a^3_{14} + y^3_{11} \cdot a^3_{15} + y^3_{12} \cdot a^3_{16} + y^3_{13} \cdot a^3_{19} + y^3_{14} \cdot a^3_{20} + y^3_{15} \cdot a^3_{21} + y^3_{16} \cdot a^3_{22} + y^4_1 \cdot a^4_1 + y^4_2 \cdot a^4_2 + y^4_3 \cdot a^4_3 + y^4_4 \cdot a^4_5 + y^4_5 \cdot a^4_7 + y^4_6 \cdot a^4_8 + y^4_7 \cdot a^4_9 + y^4_8 \cdot a^4_{10} + y^4_9 \cdot a^4_{13} + y^4_{10} \cdot a^4_{14} + y^4_{11} \cdot a^4_{15} + y^4_{12} \cdot a^4_{16} + y^4_{13} \cdot a^4_{19} + y^4_{14} \cdot a^4_{20} + y^4_{15} \cdot a^4_{21} + y^4_7 \cdot a^4_{22} + y^5_1 \cdot a^5_1 + y^5_2 \cdot a^5_2 + y^5_3 \cdot a^5_3 + y^5_4 \cdot a^5_4 + y^5_5 \cdot a^5_7 + y^5_6 \cdot a^5_8 + y^5_7 \cdot a^5_9 + y^5_8 \cdot a^5_{10} + y^5_9 \cdot a^5_{13} + y^5_{10} \cdot a^5_4 + y^5_{11} \cdot a^5_{15} + y^5_{12} \cdot a^5_{16} + y^5_{13} \cdot a^5_{19} + y^5_{14} \cdot a^5_{20} + y^5_{15} \cdot a^5_{21} + y^5_{16} \cdot a^5_{22} + y^6_1 \cdot a^6_1 + y^6_2 \cdot a^6_2 + y^6_3 \cdot a^6_3 + y^6_4 \cdot a^6_4 + y^6_5 \cdot a^6_7 + y^6_6 \cdot a^6_8 + y^6_7 \cdot a^6_9 + y^6_8 \cdot a^6_{10} + y^6_9 \cdot a^6_{13} + y^6_{10} \cdot a^6_{14} + y^6_{11} \cdot a^6_{15} + y^6_{12} \cdot a^6_{16} + y^6_{13} \cdot a^6_{19} + y^6_{14} \cdot a^6_{20} + y^6_{15} \cdot a^6_{21} + y^6_{16} \cdot a^6_{22} + y^7_1 \cdot a^7_1 + y^7_2 \cdot a^7_2 + y^7_3 \cdot a^7_3 + y^7_4 \cdot a^7_4 + y^7_5 \cdot a^7_7 + y^7_6 \cdot a^7_8 + y^7_7 \cdot a^7_9 + y^7_8 \cdot a^7_{10} + y^7_9 \cdot a^7_{13} + y^7_{10} \cdot a^7_{14} + y^7_{11} \cdot a^7_{15} + y^7_{12} \cdot a^7_{16} + y^7_{13} \cdot a^7_{19} + y^7_{14} \cdot a^2_{20} + y^7_{15} \cdot a^2_{21} + y^7_{16} \cdot a^7_{22} + y^8_1 \cdot a^8_1 + y^8_2 \cdot a^8_2 + y^8_3 \cdot a^8_3 + y^8_4 \cdot a^8_4 + y^8_5 \cdot a^8_7 + y^8_6 \cdot a^8_8 + y^8_7 \cdot a^8_9 + y^8_8 \cdot a^8_{10} + y^8_9 \cdot a^8_{13} + y^8_{10} \cdot a^8_{14} + y^8_{11} \cdot a^8_{15} + y^8_{12} \cdot a^8_{16} + y^8_{13} \cdot a^8_{19} + y^8_{14} \cdot a^8_{20} + y^8_{15} \cdot a^8_{21} + y^8_{16} \cdot a^8_{22}$.

As shown above, output element $o^3_1$ of converted output data matrix 216 is equal to output element $o^3_1$ of output data matrix 206$^3$.

Output element $o^3_2$ is the dot product of the third row of converted weight matrix 212, i.e., converted weight tensor 212$^3$, and the second column of converted input data matrix 214.

More particularly, output element $o^3_2$ is equal to $y^1_1 \cdot a^1_2 + y^1_2 \cdot a^1_3 + y^1_3 \cdot a^1_4 + y^1_4 \cdot a^1_5 + y^1_5 \cdot a^1_8 + y^1_6 \cdot a^1_9 + y^1_7 \cdot a^1_{10} + y^1_8 \cdot a^1_{11} + y^1_9 \cdot a^1_{14} + y^1_{10} \cdot a^1_{15} + y^1_{11} \cdot a^1_{16} + y^1_{12} \cdot a^1_{17} + y^1_{13} \cdot a^1_{20} + y^1_{14} \cdot a^2_{21} + y^1_{15} \cdot a^1_{22} + y^1_{16} \cdot a^1_{23} + a^2_2 \cdot a^2_2 + y^2_2 \cdot a^2_3 + y^2_3 \cdot a^2_4 + y^2_4 \cdot a^2_5 + y^2_5 \cdot a^2_8 + y^2_6 \cdot a^2_9 + y^2_7 \cdot a^2_{10} + y^2_8 \cdot a^2_{11} + y^2_9 \cdot a^2_{14} + y^2_{10} \cdot a^2_{15} + y^2_{11} \cdot a^2_{16} + y^2_{12} \cdot a^2_{17} + y^2_{13} \cdot a^2_{20} + y^2_{14} \cdot a^2_{21} + y^2_{15} \cdot a^2_{22} + y^2_{16} \cdot a^2_{23} + y^3_1 \cdot a^3_3 + y^3_2 \cdot a^3_3 + y^3_3 \cdot a^3_4 + y^3_4 \cdot a^3_5 + y^3_5 \cdot a^3_8 + y^3_6 \cdot a^3_9 + y^3_7 \cdot a^3_{10} + y^3_8 \cdot a^3_{11} + y^3_9 \cdot a^3_{14} + y^3_{10} \cdot a^3_{15} + y^3_{11} \cdot a^3_{16} + y^3_{12} \cdot a^3_{17} + y^3_{13} \cdot a^3_{20} + y^3_{14} \cdot a^3_{21} + y^3_{15} \cdot a^3_{22} + y^3_{16} \cdot a^3_{23} + y^4_1 \cdot a^4_2 + y^4_2 \cdot a^4_3 + y^4_3 \cdot a^4_4 + y^4_4 \cdot a^4_5 + y^4_5 \cdot a^4_8 + y^4_6 \cdot a^4_9 + y^4_7 \cdot a^4_{10} + y^4_8 \cdot a^4_{11} + y^4_9 \cdot a^4_{14} + y^4_{10} \cdot a^4_{15} + y^4_{11} \cdot a^4_{16} + y^4_{12} \cdot a^4_{17} + y^4_{13} \cdot a^4_{20} + y^4_{14} \cdot a^4_{21} + y^4_{15} \cdot a^4_{22} + y^4_{16} \cdot a^4_{23} + y^5_1 \cdot a^5_2 + y^5_2 \cdot a^5_3 + y^5_3 \cdot a^5_4 + y^5_4 \cdot a^5_5 + y^5_5 \cdot a^5_8 + y^5_6 \cdot a^5_9 + y^5_7 \cdot a^5_{10} + y^5_8 \cdot a^5_{11} + y^5_9 \cdot a^5_{14} + y^5_{10} \cdot a^5_{15} + y^5_{11} \cdot a^5_{16} + y^5_{12} \cdot a^5_{17} + y^5_{13} \cdot a^5_{20} + y^5_{14} \cdot a^5_{21} + y^5_{15} \cdot a^5_{22} + y^5_{16} \cdot a^5_{23} + y^6_1 \cdot a^6_2 + y^6_2 \cdot a^6_3 + y^6_3 \cdot a^6_4 + y^6_4 \cdot a^6_5 + y^6_5 \cdot a^6_8 + y^6_6 \cdot a^6_9 + y^6_7 \cdot a^6_{10} + y^6_8 \cdot a^6_{11} + y^6_9 \cdot a^6_{14} + y^6_{10} \cdot a^6_{15} + y^6_1 \cdot a^6_{16} + y^6_{12} \cdot a^6_{17} + y^6_{13} \cdot a^6_{20} + y^6_{14} \cdot a^6_{21} + y^6_{15} \cdot a^6_{22} + y^6_{16} \cdot a^6_{23} + y^7_1 \cdot a^7_2 + y^7_2 \cdot a^7_3 + y^7_3 \cdot a^7_4 + y^7_4 \cdot a^7_5 + y^7_5 \cdot a^7_8 + y^7_6 \cdot a^7_9 + y^7_7 \cdot a^7_{10} + y^7_8 \cdot a^7_{110} + y^7_9 \cdot a^7_{14} + y^7_{10} \cdot a^7_{15} + y^7_{11} \cdot a^7_{16} + y^7_{12} \cdot a^7_{17} + y^7_{13} \cdot a^7_{20} + y^7_{14} \cdot a^7_{21} + y^7_{15} \cdot a^7_{22} + y^8_{16} \cdot a^8_{23} + y^8_1 \cdot a^8_2 + y^8_2 \cdot a^8_3 + y^8_3 \cdot a^8_4 + y^8_4 \cdot a^8_5 + y^8_5 \cdot a^8_8 + y^8_6 \cdot a^8_9 + y^8_7 \cdot a^8_{10} + y^8_8 \cdot a^8_{11} + y^8_9 \cdot a^8_{14} + y^8_{10} \cdot a^8_{15} + y^8_{11} \cdot a^8_{16} + y^8_{12} \cdot a^8_{17} + y^8_{13} \cdot a^8_{20} + y^8_{14} \cdot a^8_{210} + y^8_{15} \cdot a^8_{22} + y^8_{16} \cdot a^8_{23}$.

As shown above, output element $o^3_2$ of converted output data matrix 216 is equal to output element $o^3_2$ of output data matrix 206$^3$.

Output element $o^3$ is the dot product of the third row of converted weight matrix 212, i.e., converted weight tensor 212$^3$, and the third column of converted input data matrix 214.

More particularly, output element $o^3_3$ is equal to $y^1_1 \cdot a^1_3 + y^1_2 \cdot a^1_4 + y^1_3 \cdot a^1_5 + y^1_4 \cdot a^1_6 + y^1_5 \cdot a^1_9 + y^1_6 \cdot a^1_{10} + y^1_7 \cdot a^1_{11} + y^1_8 \cdot a^1_{12} + y^1_9 \cdot a^1_{15} + y^1_{10} \cdot a^1_{16} + y^1_{11} \cdot a^1_{17} + y^1_{12} \cdot a^1_{18} + y^1_{13} \cdot a^1_{21} + y^1_{14} \cdot a^1_{22} + y^1_{15} \cdot a^1_{23} + y^1_{16} \cdot a^1_{24} + a^2_1 \cdot a^2_3 + y^2_2 \cdot a^2_4 + y^2_3 \cdot a^2_5 + y^2_4 \cdot a^2_6 + y^2_5 \cdot a^2_9 + y^2_6 \cdot a^2_{10} + y^2_7 \cdot a^2_{11} + y^2_8 \cdot a^2_{12} + y^2_9 \cdot a^2_{15} + y^2_{10} \cdot a^2_{16} + y^2_{11} \cdot a^2_{17} + y^2_{12} \cdot a^2_{18} + y^2_{13} \cdot a^2_{21} + y^2_{14} \cdot a^2_{22} + y^2_{15} \cdot a^2_{23} + y^2_{16} \cdot a^2_{24} + y^3_1 \cdot a^3_3 + y^3_2 \cdot a^3_4 + y^3_3 \cdot a^3_5 + y^3_4 \cdot a^3_6 + y^3_5 \cdot a^3_9 + y^3_6 \cdot a^3_{10} + y^3_7 \cdot a^3_{11} + y^3_8 \cdot a^3_{12} + y^3_9 \cdot a^3_{15} + y^3_{10} \cdot a^3_{16} + y^3_{11} \cdot a^3_{17} + y^3_{12} \cdot a^3_{18} + y^3_{13} \cdot a^3_{21} + y^3_{14} \cdot a^3_{22} + y^3_{15} \cdot a^3_{23} + y^3_{16} \cdot a^3_{24} + y^4_1 \cdot a^4_3 + y^4_2 \cdot a^4_4 + y^4_3 \cdot a^4_5 + y^4_4 \cdot a^4_6 + y^4_5 \cdot a^4_9 + y^4_6 \cdot a^4_{10} + y^4_7 \cdot a^4_{11} + y^4_8 \cdot a^4_{12} + y^4_9 \cdot a^4_{15} + y^4_{10} \cdot a^4_{16} + y^4_{11} \cdot a^4_{17} + y^4_{12} \cdot a^4_{18} + y^4_{13} \cdot a^4_{21} + y^4_{14} \cdot a^4_{22} + y^4_{15} \cdot a^4_{23} + y^4_{16} \cdot a^4_{24} + y^5_1 \cdot a^5_3 + y^5_2 \cdot a^5_4 + y^5_3 \cdot a^5_5 + y^5_4 \cdot a^5_6 + y^5_5 \cdot a^5_9 + y^5_6 \cdot a^5_{10} + y^5_7 \cdot a^5_{11} + y^5_8 \cdot a^5_{12} + y^5_9 \cdot a^5_{15} + y^5_{10} \cdot a^5_{16} + y^5_{11} \cdot a^5_{17} + y^5_{12} \cdot a^5_{18} + y^5_{13} \cdot a^5_{21} + y^5_{14} \cdot a^5_{22} + y^5_{15} \cdot a^5_{23} + y^5_{16} \cdot a^5_{24} + y^6_1 \cdot a^6_3 + y^6_2 \cdot a^6_4 + y^6_3 \cdot a^6_5 + y^6_4 \cdot a^6_6 + y^6_5 \cdot a^6_9 + y^6_6 \cdot a^6_{10} + y^6_7 \cdot a^6_{11} + y^6_8 \cdot a^6_{12} + y^6_9 \cdot a^6_{15} + y^6_{10} \cdot a^6_{16} + y^6_{11} \cdot a^6_{17} + y^6_{12} \cdot a^6_{18} + y^6_{13} \cdot a^6_{21} + y^6_{14} \cdot a^6_{22} + y^6_{15} \cdot a^6_{23} + y^6_{16} \cdot a^6_{24} + y^7_1 \cdot a^7_3 + y^7_2 \cdot a^7_4 + y^7_3 \cdot a^7_5 + y^7_4 \cdot a^7_6 + y^7_5 \cdot a^7_9 + y^7_6 \cdot a^7_{10} + y^7_7 \cdot a^7_{11} + y^7_8 \cdot a^7_{12} + y^7_9 \cdot a^7_{15} + y^7_{10} \cdot a^7_{16} + y^7_{11} \cdot a^7_{17} + y^7_{12} \cdot a^7_{18} + y^7_{13} \cdot a^2_1 + y^7_{14} \cdot a^7_{22} + y^7_{15} \cdot a^7_{23} + y^8_{16} \cdot a^8_{24} + y^8_1 \cdot a^8_3 + y^8_2 \cdot a^8_4 + y^8_3 \cdot a^8_5 + y^8_4 \cdot a^8_6 + y^8_5 \cdot a^8_9 + y^8_6 \cdot a^8_{10} + y^8_7 \cdot a^8_{11} + y^8_8 \cdot a^8_{12} + y^8_9 \cdot a^8_{15} + y^8_{10} \cdot a^8_{16} + y^8_{11} \cdot a^8_{17} + y^8_{12} \cdot a^8_{18} + y^8_{13} \cdot a^8_{21} + y^8_{14} \cdot a^8_{22} + y^8_{15} \cdot a^8_{23} + y^8_{16} \cdot a^8_{24}$.

As shown above, output element $o^3_3$ of converted output data matrix 216 is equal to output element $o^3_3$ of output data matrix 206$^3$.

The remaining output elements of converted output data matrix 216 are calculated in a similar manner.

For converted output data matrix 216$^1$, output element $o^1_4$ is the dot product of converted weight tensor 212$^1$ and the fourth column of converted input data matrix 214, output element $o^1_5$ is the dot product of converted weight tensor 212$^1$ and the fifth column of converted input data matrix 214, output element $o^1_6$ is the dot product of converted weight tensor 212$^1$ and the sixth column of converted input data matrix 214, output element $o^1_7$ is the dot product of converted weight tensor 212$^1$ and the seventh column of converted input data matrix 214, output element $o^1_8$ is the dot product of converted weight tensor 212$^1$ and the eighth column of converted input data matrix 214, and output element $o^1_9$ is the dot product of converted weight tensor 212$^1$ and the ninth column of converted input data matrix 214.

For converted output data matrix 216$^2$, output element $o^2_4$ is the dot product of converted weight tensor 212$^2$ and the fourth column of converted input data matrix 214, output element $o^2_5$ is the dot product of converted weight tensor 212$^2$ and the fifth column of converted input data matrix 214, output element $o^2_6$ is the dot product of converted weight tensor 212$^2$ and the sixth column of converted input data matrix 214, output element $o^2_7$ is the dot product of converted weight tensor 212$^2$ and the seventh column of converted input data matrix 214, output element $o^2_8$ is the dot product of converted weight tensor 212$^2$ and the eighth column of converted input data matrix 214, and output element $o^2_9$ is the dot product of converted weight tensor 212$^2$ and the ninth column of converted input data matrix 214.

For converted output data matrix 216$^3$, output element $o^3_4$ is the dot product of converted weight tensor 212$^3$ and the fourth column of converted input data matrix 214, output element $o^3_5$ is the dot product of converted weight tensor 212$^3$ and the fifth column of converted input data matrix

214, output element $o^3_6$ is the dot product of converted weight tensor $212^3$ and the sixth column of converted input data matrix 214, output element $o^3_7$ is the dot product of converted weight tensor $212^3$ and the seventh column of converted input data matrix 214, output element $o^3_8$ is the dot product of converted weight tensor $212^3$ and the eighth column of converted input data matrix 214, and output element $o^3_9$ is the dot product of converted weight tensor $212^3$ and the ninth column of converted input data matrix 214.

Figure 3:
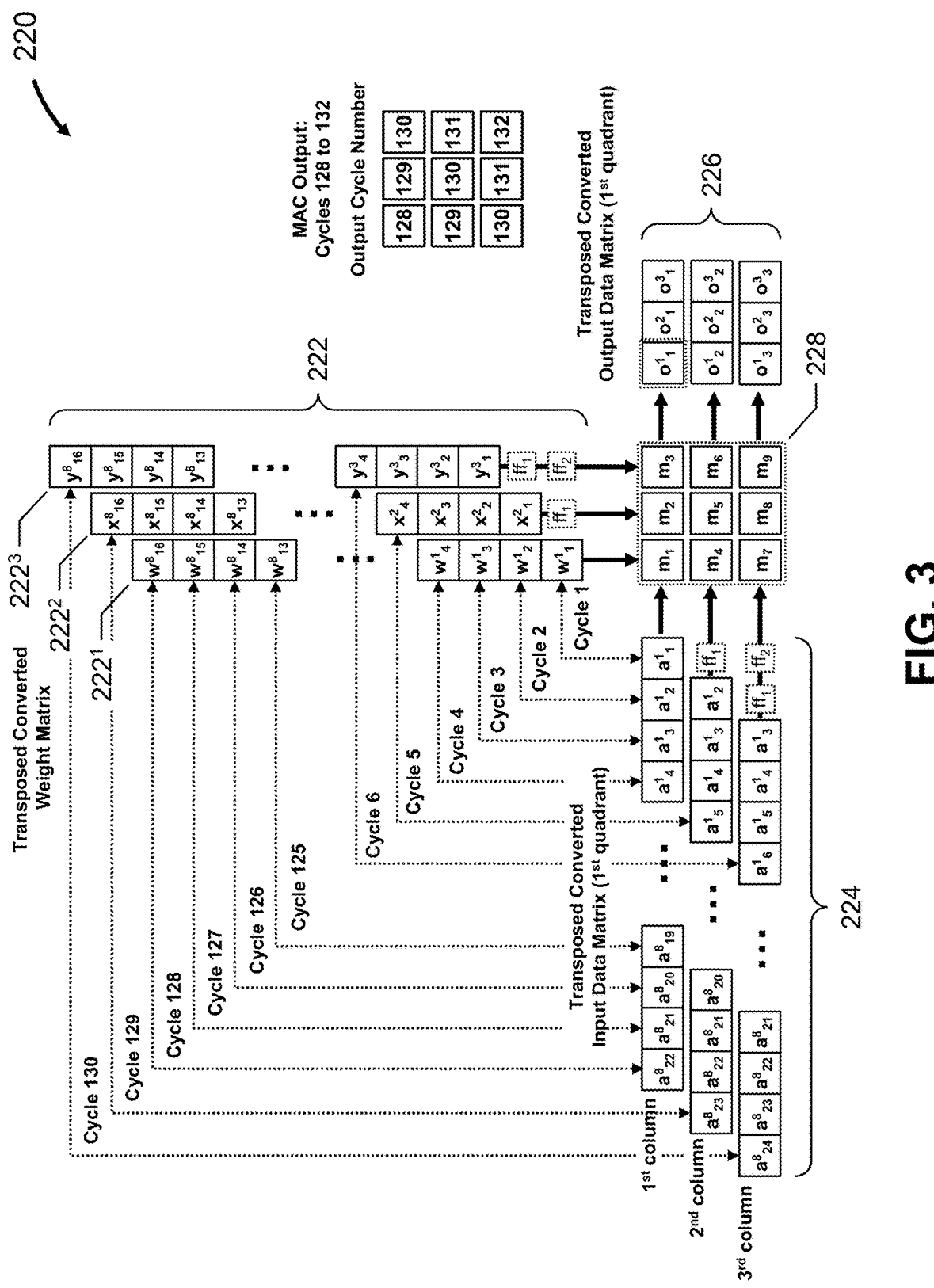
FIG. 3 depicts a data flow diagram for a MAC array, in accordance with an embodiment of the present disclosure.

FIG. 3 depicts data flow diagram 220 for MAC array 228, in accordance with an embodiment of the present disclosure.

As noted above, GEMM operations may be implemented in a dedicated ANN hardware accelerator using an array of MAC units. In this embodiment, MAC array 228 is a systolic, output stationary array that implements converted convolution operation 210 using a 3×3 array of MAC units $m_1, \ldots, m_9$. The orientation of transposed converted weight matrix 222, transposed converted input data matrix 224, and transposed converted output data matrix 226 relative to MAC array 228 simplifies illustration; other orientations are also contemplated. As discussed above, each MAC unit calculates a dot product, between a row of converted weight matrix 212 and a column of converted input data matrix 214, to generate an element of converted output data matrix 216.

Generally, a MAC unit includes, inter alia, a multiplier, an adder and a storage register. Each MAC unit is reset by clearing or zeroing its storage register prior to, or at the start of, a new dot product calculation. Generally, the rows from converted weight matrix 212 are read from local memory, a register, etc., enter MAC array 228 at the first row of MAC units $m_1$, $m_2$ and $m_3$, and propagate one MAC unit down at the beginning of each processing cycle. Similarly, the columns from converted input data matrix 214 are read from local memory, a register, etc., enter MAC array 228 at the first column of MAC units $m_1$, $m_4$ and $m_7$, and propagate one MAC unit to the right at the beginning of each processing cycle. The dot product calculations performed by MAC unit $m_1$ for the blocks of the first quadrants $a^1_{q1}$, $a^2_{q1}$ and $a^3_{q1}$ of converted input data matrix 214 are discussed in detail below, while the dot product calculations performed by the remaining MAC units of MAC array 228 are summarized below.

MAC unit $m_1$ calculates the dot product of the first row of converted weight matrix 212 (i.e., converted weight tensor $212^1$) and the first column of converted input data matrix 214 to generate element $o^1_1$ of converted output data matrix 216. During the processing cycle 1, MAC unit $m_1$ receives $a^1_1$ and $w^1_1$ from local memory, multiplies $a^1_1$ and $w^1_1$ to generate an intermediate product, adds the intermediate product to the value stored in the storage register (i.e., 0), and stores the accumulated result back in the storage register. During processing cycle 2, MAC unit $m_1$ transmits $a_1$ to MAC unit $m_2$ and $w^1_1$ to MAC unit $m_4$, receives $a^1_2$ and $w^1_2$ from local memory, multiplies $a^1_2$ and $w^1_2$ to generate an intermediate product, adds the intermediate product to the value stored in the storage register, and stores the accumulated result back in the storage register. During processing cycle 3, MAC unit $m_1$ transmits $a^1_2$ to MAC unit $m_2$ and $w^1_2$ to MAC unit $m_4$, receives $a^1_3$ and $w^1_3$ from local memory, multiplies $a^1_3$ and $w^1_3$ to generate an intermediate product, adds the intermediate product to the value stored in the storage register, and stores the accumulated result back in the storage register. During processing cycle 4, MAC unit $m_1$ transmits $a^1_3$ to MAC unit $m_2$ and $w^1_3$ to MAC unit $m_4$, receives $a^1_4$ and $w^1_4$ from the local memory, multiplies $a^1_4$ and $w^1_4$ to generate an intermediate product, adds the intermediate product to the value stored in the storage register, and stores the accumulated result back in storage register.

Processing cycles 5 through 128 multiply and accumulate the remaining 124 elements of the first row of converted weight matrix 212 and the first column of converted input data matrix 214. At the end of the processing cycle 128, MAC unit $m_1$ outputs element $o^1_1$. The remainder of the first row of MAC array 228 includes MAC units $m_2$ and $m_3$.

After an initial delay of one processing cycle, MAC unit $m_2$ receives weights from the first delay register $ff_1$ and input data from MAC unit $m_1$, transmits weights to MAC unit $m_5$ and input data to MAC unit $m_3$, and calculates the dot product of the second row of converted weight matrix 212 (i.e., converted weight tensor $212^2$) and the first column of converted input data matrix 214 to generate element $o^2_1$ of converted output data matrix 216. The initial delay of one processing cycle allows the delay pipeline (i.e., delay register $ff_1$) to be filled with weights transferred from memory, and the input data to become available from MAC unit $m_1$. At the end of the processing cycle 129, MAC unit $m_2$ outputs element $o^2_1$.

After an initial delay of two processing cycles, MAC unit $m_3$ receives weights from the second delay register $ff_2$ and input data from MAC unit $m_2$, transmits weights to MAC unit $m_6$, and calculates the dot product of the third row of converted weight matrix 212 (i.e., converted weight tensor $212^3$) and the first column of converted input data matrix 214 to generate element $o^3_1$ of converted output data matrix 216. The initial delay of two processing cycles allows the delay pipeline (i.e., delay registers $ff_1$ and $ff_2$) to be filled with weights transferred from memory, and the input data to become available from MAC unit $m_2$. At the end of processing cycle 130, MAC unit $m_3$ outputs element $o^3_1$.

The second row of MAC array 228 includes MAC units $m_4$, $m_5$ and $m_6$. After an initial delay of one processing cycle, MAC unit $m_4$ receives weights from MAC unit $m_1$ and input data from a first delay register $ff_1$, transmits weights to MAC unit $m_7$ and input data to MAC unit $m_5$, and calculates the dot product of the first row of converted weight matrix 212 (i.e., converted weight tensor $212^1$) and the second column of converted input data matrix 214 to generate element $o^1_2$ of converted output data matrix 216. The initial delay of one processing cycle allows the delay pipeline (i.e., delay register $ff_1$) to be filled with input data transferred from memory, and the weights to become available from MAC unit $m_1$. At the end of processing cycle 129, MAC unit $m_4$ outputs element $o^1_2$.

After an initial delay of two processing cycles, MAC unit $m_5$ receives weights from MAC unit $m_2$ and input data from MAC unit $m_4$, transmits weights to MAC unit ma and input data to MAC unit $m_6$, and calculates the dot product of the second row of converted weight matrix 212 (i.e., converted weight tensor $212^2$) and the second column of converted input data matrix 214 to generate element $o^2_2$ of converted output data matrix 216. The initial delay of two processing cycles allows the weights to become available from MAC unit $m_2$, and the input data to become available from MAC unit $m_4$. At the end of processing cycle 130, MAC unit $m_5$ outputs element $o^2_2$.

After an initial delay of three processing cycles, MAC unit $m_6$ receives weights from MAC unit $m_3$ and input data from MAC unit $m_5$, transmits weights to MAC unit $m_9$, and calculates the dot product of the third row of converted weight matrix 212 (i.e., converted weight tensor $212^3$) and the second column of converted input data matrix 214 to generate element $o^3_2$ of converted output data matrix 216.

The initial delay of three processing cycles allows the weights to become available from MAC unit $m_3$, and the input data to become available from MAC unit $m_5$. At the end of processing cycle 131, MAC unit $m_6$ outputs element $o^3_2$.

The third row of MAC array 228 includes MAC units $m_7$, $m_8$ and $m_9$.

After an initial delay of two processing cycles, MAC unit $m_7$ receives weights from MAC unit $m_4$ and input data from a second delay register $ff_2$, transmits input data to MAC unit $m_8$, and calculates the dot product of the first row of converted weight matrix 212 (i.e., converted weight tensor $212^1$) and the third column of converted input data matrix 214 to generate element $o^1_3$ of converted output data matrix 216. The initial delay of two processing cycles allows the delay pipeline (i.e., delay registers $ff_1$ and $ff_2$) to be filled with input data transferred from memory, and the weights to become available from MAC unit $m_4$. At the end of processing cycle 130, MAC unit $m_7$ outputs element $o^1_3$.

After an initial delay of three processing cycles, MAC unit ma receives weights from MAC unit $m_5$ and input data from MAC unit $m_7$, transmits input data to MAC unit $m_8$, and calculates the dot product of the second row of converted weight matrix 212 (i.e., converted weight tensor $212^2$) and the third column of converted input data matrix 214 to generate element $o^2_3$ of converted output data matrix 216. The initial delay of three processing cycles allows the weights to become available from MAC unit $m_5$, and the input data to become available from MAC unit $m_7$. At the end of processing cycle 131, MAC unit ma outputs element $o^2_3$.

After an initial delay of four processing cycles, MAC unit me receives weights from MAC unit $m_6$ and input data from MAC unit $m_8$, and calculates the dot product of the third row of converted weight matrix 212 (i.e., converted weight tensor $212^3$) and the third column of converted input data matrix 214 to generate element $o^3_3$ of converted output data matrix 216. The initial delay of four processing cycles allows the weights to become available from MAC unit $m_6$, and the input data to become available from MAC unit me. At the end of processing cycle 132, MAC unit me outputs element $o^3_3$.

After the blocks of the first quadrants $a^1_{q1}$, $a^2_{q1}$, and $a^3_{q1}$ of converted input data matrix 214 have been processed, the next sequence of operations processes the blocks of the second quadrants $a^1_{q2}$, $a^2_{q2}$, and $a^3_{q2}$. After the blocks of the second quadrants $a^1_{q2}$, $a^2_{q2}$, and $a^3_{q2}$ have been processed, the next sequence of operations processes the blocks of the third quadrants $a^1_{q3}$, $a^2_{q3}$, and $a^3_{q3}$. Converted weight matrix 212 is accessed for each sequence of operations.

Unfortunately, for CNNs executing on CPUs, GPUs, NPUs, etc., GEMM operations consume a significant number of processor cycles due to the large number of multiplications that are required. For example, one known image recognition CNN requires 3 giga operations per second (GOPS) per input data frame. Compounding this problem, many of the ANN matrices upon which GEMM operations are performed are sparse, which produces a very inefficient use of storage resources. More particularly, CNN weight tensors are stored in a dense or uncompressed form, even though the weights typically contain a significant amount of zero values.

Figure 4A:
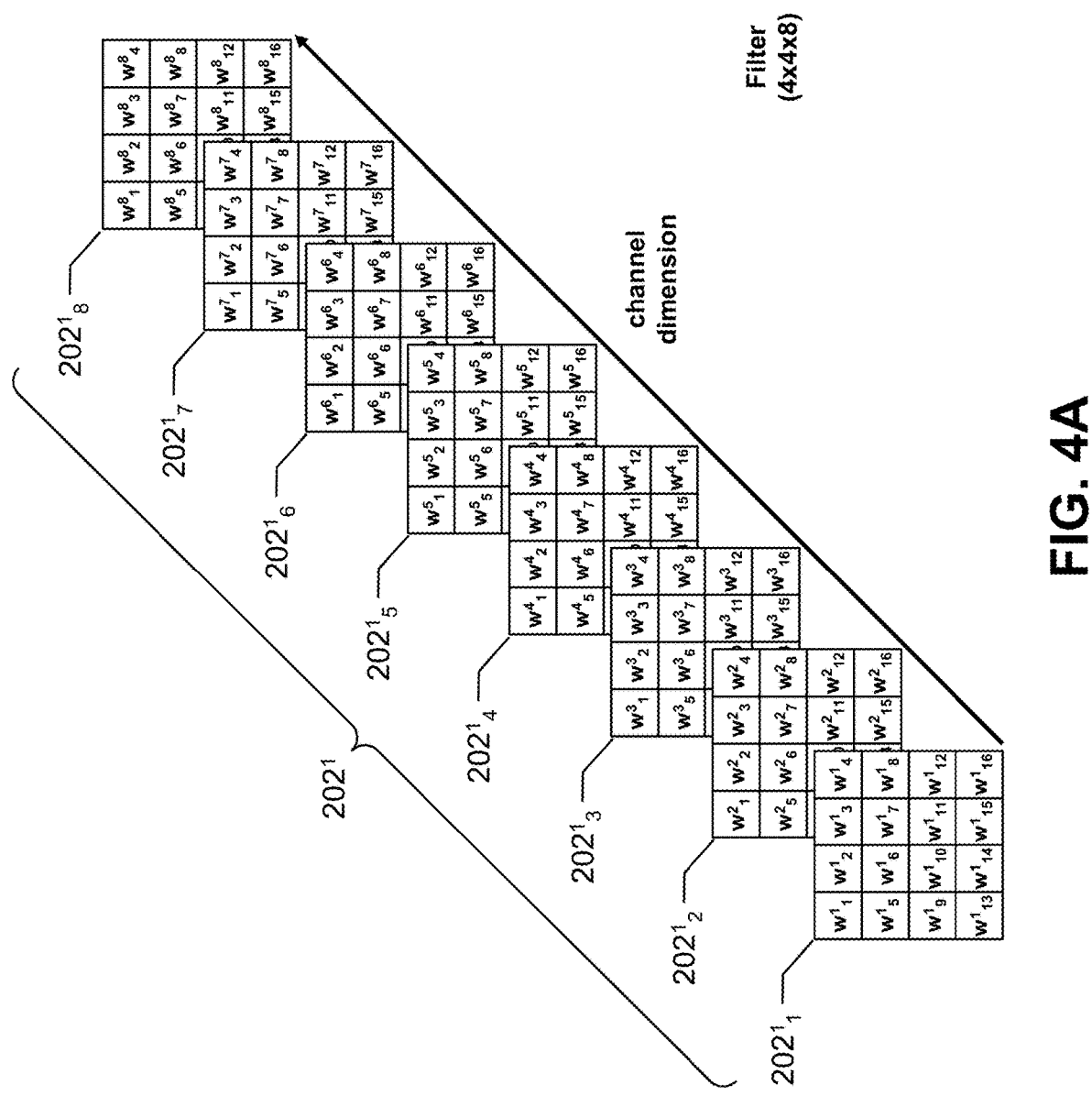
FIGS. 4A, 4B and 4C depict weight tensors, in accordance with an embodiment of the present disclosure.
Figure 4B:
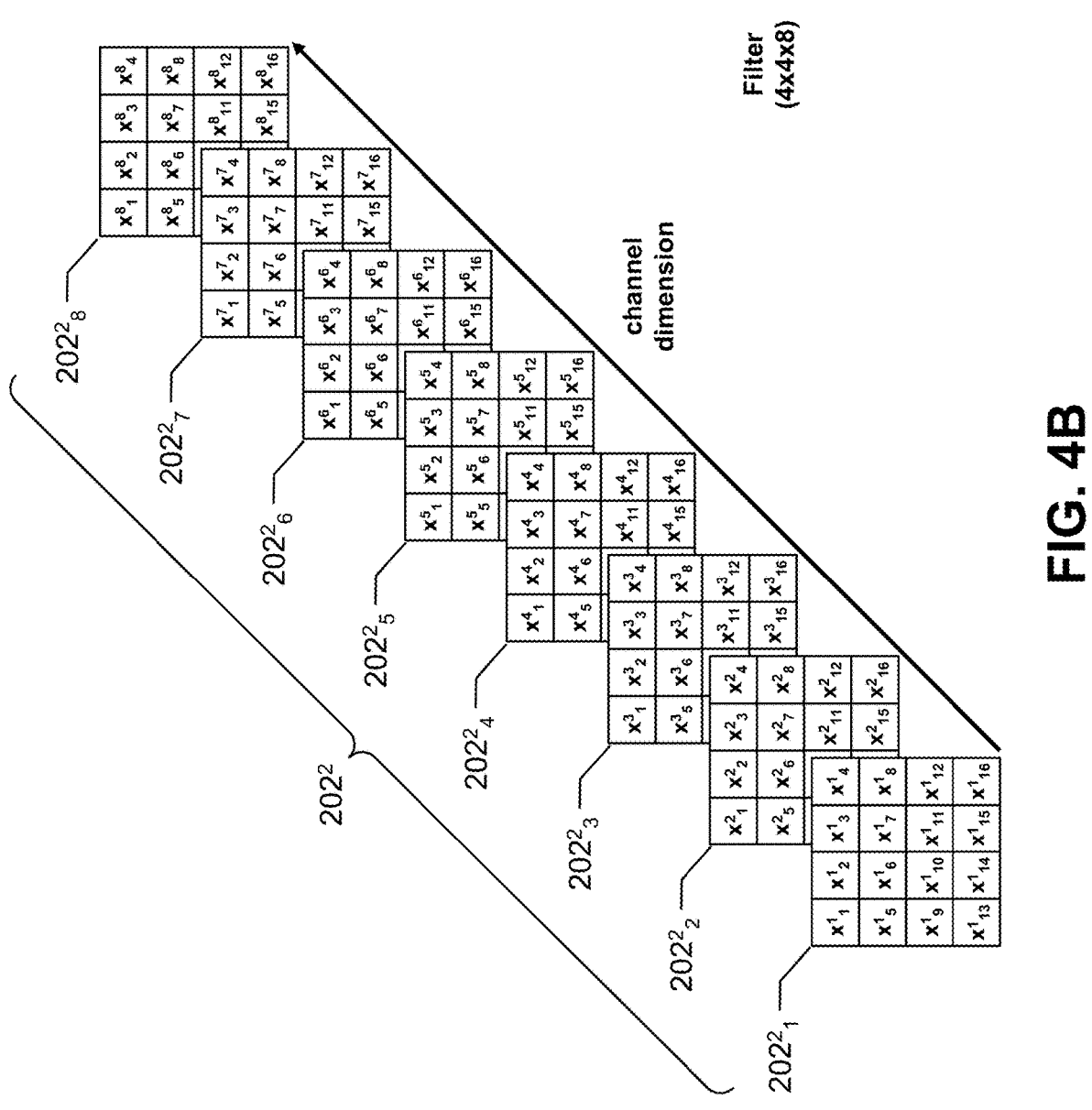
Figure 4C:
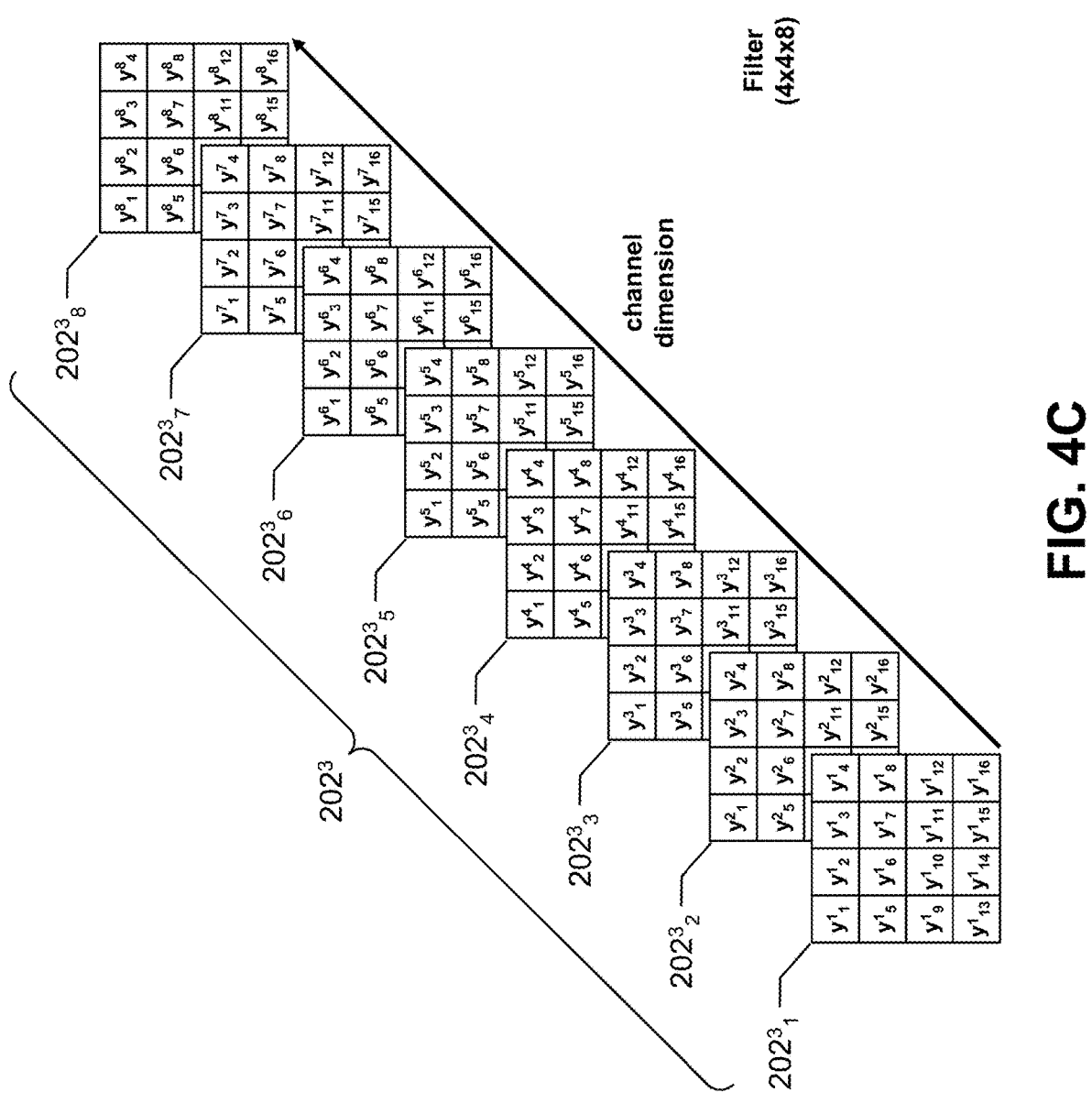

Embodiments of the present disclosure advantageously provide a matrix encoding process that reduces storage requirements and provides flexibility in both quantization and pruning within a fixed block size format. More particularly, embodiments of the present disclosure advantageously provide a block-based encoding process for ANN matrices, such as weight tensors, that is of fixed storage size, but allows trade-off in the matrix elements between zero values, smaller magnitude values and larger magnitude values. Many embodiments of the present disclosure also provide a fixed computation size per block, which is advantageous in many situations FIGS. 4A, 4B and 4C depict weight tensors $202^1$, $202^2$ and $202^3$ respectively, in accordance with an embodiment of the present disclosure.

As discussed above, each weight tensor $202^i$ includes one 4×4 weight matrix for each input channel, i.e., weight matrices $202^i_1$, $202^i_2$, $202^i_3$, $202^i_4$, $202^i_5$, $202^i_6$, $202^i_7$ and $202^i_8$, so weight tensor $202^1$ includes weight matrices $202^1_1$, $202^1_2$, $202^1_3$, $202^1_4$, $202^1_5$, $202^1_6$, $202^1_7$ and $202^1_8$, weight tensor $202^2$ includes weight matrices $202^2_1$, $202^2_2$, $202^2_3$, $202^2_4$, $202^2_5$, $202^2_6$, $202^2_7$ and $202^2_8$, and weight tensor $202^3$ includes weight matrices $202^3_1$, $202^3_2$, $202^3_3$, $202^3_4$, $202^3_5$, $202^3_6$, $202^3_7$ and $202^3_8$.

Figure 5A:
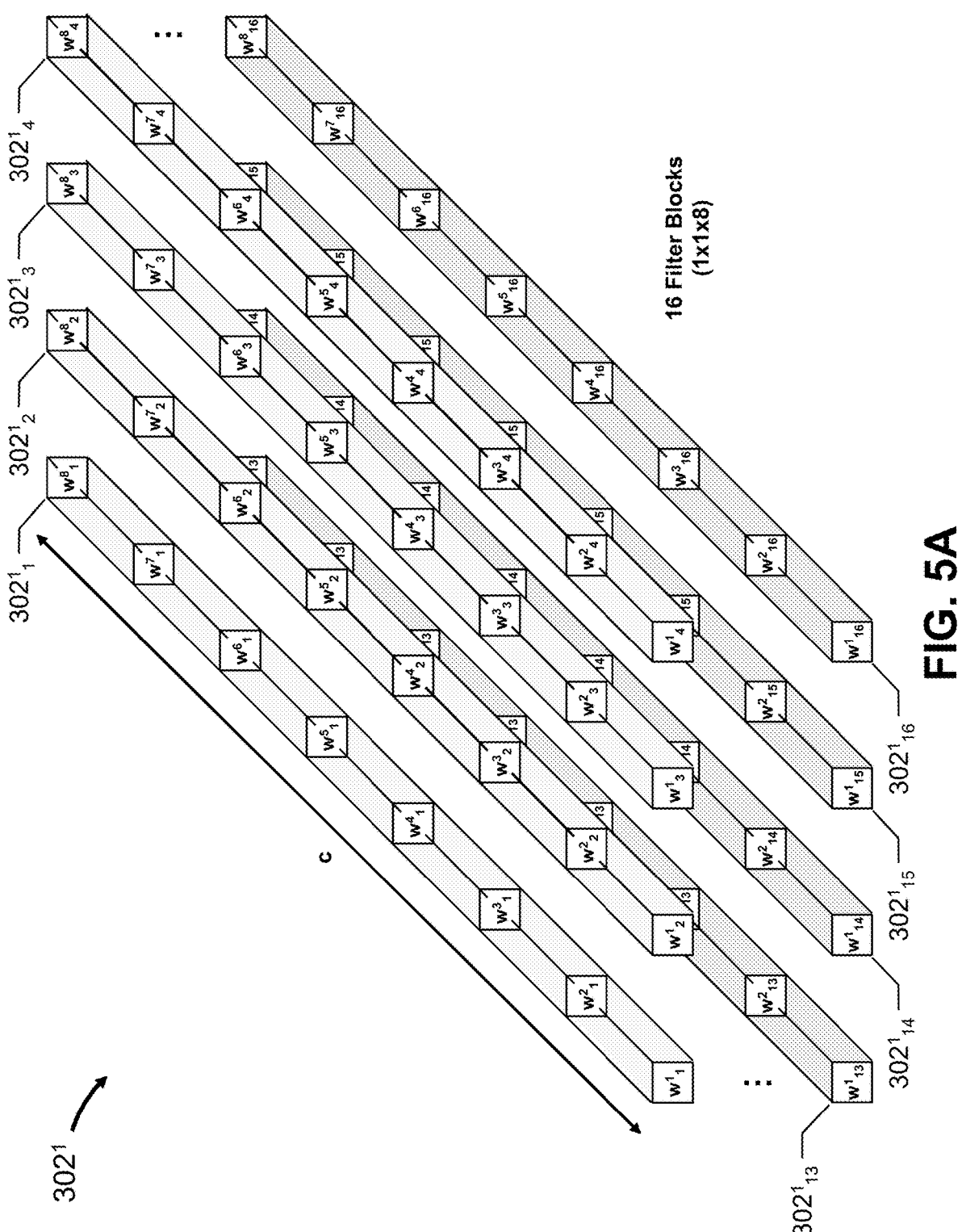
FIGS. 5A, 5B and 5C depict basic block sets, in accordance with an embodiment of the present disclosure.
Figure 5B:
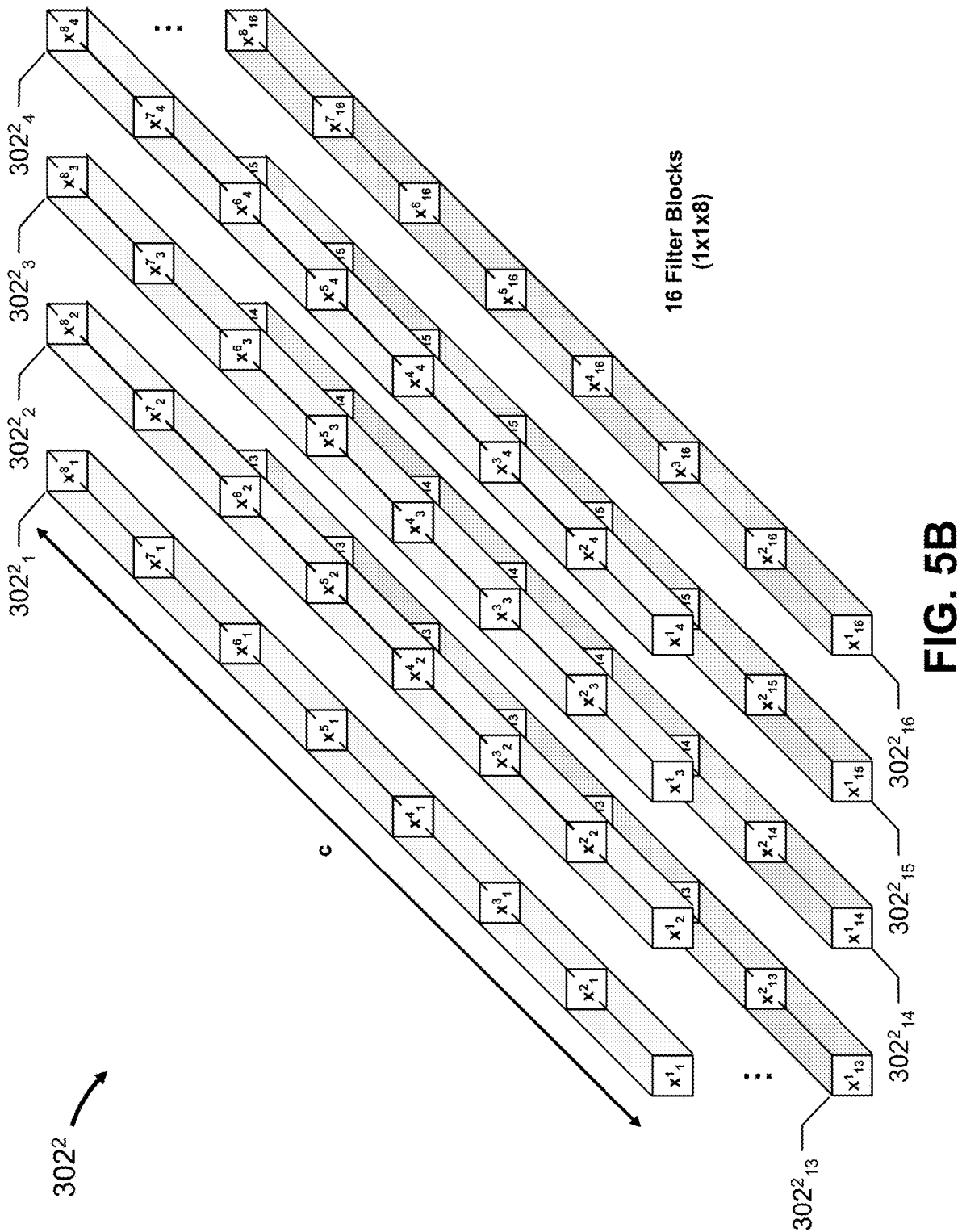
Figure 5C:
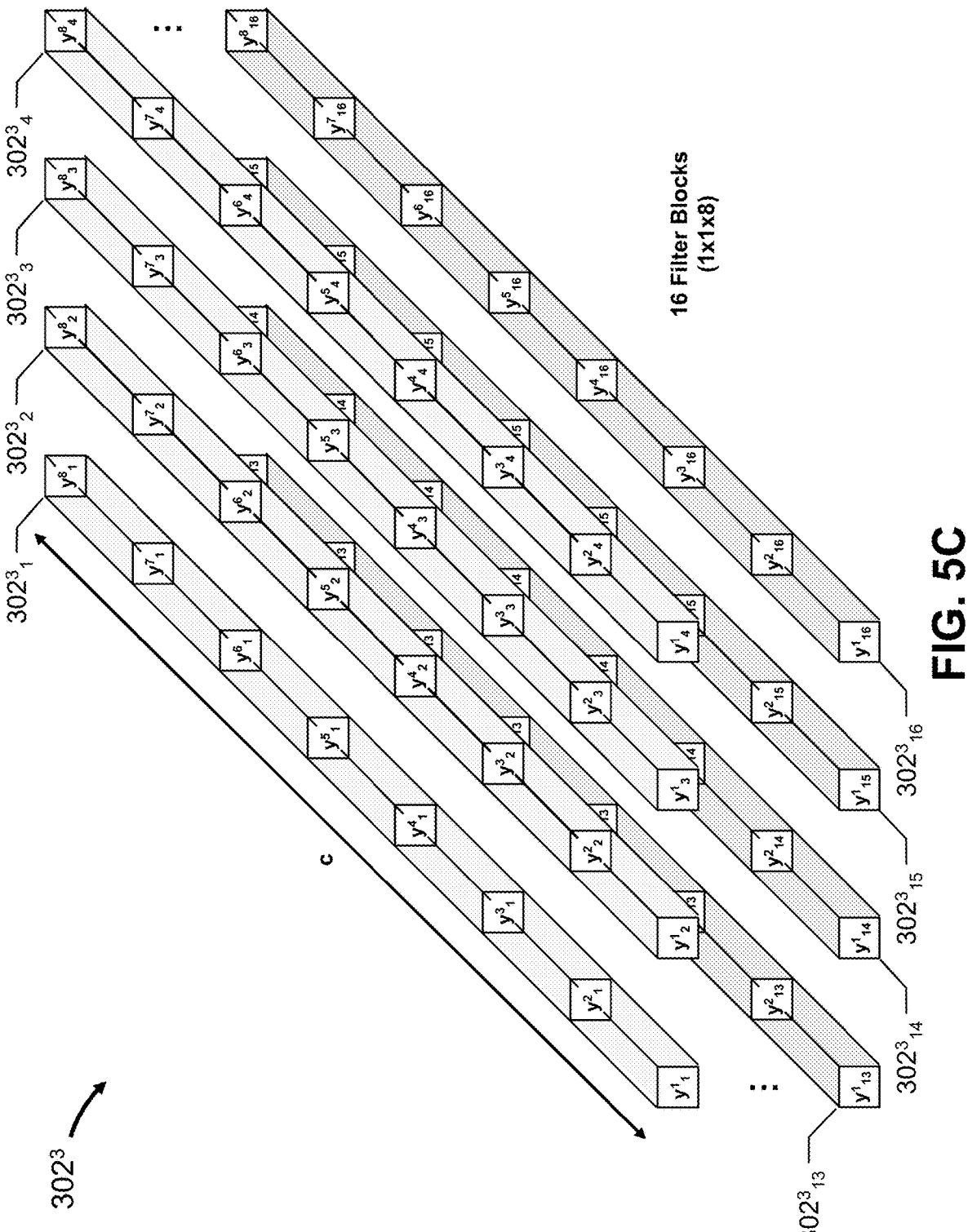

FIGS. 5A, 5B and 5C depict basic block sets $302^1$, $302^2$ and $302^3$, respectively, in accordance with an embodiment of the present disclosure.

In one embodiments, each weight tensor 202' may be decomposed into a basic block set $302^i$ that includes 16 basic blocks $302^i_j$ along the depth or channel dimension. Each basic block is a 1×1×b tensor, and includes b weight values. The depth, b, is a hyperparameter having a value of 4, 8, 16, etc. In this embodiment, b equals 8, i.e., the number of channels.

More particularly, basic block set $302^1$ includes basic blocks $302^1_1$, $302^1_2$, $302^1_3$, $302^1_4$, $302^1_5$, $302^1_6$, $302^1_7$, $302^1_8$, $302^1_9$, $302^1_{10}$, $302^1_{11}$, $302^1_{12}$, $302^1_{13}$, $302^1_{14}$, $302^1_{15}$ and $302^1_{16}$, basic block set $302^2$ includes basic blocks $302^2_1$, $302^2_2$, $302^2_3$, $302^2_4$, $302^2_5$, $302^2_6$, $302^2_7$, $302^2_8$, $302^2_9$, $302^2_{10}$, $302^2_{11}$, $302^2_{12}$, $302^2_{13}$, $302^2_{14}$, $302^2_{15}$ and $302^2_{16}$, and basic block set $302^3$ includes basic blocks $302^3_1$, $302^3_2$, $302^3_3$, $302^3_4$, $302^3_5$, $302^3_6$, $302^3_7$, $302^3_8$, $302^3_9$, $302^3_{10}$, $302^3_{11}$, $302^3_{12}$, $302^3_{13}$, $302^3_{14}$, $302^3_{15}$ and $302^3_{16}$.

With respect to basic block set $302^1$, basic block $302^1_1$ includes weights $w^1_1$, $w^2_1$, $w^3_1$, $w^4_1$, $w^5_1$, $w^6_1$, $w^7_1$ and $w^8_1$, basic block $302^1_2$ includes weights $w^1_2$, $w^2_2$, $w^3_2$, $w^4_2$, $w^5_2$, $w^6_2$, $w^7_2$ and $w^8_2$, basic block $302^1_3$ includes weights $w^1_3$, $w^2_3$, $w^3_3$, $w^4_3$, $w^5_3$, $w^6_3$, $w^7_3$ and $w^8_3$, basic block $302^1_4$ includes weights $w^1_4$, $w^2_4$, $w^3_4$, $w^4_4$, $w^5_4$, $w^6_4$, $w^7_4$ and $w^8_4$, basic block $302^1_5$ includes weights $w^1_5$, $w^2_5$, $w^3_5$, $w^4_5$, $w^5_5$, $w^6_5$, $w^7_5$ and $w^8_5$, basic block $302^1_6$ includes weights $w^1_6$, $w^2_6$, $w^3_6$, $w^4_6$, $w^5_6$, $w^6_6$, $w^7_6$ and $w^8_6$, basic block $302^1_7$ includes weights $w^1_7$, $w^2_7$, $w^3_7$, $w^4_7$, $w^5_7$, $w^6_7$, $w^7_7$ and $w^8_7$, basic block $302^1_8$ includes weights $w^1_8$, $w^2_8$, $w^3_8$, $w^4_8$, $w^5_8$, $w^6_8$, $w^7_8$ and $w^8_8$, basic block $302^1_9$ includes weights $w^1_9$, $w^2_9$, $w^3_9$, $w^4_9$, $w^5_9$, $w^6_9$, $w^7_9$ and $w^8_9$, basic block $302^1_{10}$ includes weights $w^1_{10}$, $w^2_{10}$, $w^3_{10}$, $w^4_{10}$, $w^5_{10}$, $w^6_{10}$, $w^7_{10}$ and $w^8_{10}$, basic block $302^1_{11}$ includes weights $w^1_{11}$, $w^2_{11}$, $w^3_{11}$, $w^4_{11}$, $w^5_{11}$, $w^6_{11}$, $w^7_{11}$ and $w^8_{11}$, basic block $302^1_{12}$ includes weights $w^1_{12}$, $w^2_{12}$, $w^3_{12}$, $w^4_{12}$, $w^5_{12}$, $w^6_{12}$, $w^7_{12}$ and $w^8_{12}$, basic block $302^1_{13}$ includes weights $w^1_{13}$, $w^2_{13}$, $w^3_{13}$, $w^4_{13}$, $w^5_{13}$, $w^6_{13}$, $w^7_{13}$ and $w^8_{13}$, basic block $302^1_{14}$ includes weights $w^1_{14}$, $w^2_{14}$, $w^3_{14}$, $w^4_{14}$, $w^5_{14}$, $w^6_{14}$, $w^7_{14}$ and $w^8_{14}$, basic block $302^1_{15}$ includes weights $w^1_{15}$, $w^2_{15}$, $w^3_{15}$, $w^4_{15}$, $w^5_{15}$, $w^6_{15}$, $w^7_{15}$ and $w^8_{15}$, and basic block $302^1_{16}$ includes weights $w^1_{16}$, $w^2_{16}$, $w^3_{16}$, $w^4_{16}$, $w^5_{16}$, $w^6_{16}$, $w^7_{16}$ and $w^8_{16}$. Basic blocks $302^1_5$, $302^1_6$, $302^1_7$, $302^1_8$, $302^1_9$, $302^1_{10}$, $302^1_{11}$, $302^1_{12}$ are not depicted in FIG. 5A for clarity.

With respect to basic block set $302^2$, basic block $302^2_1$ includes weights $x^1_1$, $x^2_1$, $x^3_1$, $x^4_1$, $x^5_1$, $x^6_1$, $x^7_1$ and $x^8_1$, basic block $302^2_2$ includes weights $x^1_2$, $x^2_2$, $x^3_2$, $x^4_2$, $x^5_2$, $x^6_2$, $x^7_2$ and $x^8_2$, basic block $302^2_3$ includes weights $x^1_3$, $x^2_3$, $x^3_3$, $x^4_3$, $x^5_3$, $x^6_3$, $x^7_3$ and $x^8_3$, basic block $302^2_4$ includes weights $x^1_4$, $x^2_4$, $x^3_4$, $x^4_4$, $x^5_4$, $x^6_4$, $x^7_4$ and $x^8_4$, basic block $302^2_5$ includes weights $x^1_5$, $x^2_5$, $x^3_5$, $x^4_5$, $x^5_5$, $x^6_5$, $x^7_5$ and $x^8_5$, basic block $302^2_6$ includes weights $x^1_6$, $x^2_6$, $x^3_6$, $x^4_6$, $x^5_6$, $x^6_6$, $x^7_6$ and $x^8_6$, basic block $302^2_7$ includes weights $x^1_7$, $x^2_7$, $x^3_7$, $x^4_7$, $x^5_7$, $x^6_7$, $x^7_7$ and $x^8_7$, basic block $302^2_8$ includes weights $x^1_8$, $x^2_8$, $x^3_8$, $x^4_8$, $x^5_8$, $x^6_8$, $x^7_8$ and $x^8$, basic block $302^2_9$ includes weights $x^1_9$, $x^2_9$, $x^3_9$, $x^4_9$, $x^5_9$, $x^6_9$, $x^7_9$ and $x^8_9$, basic block $302^2_{10}$ includes weights $x^1_{10}$, $x^2_{10}$, $x^3_1$, $x^4_{10}$, $x^5_{10}$, $x^6_{10}$, $x^7_1$ and $x^8_{10}$, basic block $302^2_{11}$ includes weights $x^1_{11}$, $x^2_{11}$, $x^3_{11}$, $x^4_{11}$, $x^5_{11}$, $x^6_{11}$, $x^7_{11}$ and $x^8_{11}$, basic block $302^2_{12}$ includes weights $x^1_{12}$, $x^2_{12}$, $x^3_{12}$, $x^4_{12}$, $x^5_{12}$, $x^6_{12}$, $x^7_{12}$ and $x^8_{12}$, basic block $302^2_{13}$ includes weights $x^1_{13}$, $x^2_{13}$, $x^3_{13}$, $x^4_{13}$, $x^5_{13}$, $x^6_{13}$, $x^7_{13}$ and $x^8_{13}$, basic block $302^2_{14}$ includes weights $x^1_{14}$, $x^2_{14}$, $x^3_{14}$, $x^4_{14}$, $x^5_{14}$, $x^6_{14}$, $x^7_{14}$ and $x^8_{14}$, basic block $302^2_{15}$ includes weights $x^1_{15}$, $x^2_{15}$, $x^3_{15}$, $x^4_{15}$, $x^5_{15}$, $x^6_{15}$, $x^7_{15}$ and $x^8_{15}$, and basic block $302^2_{16}$ includes weights $x^1_{16}$, $x^2_{16}$, $x^3_{16}$, $x^4_{16}$, $x^5_{16}$, $x^6_{16}$, $x^7_{16}$ and $x^8_{16}$. Basic blocks $302^2_5$, $302^2_6$, $302^2_7$, $302^2_8$, $302^2_9$, $302^2_{10}$, $302^2_{11}$, $302^2_{12}$ are not depicted in FIG. 5B for clarity.

With respect to basic block set $302^3$, basic block $302^3_1$ includes weights $y^1_1$, $y^2_1$, $y^3_1$, $y^4_1$, $y^5_1$, $y^6_1$, $y^7_1$ and $y^8_1$, basic block $302^3_2$ includes weights $y^1_2$, $y^2_2$, $y^3_2$, $y^4_2$, $y^5_2$, $y^6_2$, $y^7_2$ and $y^8_2$, basic block $302^3_3$ includes weights $y^1_3$, $y^2_3$, $y^3_3$, $y^4_3$, $y^5_3$, $y^6_3$, $y^7_3$ and $y^8_3$, basic block $302^3_4$ includes weights $y^1_4$, $y^2_4$, $y^3_4$, $y^4_4$, $y^5_4$, $y^6_4$, $y^7_4$ and $y^8_4$, basic block $302^3_5$ includes weights $y^1$, $y^2$, $y^3$, $y^4$, $y^5_5$, $y^6_5$, $y^7_5$ and $y^8_5$, basic block $302^3_6$ includes weights $y^1_6$, $y^2_6$, $y^3_6$, $y^4_6$, $y^5_6$, $y^6_6$, $y^7_6$ and $y^8_6$, basic block $302^3_7$ includes weights $y^1_7$, $y^2_7$, $y^3_7$ $y^4_7$, $y^5_7$, $y^6_7$, $y^7_7$ and $y^8_7$, basic block $302^3_8$ includes weights $y^1$, $y^2$, $y^3$, $y^4$, $y^5$, $y^6_8$, $y^7_8$ and $y^8_8$, basic block $302^3_9$ includes weights $y^1_9$, $y^2_9$, $y^3_9$, $y^4_9$, $y^5_9$, $y^6_9$, $y^7_9$ and $y^8_9$, basic block $302^3_{10}$ includes weights $y^1_{10}$, $y^2_{10}$, $y^3_{10}$, $y^4_{10}$, $y^5_{10}$, $y^6_{10}$, $y^7_{10}$ and $y^8_{10}$, basic block $302^3_{11}$ includes weights $y^1_{11}$, $y^2_{11}$, $y^3_{11}$, $y^4_{11}$, $y^5_{11}$, $y^6_{11}$, $y^7_{11}$ and $y^8_{11}$, basic block $302^3_{12}$ includes weights $y^1_{12}$, $y^2_{12}$, $y^3_{12}$, $y^4_{12}$, $y^5_{12}$, $y^6_{12}$, $y^7_{12}$ and $y^8_{12}$, basic block $302^3_{13}$ includes weights $y^1_{13}$, $y^2_{13}$, $y^3_{13}$, $y^4_{13}$, $y^5_{13}$, $y^6_{13}$, $y^7_{13}$ and $y^8_{13}$, basic block $302^3_{14}$ includes weights $y^1_{14}$, $y^2_{14}$, $y^3_{14}$, $y^4_{14}$, $y^5_{14}$, $y^6_{14}$, $y^7_{14}$ and $y^8_{14}$, basic block $302^3_{15}$ includes weights $y^1_{15}$, $y^2_{15}$, $y^3_{15}$, $y^4_{15}$, $y^5_{15}$, $y^6_{15}$, $y^7_{15}$ and $y^8_{15}$, and basic block $302^3_{16}$ includes weights $y^1_{16}$, $y^2_{16}$, $y^3_{16}$, $y^4_{16}$, $y^5_{16}$, $y^6_{16}$, $y^7_{16}$ and $y^8_{16}$. Basic blocks $302^3_5$, $302^3_6$, $302^3_7$, $302^3_8$, $302^3_9$, $302^3_{10}$, $302^3_{11}$, $302^3_{12}$ are not depicted in FIG. 5C for clarity.

Figure 6A:
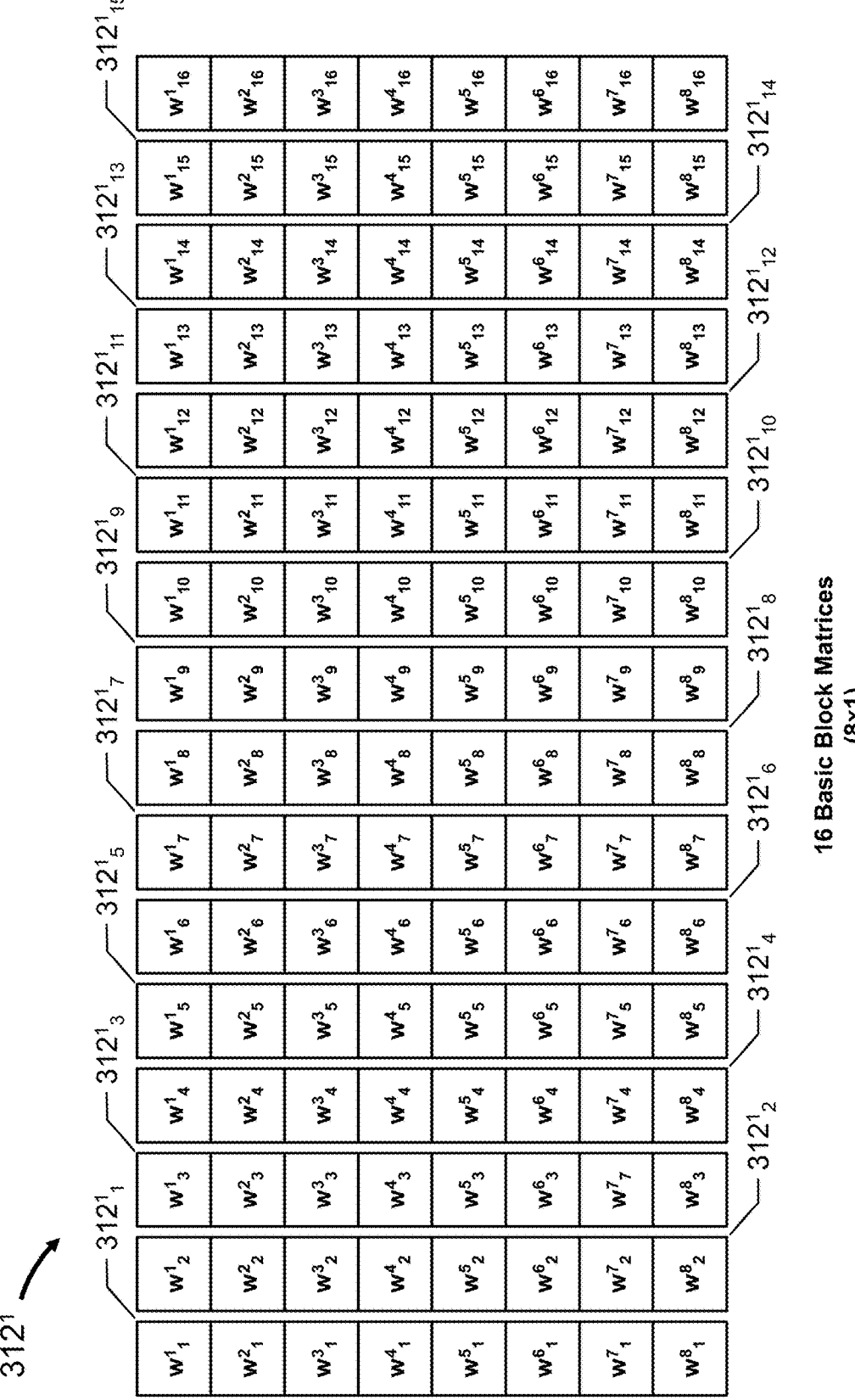
FIGS. 6A, 6B and 6C depict basic block matrix sets, in accordance with an embodiment of the present disclosure.
Figure 6B:
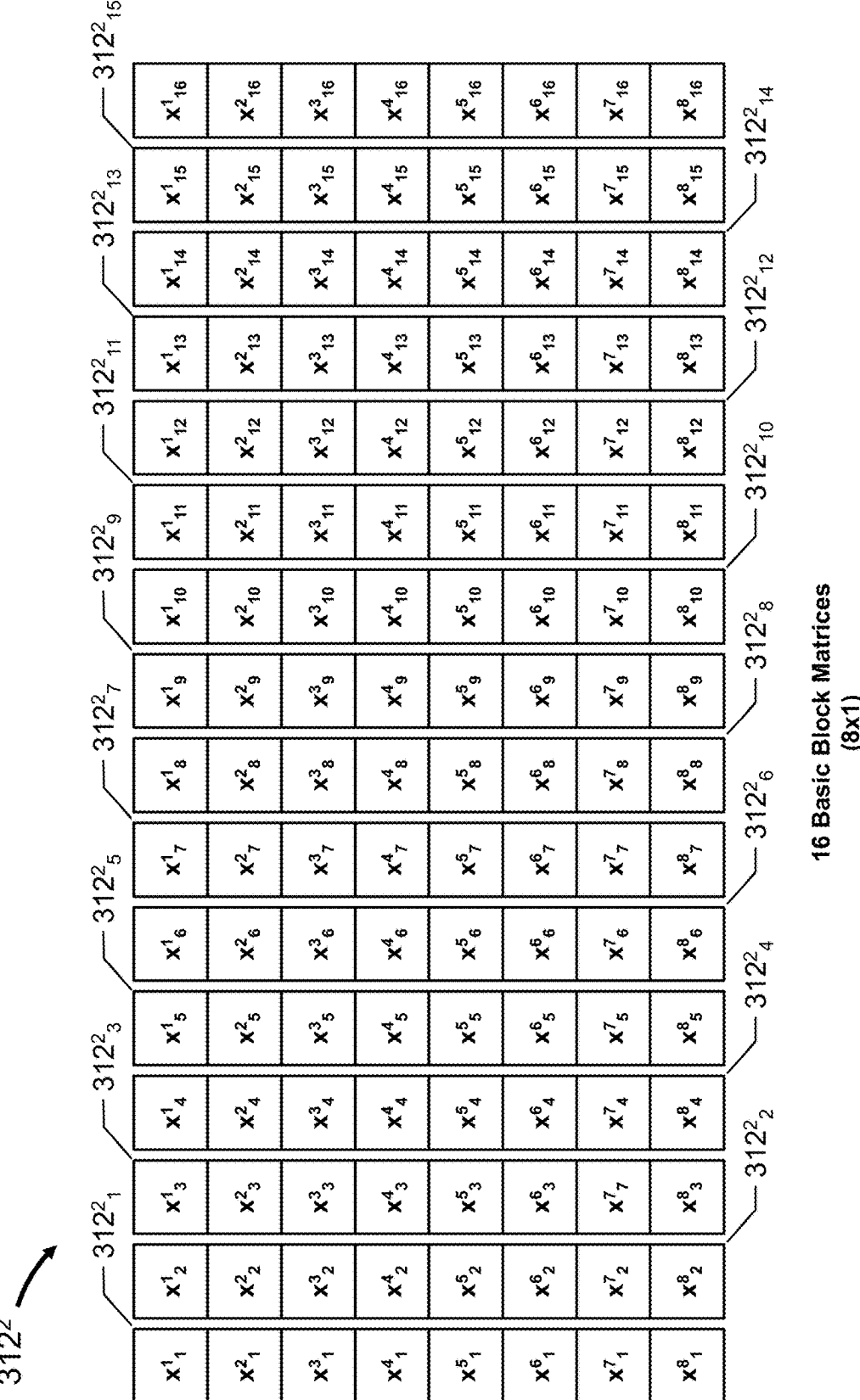
Figure 6C:
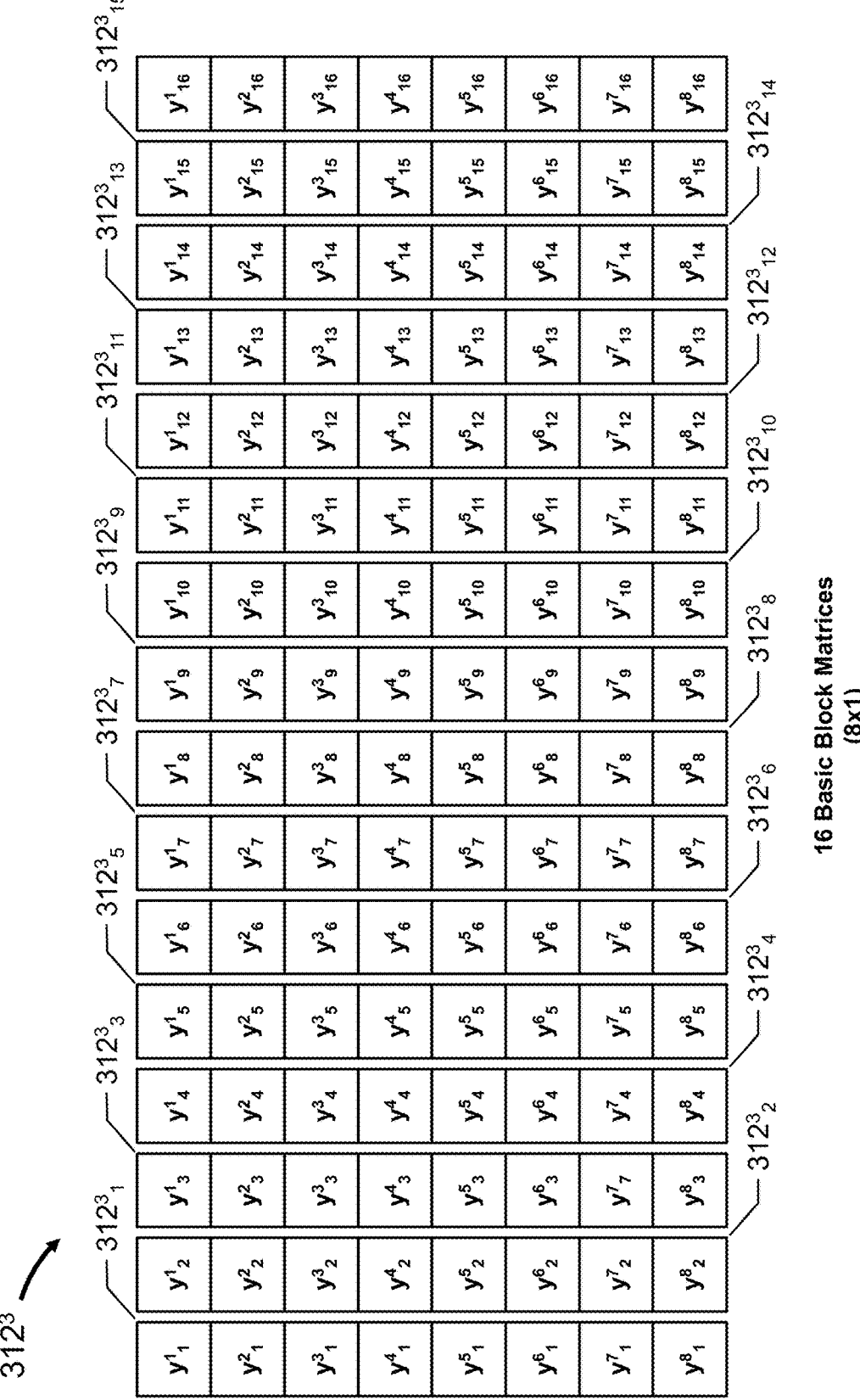

FIGS. 6A, 6B and 6C depict basic block matrix sets $312^1$, $312^2$ and $312^3$ respectively, in accordance with an embodiment of the present disclosure.

Basic block set $302^i$ may be reformed into a basic block matrix set $312^i$ that includes 16 respective basic block matrices $312^i_1$, i.e., basic block matrices $312^i_1$, $312^i_2$, $312^i_3$, $312^i_4$, $312$'s, $312^i_6$, $312^i_7$, $312^i_8$, $312^i_9$, $312^i_{10}$, $312^i_{11}$, $312^i_{12}$, $312^i_{13}$, $312^i_{14}$, $312^i_{15}$ and $312^i_{16}$. Each basic block matrix $312^i_j$ has 8 rows and a single column (8×1), and the same weights as the respective basic block $304^i_j$.

More particularly, basic block matrix set $312^1$ includes basic block matrices $312^1_1$, $312^1_2$, $312^1_3$, $312^1_4$, $312^1_5$, $312^1_6$, $312^1_7$, $312^1_8$, $312^1_9$, $312^1_{11}$, $312^1_{11}$, $312^1_{12}$, $312^1_{13}$, $312^1_{14}$, $312^1_{15}$ and $312^1_{16}$, basic block matrix set $312^2$ includes basic block matrices $312^2_1$, $312^2_2$, $312^2_3$, $312^2_4$, $312^2_5$, $312^2_6$, $312^2_7$, $312^2_8$, $312^2_9$, $312^2_{11}$, $312^2_{11}$, $312^2_{12}$, $312^2_{13}$, $312^2_{14}$, $312^2_{15}$ and $312^2_{16}$, and basic block matrix set $312^3$ includes basic block matrices $312^3_1$, $312^3_2$, $312^3_3$, $312^3_4$, $312^3_5$, $312^3_6$, $312^3_7$, $312^3_8$, $312^3_9$, $312^3_{11}$, $312^3_{11}$, $312^3_{12}$, $312^3_{13}$, $312^3_{14}$, $312^3_{15}$ and $312^3_{16}$.

With respect to basic block matrix set $312^1$, basic block matrix $312^1_1$ includes weights $w^1_1$, $w^2_1$, $w^3_1$, $w^4_1$, $w^5_1$, $w^6_1$, $w^7_1$ and $w^8_1$, basic block matrix $312^1_2$ includes weights $w^1_2$, $w^2_2$, $w^3_2$, $w^4_2$, $w^5_2$, $w^6_2$, $w^7_2$ and $w^8_2$, basic block matrix $312^1_3$ includes weights $w^1_3$, $w^2_3$, $w^3_3$, $w^4_3$, $w^5_3$, $w^6_3$, $w^7_3$ and $w^8_3$, basic block matrix $312^1_4$ includes weights $w^1_4$, $w^2_4$, $w^3_4$, $w^4_4$, $w^5_4$, $w^6_4$, $w^7_4$ and $w^8_4$, basic block matrix $312^1_5$ includes weights $w^1_5$, $w^2_5$, $w^3_5$, $w^4_5$, $w^5_5$, $w^6_5$, $w^7_5$ and $w^8_5$, basic block matrix $312^1_6$ includes weights $w^1_6$, $w^2_6$, $w^3_6$, $w^4_6$, $w^5_6$, $w^6_6$, $w^7_6$ and $w^8_6$, basic block matrix $312^1_7$ includes weights $w^1_7$, $w^2_7$, $w^3_7$, $w^4_7$, $w^5_7$, $w^6_7$, $w^7_7$ and $w^8_7$, basic block matrix $312^1_8$ includes weights $w^1_8$, $w^2_8$, $w^3_8$, $w^4_8$, $w^5_8$, $w^6_8$, $w^7_8$, w and $w^8_8$, basic block matrix $312^1_9$ includes weights $w^1_9$, $w^2_9$, $w^3_9$, $w^4_9$, $w^5_9$, $w^6_9$, $w^7_9$ and $w^8_9$, basic block matrix $302^1_{10}$ includes weights $w^1_{10}$, $w^2_{10}$, $w^3_{10}$, $w^4_{10}$, $w^5_{10}$, $w^6_{10}$, $w^7_{10}$ and $w^8_{10}$, basic block matrix $312^1_{11}$ includes weights $w^1_{11}$, $w^2_{11}$, $w^3_{11}$, $w^4_{11}$, $w^5_{11}$, $w^6_{11}$, $w^7_{11}$ and $w^8_{11}$, basic block matrix $312^1_{12}$ includes weights $w^1_{12}$, $w^2_{12}$, $w^3_{12}$, $w^4_{12}$, $w^5_{12}$, $w^6_{12}$, $w^7_{12}$ and $w^8_{12}$, basic block matrix $312^1_{13}$ includes weights $w^1_{13}$, $w^2_{13}$, $w^3_{13}$, $w^4_{13}$, $w^5_{13}$, $w^6_{13}$, $w^7_{13}$ and $w^8_{13}$, basic block matrix $312^1_{14}$ includes weights $w^1_{14}$, $w^2_{14}$, $w^3_{14}$, $w^4_{14}$, $w^5_{14}$, $w^6_{14}$, $w^7_{14}$ and $w^8_{14}$, basic block matrix $312^1_{15}$ includes weights $w^1_{15}$, $w^2_{15}$, $w^3_{15}$, $w^4_{15}$, $w^5_{15}$, $w^6_{15}$, $w^7_{15}$ and $w^8_{15}$, and basic block matrix $312^1_{16}$ includes weights $w^1_{16}$, $w^2_{16}$, $w^3_{16}$, $w^4_{16}$, $w^5_{16}$, $w^6_{16}$, $w^7_{16}$ and $w^8_{16}$.

With respect to basic block matrix set $312^2$, basic block matrix $312^2_1$ includes weights $x^1_1$, $x^2_1$, $x^3_1$, $x^4_1$, $x^5_1$, $x^6_1$, $x^7_1$ and $x^8_1$, basic block matrix $312^2_2$ includes weights $x^1_2$, $x^2_2$, $x^3_2$, $x^4_2$, $x^5_2$, $x^6_2$, $x^7_2$ and $x^8_2$, basic block matrix $312^2_3$ includes weights $x^1_3$, $x^2_3$, $x^3_3$, $x^4_3$, $x^5_3$, $x^6_3$, $x^7_3$ and $x^8_3$, basic block matrix $312^2_4$ includes weights $x^1_4$, $x^2_4$, $x^3_4$, $x^4_4$, $x^5_4$, $x^6_4$, $x^7_4$ and $x^8_4$, basic block matrix $312^2_5$ includes weights $x^1_5$, $x^2_5$, $x^3_5$, $x^4_5$, $x^5_5$, $x^6_5$, $x^7_5$ and $x^8_5$, basic block matrix $312^2_6$ includes weights $x^1_6$, $x^2_6$, $x^3_6$, $x^4_6$, $x^5_6$, $x^6_6$, $x^7_6$ and $x^8_6$, basic block matrix $312^2_7$ includes weights $x^1_7$, $x^2_7$, $x^3_7$, $x^4_7$, $x^5_7$, $x^6_7$, $x^7_7$ and $x^8_7$, basic block matrix $312^2_8$ includes weights $x^1_8$, $x^2_8$, $x^3_8$, $x^4_8$, $x^5_8$, $x^6_8$, $x^7_8$ and $x^8_8$, basic block matrix $312^2_9$ includes weights $x^1_9$, $x^2_9$, $x^3_9$, $x^4_9$, $x^5_9$, $x^6_9$, $x^7_9$ and $x^8_9$, basic block matrix $312^2_{10}$ includes weights $x^1_{10}$, $x^2_{10}$, $x^3_{10}$, $x^4_{10}$, $x^5_{10}$, $x^6_{10}$, $x^7_{10}$ and $x^8_{10}$, basic block matrix $312^2_{11}$ includes weights $x^1_{11}$, $x^2_{11}$, $x^3_{11}$, $x^4_{11}$, $x^5_{11}$, $x^6_{11}$, $x^7_{11}$ and $x^8_{11}$, basic block matrix $312^2_{12}$ includes weights $x^1_{12}$, $x^2_{12}$, $x^3_{12}$, $x^4_{12}$, $x^5_{12}$, $x^6_{12}$, $x^7_{12}$ and $x^8_{12}$, basic block matrix $312^2_{13}$ includes weights $x^1_{13}$, $x^2_{13}$, $x^3_{13}$, $x^4_{13}$, $x^5_{13}$, $x^6_{13}$, $x^7_{13}$ and $x^8_{13}$, basic block matrix $312^2_{14}$ includes weights $x^1_{14}$, $x^2_{14}$, $x^3_{14}$, $x^4_{14}$, $x^5_{14}$, $x^6_{14}$, $x^7_{14}$ and $x^8_{14}$, basic block matrix $312^2_{15}$ includes weights $x^1_{15}$, $x^2_{15}$, $x^3_{15}$, $x^4_{15}$, $x^5_{15}$, $x^6_{15}$, $x^7_{15}$ and $x^8_{15}$, and basic block matrix $312^2_{16}$ includes weights $x^1_{16}$, $x^2_{16}$, $x^3_{16}$, $x^4_{16}$, $x^5_{16}$, $x^6_{16}$, $x^7_{16}$ and $x^8_{16}$.

With respect to basic block matrix set $312^3$, basic block matrix $312^3_1$ includes weights $y^1_1$, $y^2_1$, $y^3_1$, $y^4_1$, $y^5_1$, $y^6_1$, $y^7_1$ and $y^8_1$, basic block matrix $312^3_2$ includes weights $y^1_2$, $y^2_2$, $y^3_2$, $y^4_2$, $y^5_2$, $y^6_2$, $y^7_2$ and $y^8_2$, basic block matrix $312^3_3$ includes weights $y^1_3$, $y^2_3$, $y^3_3$, $y^4_3$, $y^5_3$, $y^6_3$, $y^7_3$ and $y^8_3$, basic block matrix $312^3_4$ includes weights $y^1_4$, $y^2_4$, $y^3_4$, $y^4_4$, $y^5_4$, $y^6_4$, $y^7_4$ and $y^8_4$, basic block matrix $312^3_5$ includes weights $y^1_5$, $y^2_5$, $y^3_5$, $y^4_5$, $y^5_5$, $y^6_5$, $y^7_5$ and $y^8_5$, basic block matrix $312^3_6$ includes weights $y^1_6$, $y^2_6$, $y^3_6$, $y^4_6$, $y^5_6$, $y^6_6$, $y^7_6$ and $y^8_6$, basic block matrix $312^3_7$ includes weights $y^1_7$, $y^2_7$ $y^3_7$ $y^4_7$ $y^5_7$ $y^6_7$ $y^7_7$ and $y^8_7$, basic block matrix $312^3_8$ includes weights $y^1_8$, $y^2_8$, $y^3_8$, $y^4_8$, $y^5_8$, $y^6_8$, $y^7_8$ and $y^8_8$, basic block matrix $312^3_9$ includes weights $y^1_9$, $y^2_9$, $y^3_9$, $y^4_9$, $y^5_9$, $y^6_9$, $y^7_9$ and $y^8_9$, basic block matrix $312^3_{10}$ includes weights $y^1_{10}$, $y^2_{10}$, $y^3_{10}$, $y^4_{10}$, $y^5_{10}$, $y^6_{10}$, $y^7_{10}$ and $y^8_{10}$, basic block matrix $312^3_{11}$ includes weights $y^1_{11}$, $y^2_{11}$, $y^3_{11}$, $y^4_{11}$, $y^5_{11}$, $y^6_{11}$, $y^7_{11}$ and $y^8_{11}$, basic block matrix $312^3_{12}$ includes weights $y^1_{12}$, $y^2_{12}$, $y^3_{12}$, $y^4_{12}$, $y^5_{12}$ $y^6_{12}$, $y^7_{12}$ and $y^8_{12}$, basic block matrix $312^3_{13}$ includes weights $y^1_{13}$, $y^2_{13}$, $y^3$, $y^4_{13}$, $y^5_{13}$ $y^6_{13}$, $y^7_{13}$ and $y^8_{13}$, basic block matrix $312^3_{14}$ includes weights $y^1_{14}$, $y^2_{14}$, $y^3_{14}$, $y^4_{14}$, $y^5_{14}$ $y^6_{14}$, $y^7_{14}$ and $y^8_{14}$, basic block matrix $312^3_{15}$ includes weights $y^1_{15}$, $y^2_{15}$, $y^3_{15}$, $y^4_{15}$, $y^5_{15}$, $y^6_{15}$, $y^7_{15}$ and $y^8_{15}$, and basic block matrix $312^3_{16}$ includes weights $y^1_{16}$, $y^2_{16}$, $y^3_{16}$, $y^4_{16}$, $y^5_{16}$, $y^6_{16}$, $y^7_{16}$ and $y^8_{16}$.

Because weight tensors $202^1$, $202^2$ and $202^3$ have been reformed into basic block matrix sets $312^1$, $312^2$ and $312^3$ across the channel dimension rather than the height and width dimensions, encoding the weights of each basic block matrix advantageously avoids adverse effects on the local data within any particular weight matrix.

Figure 7A:
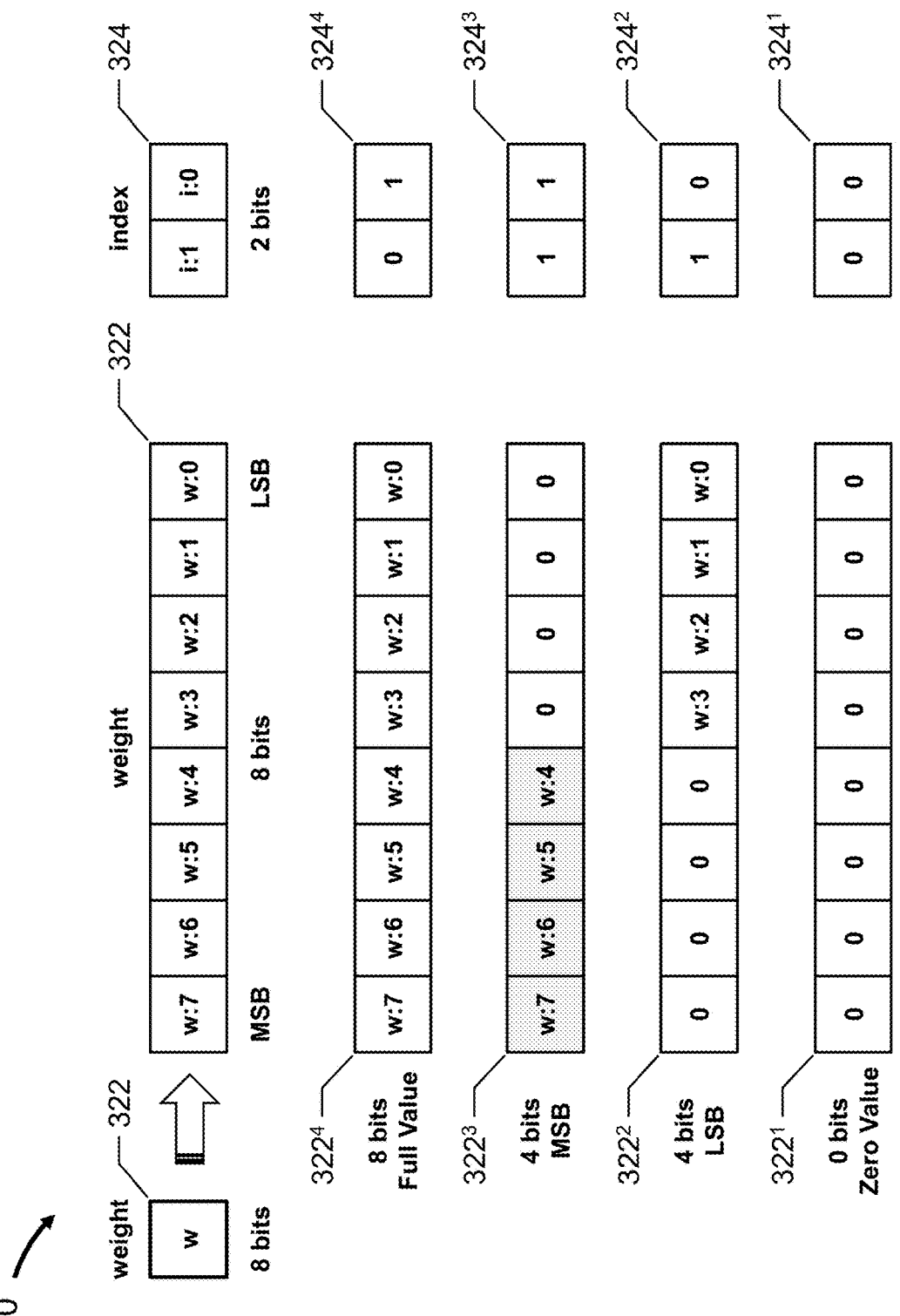
FIG. 7A depicts a matrix element encoding process, according to an embodiment of the present disclosure.

FIG. 7A depicts matrix element encoding process 350, according to an embodiment of the present disclosure.

In this embodiment, the matrix element is an 8-bit unsigned integer weight 322. The principles discussed below are applicable to other types of matrix elements, such as, for example, 8-bit unsigned integer activations, an 8-bit signed integer weights or activations, a 16-bit signed or unsigned integer weights or activations, a 32-bit signed or unsigned integer weights or activations, certain floating point formats, etc.

In this embodiment, the encoding process for the 8-bit unsigned integer matrix element advantageously includes both quantization, to reduce the number of bits, and pruning to remove small values at or close to zero. Weight 322 may be encoded as a 4-bit "zero magnitude" unsigned integer value, i.e., encoded weight $322^1$, a 4-bit "small magnitude" unsigned integer value, i.e., encoded weight $322^2$, a 4-bit "large magnitude" unsigned integer value, i.e., encoded weight $322^3$, or an 8-bit "full magnitude" unsigned integer value, i.e., encoded weight $322^4$. In another embodiment, the encoding process for the 8-bit signed integer matrix element uses 4-bit "zero magnitude", "small magnitude" and "large magnitude" signed integer values and an 8-bit "full magnitude" signed integer value.

The 4-bit "large magnitude" unsigned integer value is similar to an 8-bit unsigned integer value with a zero-valued least significant bit (LSB) nibble, while the 4-bit "small magnitude" unsigned integer value is similar to an 8-bit unsigned integer value with a zero-valued most significant bit (MSB) nibble. The 4-bit "large magnitude" unsigned integer value is created by shifting the matrix element 4 bits to the right, and the matrix element is reconstructed by shifting the 4-bit "large magnitude" unsigned integer value 4 bits to the left. The information contained in the lower 4 bits (i.e., the LSB nibble) of the matrix element is lost during the encoding and recreation processes.

Additional encoding types are also contemplated, such as, for example, an 8-bit "medium magnitude" integer for a $1_6$-bit integer matrix element, an 8-bit "small magnitude" integer for a $3_2$-bit integer matrix element, etc.

Each type of encoding has an associated 2-bit index 324, represented as "i:1, i:0", that identifies or describes the encoding type. Weight $322^1$ has an associated 2-bit index $324^1$ to identify the "zero magnitude" type, and has a bit pattern of "00". Weight $322^2$ has an associated 2-bit index $324^2$ to identify the "small magnitude" type, and has a bit pattern of "10". Weight $322^3$ has an associated 2-bit index $324^3$ to identify the "large magnitude" type, and has a bit pattern of "11". Weight $322^4$ has an associated 2-bit index $324^4$ to identify the "full magnitude" type, and has a bit pattern of "01".

Other index values and numbers of bits may also be used, such as, for example, a 3-bit index with one value (e.g., "100") indicating an 8-bit "medium magnitude" integer for a 16-bit integer matrix element, a 3-bit index with one value (e.g., "110") indicating an 8-bit "small magnitude" integer for a 32-bit integer matrix element, etc.

Weight 322 includes eight bits represented as w:0, w:1, w:2, w:3, w:4, w:5, w:6, w:7 (LSB to MSB). Generally, weight 322 has a value between 0 to 255 (decimal). When the value of weight 322 is zero or less than a lower threshold value, such as, for example, 1, 2, etc., then weight 322 may be encoded as a 0-bit "zero magnitude" value, i.e., weight $322^1$, with an associated 2-bit index $324^1$ (i.e., "00"). When the value of weight 322 is greater than the lower threshold value but less than or equal to an upper threshold value, such as, for example, 15, then weight 322 may be encoded as a "small magnitude" unsigned integer value, i.e., weight $322^2$, with an associated 2-bit index $324^2$ (i.e., "10"). When the value of weight 322 is greater than the upper threshold value, then weight 322 may be encoded as a "large magnitude" unsigned integer value, i.e., weight $322^3$, with an associated 2-bit index $324^3$ (i.e., "11"). In one embodiment, when the value of weight 322 is greater than the upper threshold value and the LSB nibble is desired to be retained (for accuracy, etc.), then weight 322 may be encoded as a "full magnitude" unsigned integer value, i.e., weight $322^3$, with an associated 2-bit index $324^3$ (i.e., "01").

In another embodiment, the matrix element encoding process may be hierarchical, which advantageously reduces the index overhead when the data has high sparsity, i.e., when most of the matrix elements are zero. In this embodiment, each matrix element has an associated index with one or two bits. The first bit indicates whether the matrix element has a zero value or a non-zero value. If the matrix element has a non-zero value, then the second bit indicates whether the matrix element has been encoded as a "small magnitude" value or a "large magnitude" value.

Figure 7B:
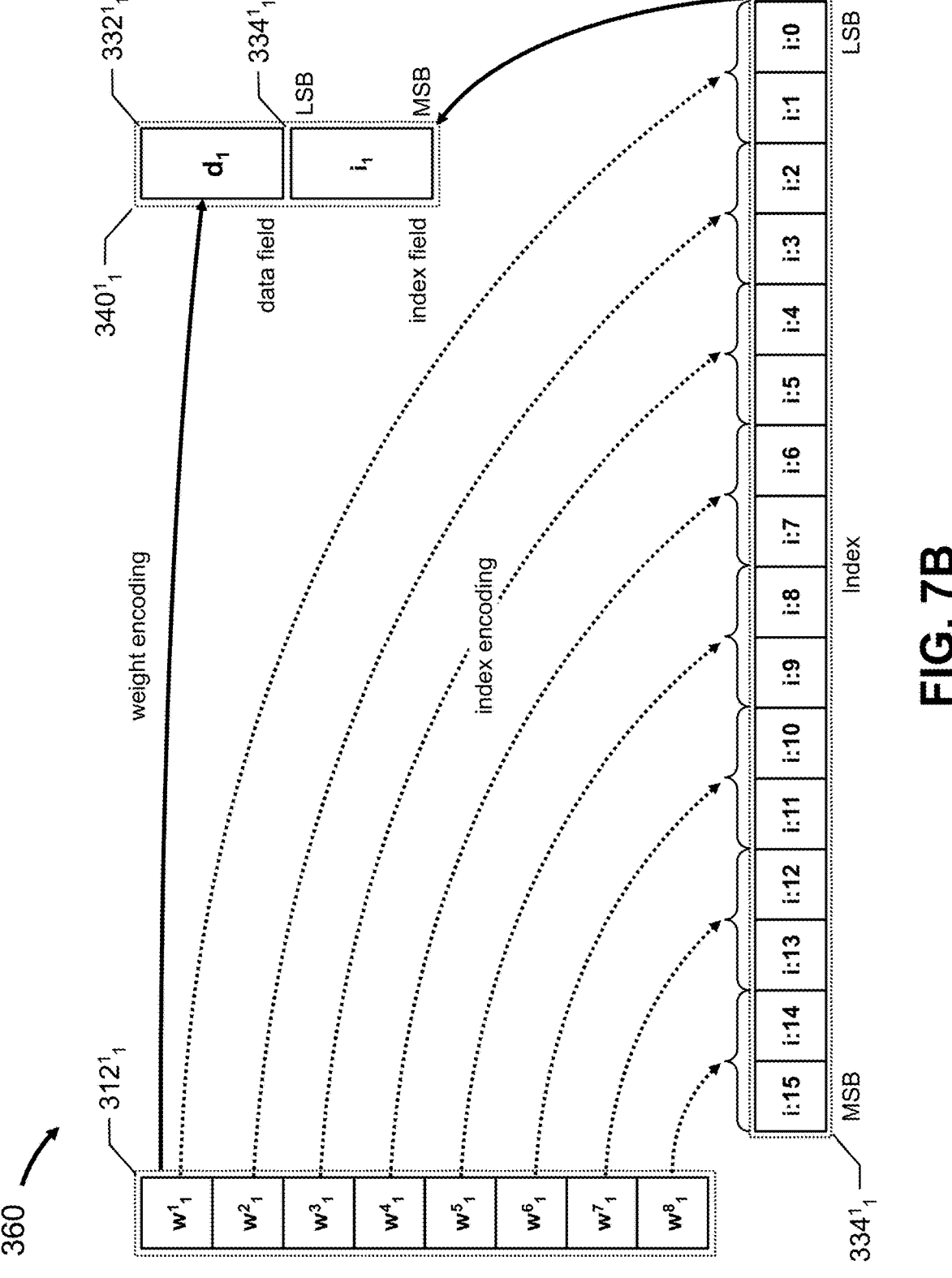
FIG. 7B depicts a basic block encoding process, according to an embodiment of the present disclosure.

FIG. 7B depicts basic block encoding process 360, according to an embodiment of the present disclosure.

Generally, each basic block matrix $312^i_j$ is encoded into a fixed-size encoded block $340^i_j$ that includes a fixed-size data field $332^i_j$ and a fixed-size index field $334^i_j$. The size of data field $332^i_j$ is based on the amount of compression desired and the sparsity of the data within basic block matrices $312^i_j$, while the size of index field $334^i_j$ depends upon the number of elements within each basic block matrix $312^i_j$.

In one embodiment, the sparsity of the data is low and each basic block matrix $312^i_j$ includes eight, 8-bit elements with a total size of 64 bits (8B). The size of index field $334^i_j$ will be 16 bits (2B), and the size of data field $332^i_j$ depends on the amount of compression desired. For example, if a data compression ratio of about 0.5 is desired, then the size of data field $332^i_j$ may be set to 32 bits (4B), which accommodates a number of different encoding combinations, such as four "full magnitude" elements and four "zero magnitude" elements (4·8 bits or 4B), eight "small magnitude" elements (8·4 bits or 4B), eight "large magnitude" elements (8.4 bits or 4B), four "small magnitude" element and four "large magnitude" elements (4·4+4·4 bits or 4B), two "full magnitude" elements, four "small magnitude" elements and two "zero magnitude" elements (2·8+4·4 bits or 4B), etc. In this example, the overall compression ratio is 0.75 due to the overhead incurred by index field $334^i_j$ (i.e., 4B+2B/8B).

In another embodiment, the sparsity of the data is 50%, and each basic block matrix $312^i_j$ includes eight, 8-bit elements with a total size of 64 bits (8B). The size of index field $334^i_j$ will be 16 bits (2B), and the size of data field $332^i_j$ depends on the amount of compression. In this embodiment, four elements have zero values and four elements have non-zero values. If a data compression ratio of about 0.5 is desired, then the size of data field $332^i_j$ may be set to 32 bits (4B), which accommodates four "full magnitude" elements, as described above, without any loss of accuracy. However, the overall compression ratio is still 0.75 due to the overhead incurred by index field $334^i_j$ (i.e., 4B+2B/8B).

Advantageously, if an overall compression ratio of 0.5 is desired, then the size of data field $332^i_j$ may be set to 16 bits (2B) and each non-zero element may be encoded as a "small magnitude" element or a "large magnitude" element. The overall compression ratio is now 0.5 (i.e., 2B+2B/8B) or 2:1.

In other embodiments, the size of data field $332^i_j$ may be set to 16 bits (2B) and the four "highest-valued" non-zero elements may be encoded as "small magnitude" or "large magnitude" elements, while the remaining elements are encoded as "zero magnitude" elements. In embodiments with very sparse data, less than four elements may have non-zero values, in which case one or more elements may be encoded as a "small magnitude" element with a zero value and the proper index (i.e., index $324^2$) to ensure that four elements are encoded as "small magnitude" or "large magnitude" elements. While this accommodation introduces multiply-by-zero situations during processing, the advantages associated with reducing the memory footprint outweigh the disadvantages of the occasionally multiply-by-zero situation.

As illustrated in basic block encoding process 360, basic block matrix $312^1_1$ may be encoded into a fixed-size encoded block $340^1_1$ that includes a fixed-size data field $332^1_1$ (2B) and a fixed-size index field $334^1_1$ (2B). Each weight is encoded as a "zero magnitude" element (i.e., weight $322^1$), a "small magnitude" element (i.e., weight $322^2$), or a "large magnitude" element (i.e., weight $322^3$), and the associated index $324^1$, $324^2$, or $324^3$ is generated. Importantly, while all of the associated indices are added to index field $334^i_j$, only those weights that are encoded as "small magnitude" or "large magnitude" elements are added to data field $332^i_j$. In other words, "zero magnitude" elements are not present within data field $332^i_j$ unless the data is very sparse, as discussed above.

More particularly, weight $w^1_1$ is encoded into weight $322^1$, weight $322^2$ or weight $322^3$ and added to data field $332^1_1$ as appropriate, and the associated index is added to index $334^1_1$ at bits i:0, i:1. Weight $w^2_1$ is encoded into weight $322^1$, weight $322^2$ or weight $322^3$ and added to data field $332^1_1$ as appropriate, and the associated index is added to index $334^1_1$ at bits i:2, i:3. Weight $w^3_1$ is encoded into weight $322^1$, weight $322^2$ or weight $322^3$ and added to data field $332^1_1$ as appropriate, and the associated index is added to index $334^1_1$ at bits i:4, i:5. Weight $w^4_1$ is encoded into weight $322^1$, weight $322^2$ or weight $322^3$ and added to data field $332^1_1$ as appropriate, and the associated index is added to index $334^1_1$ at bits i:6, i:7. Weight $w^5_1$ is encoded into weight $322^1$, weight $322^2$ or weight $322^3$ and added to data field $332^1_1$ as appropriate, and the associated index is added to index $334^1_1$ at bits i:8, i:9. Weight $w^6_1$ is encoded into weight $322^1$, weight $322^2$ or weight $322^3$ and added to data field $332^1_1$ as appropriate, and the associated index is added to index $334^1_1$ at bits i:10, i:11. Weight $w^7_1$ is encoded into weight $322^1$, weight $322^2$ or weight $322^3$ and added to data field $332^1_1$ as appropriate, and the associated index is added to index $334^1_1$ at bits i:12, i:13. Weight $w^8_1$ is encoded into weight $322^1$, weight $322^2$ or weight $322^3$ and added to data field $332^1_1$ as appropriate, and the associated index is added to index $334^1_1$ at bits i:14, i:15.

The result of basic block encoding process 360 is a transformation of a basic block matrix 312 into an encoded block set 340, such as, for example, basic block matrix $312^1$ into encoded block set $340^1$.

FIGS. 8A, 8B, 8C and 8D depict basic block encoding process 360 for basic block matrix set $312^1$, according to an embodiment of the present invention.

In this embodiment, basic block matrix set $312^1$ has a sparsity of 50%, which is randomly distributed throughout basic block matrices $312^1_j$.

Figure 8A:
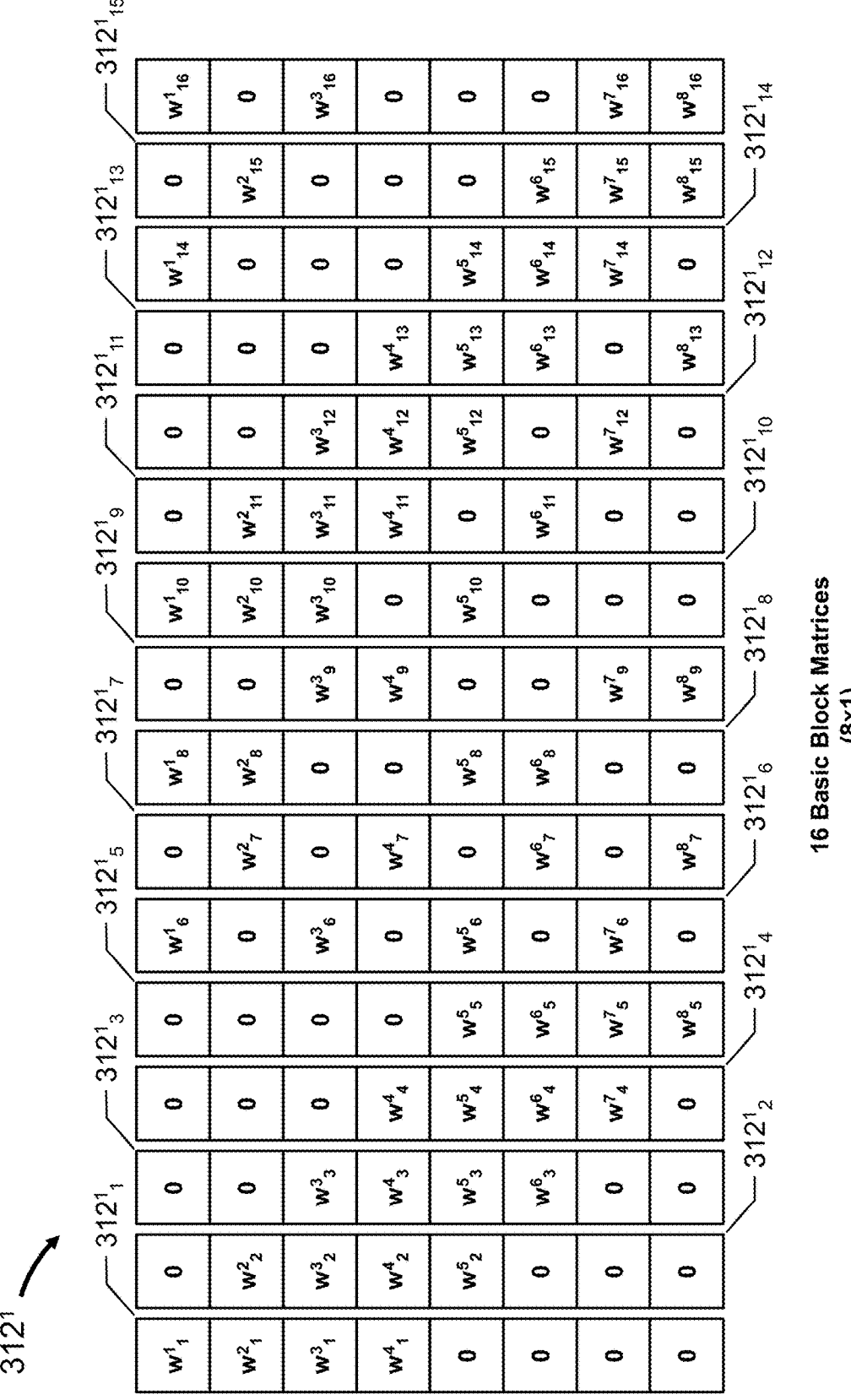
FIGS. 8A, 8B, 8C and 8D depict a basic block encoding process for a basic block matrix set, according to an embodiment of the present invention.

As depicted in FIG. 8A, basic block matrix $312^1_1$ includes four weights with non-zero values (i.e., weights $w^1_1$, $w^2_1$, $w^3_1$ and $w^4_1$) and four weights with zero values (i.e., weights $w^5_1$, $w^6_1$, $w^7_1$ and $w^8_1$). Basic block matrix $312^1_2$ includes four weights with non-zero values (i.e., weights $w^2_2$, $w^3_2$, $w^4_2$ and $w^5_2$) and four weights with zero values (i.e., weights $w^1_2$, $w^6_2$, $w^7_2$ and $w^8_2$). Basic block matrix $312^1_3$ includes four weights with non-zero values (i.e., weights $w^3_3$, $w^4_3$, $w^5_3$ and $w^6_3$) and four weights with zero values (i.e., weights $w^1_3$, $w^2_3$, $w^7_3$ and $w^8_3$). Basic block matrix $312^1_4$ includes four weights with non-zero values (i.e., weights $w^4_4$, $w^5_4$, $w^6_4$ and $w^7_4$) and four weights with zero values (i.e., weights $w^1_4$, $w^2_4$, $w^3_4$ and $w^8_4$). Basic block matrix $312^1_5$ includes four weights with non-zero values (i.e., weights $w^5_5$, $w^6_5$, $w^7_5$ and $w^8_5$) and four weights with zero values (i.e., weights $w^1_5$, $w^2_5$, $w^3_5$ and $w^4_5$). Basic block matrix $312^1_6$ includes four weights with non-zero values (i.e., weights $w^1_6$, $w^3_6$, $w^5_6$ and $w^7_6$) and four weights with zero values (i.e., weights $w^2_6$, $w^4_6$, $w^6_6$ and $w^8_6$). Basic block matrix $312^1_7$ includes four weights with non-zero values (i.e., weights $w^2_7$, $w^4_7$, $w^6_7$ and $w^8_7$) and four weights with zero values (i.e., weights $w^1_7$, $w^3_7$, $w^5_7$ and $w^7_7$). Basic block matrix $312^1_8$ includes four weights with non-zero values (i.e., weights $w^1_8$, $w^2_8$, $w^5_8$ and $w^6_8$) and four weights with zero values (i.e., weights $w^3_8$, $w^4_8$, $w^7_8$ and $w^8_8$).

Basic block matrix $312^1_9$ includes four weights with non-zero values (i.e., weights $w^3_9$, $w^4_9$, $w^7_9$ and $w^8_9$) and four weights with zero values (i.e., weights $w^1_9$, $w^2_9$, $w^5_9$ and $w^6_9$). Basic block matrix $312^1_{10}$ includes four weights with non-zero values (i.e., weights $w^1_{10}$, $w^2_{10}$, $w^3_{10}$ and $w^5_{10}$) and four weights with zero values (i.e., weights $w^4_{10}$, $w^6_{10}$, $w^7_{10}$ and $w^8_{10}$). Basic block matrix $312^1_{11}$ includes four weights with non-zero values (i.e., weights $w^2_{11}$, $w^3_{11}$, $w^4_{11}$ and $w^6_{11}$) and four weights with zero values (i.e., weights $w^1_{11}$, $w^5_{11}$, $w^7_{11}$ and $w^8_{11}$). Basic block matrix $312^1_{12}$ includes four weights with non-zero values (i.e., weights $w^3_{12}$, $w^4_{12}$, $w^5_{12}$ and $w^7_{12}$) and four weights with zero values (i.e., weights $w^1_{12}$, $w^2_{12}$, $w^6_{12}$ and $w^8_{12}$). Basic block matrix $312^1_{13}$ includes four weights with non-zero values (i.e., weights $w^4_{13}$, $w^5_{13}$, $w^6_{13}$ and $w^8_{13}$) and four weights with zero values (i.e., weights $w^1_{13}$, $w^2_{13}$, $w^3_{13}$ and $w^7_{13}$). Basic block matrix $312^1_{14}$ includes four weights with non-zero values (i.e., weights $w^1_{14}$, $w^5_{14}$, $w^6_{14}$ and $w^7_{14}$) and four weights with zero values (i.e., weights $w^2_{14}$, $w^3_{14}$, $w^4_{14}$ and $w^8_{14}$). Basic block matrix $312^1_{15}$ includes four weights with non-zero values (i.e., weights $w^2_{15}$, $w^6_{15}$, $w^7_{15}$ and $w^8_{15}$) and four weights with zero values (i.e., weights $w^1_{15}$, $w^3_{15}$, $w^4_{15}$ and $w^5_{15}$). Basic block matrix $312^1_{16}$ includes four weights with non-zero values (i.e., weights $w^1_{16}$, $w^3_{16}$, $w^7_{16}$ and $w^8_{16}$) and four weights with zero values (i.e., weights $w^2_{16}$, $w^4_{16}$, $w^5_{16}$ and $w^6_{16}$).

In this embodiment, each 64-bit (8B) basic block matrix $312^1_j$ is encoded into a 16 bit (2B) data field $332^1_j$, and each non-zero element is encoded as a 4-bit "small magnitude" element (i.e., weight $322^2$) or a 4-bit "large magnitude" element (i.e., weight $322^3$). The overall compression ratio for this embodiment is 0.5 (i.e., 2B+2B/8B) or 2:1.

Figure 8B:
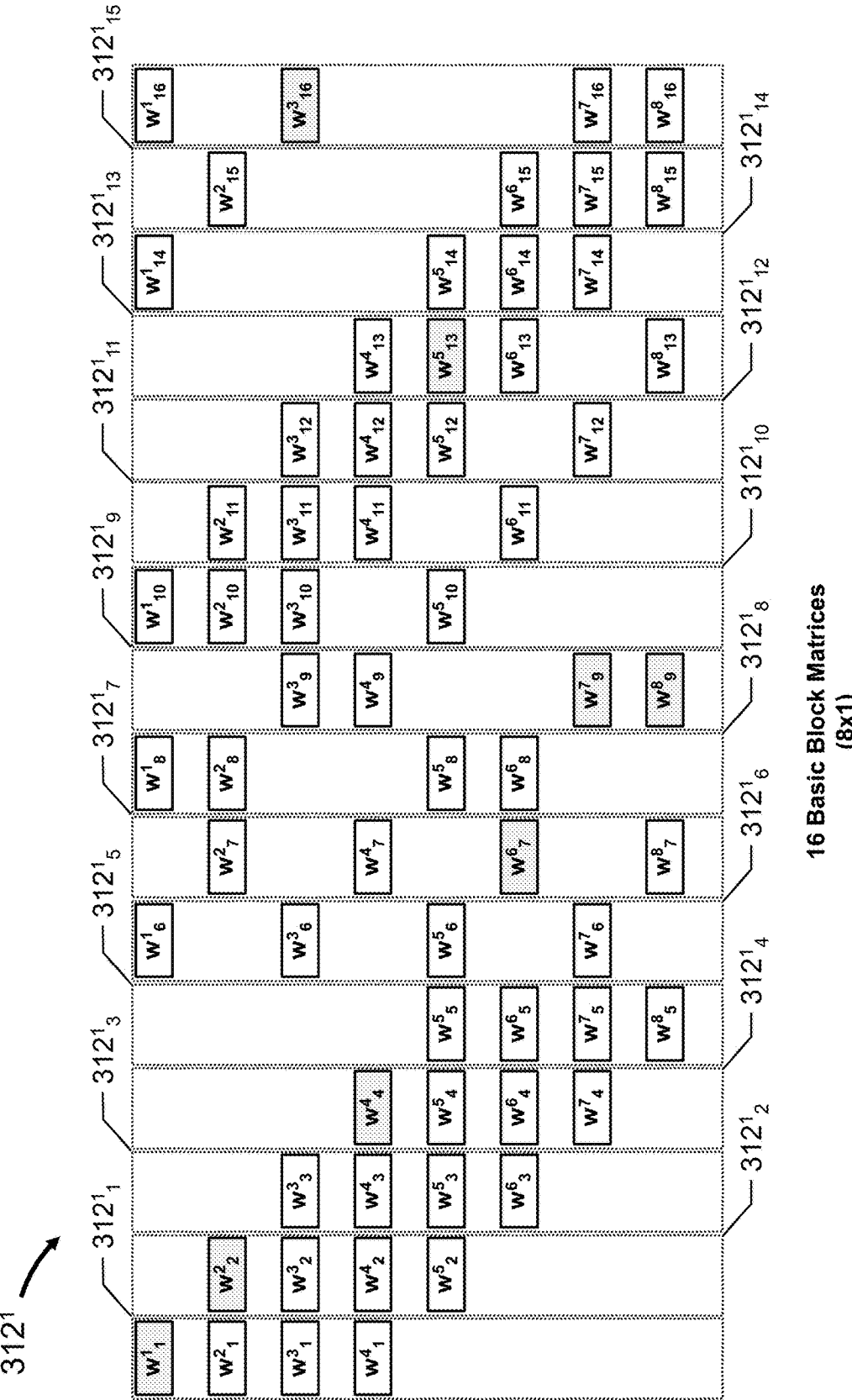

As depicted in FIG. 8B, weights $w^1_1$, $w^2_2$, $w^4_4$, $w^6_7$, $w^7_9$, $w^8_9$, $w^5_{13}$ and $w^3_{16}$ are encoded as 4-bit "large magnitude" element (i.e., weight $322^3$, shaded background), while weights $w^2_1$, $w^3_1$, $w^4_1$, $w^3_2$, $w^4_2$, $w^5_2$, $w^3_3$, $w^4_3$, $w^5_3$, $w^6_3$, $w^5_4$, $w^6_4$, $w^7_4$, $w^5_5$, $w^6_5$, $w^7_5$, $w^8_5$, $w^1_6$, $w^3_6$, $w^5_6$, $w^7_6$, $w^2_7$, $w^4_7$, $w^8_7$, $w^1_8$, $w^2_8$, $w^5_8$, $w^6_8$, $w^3_9$, $w^4_9$, $w^1_{10}$, $w^2_{10}$, $w^3_{10}$, $w^5_{10}$, $w^2_{11}$, $w^3_{11}$, $w^4_{11}$, $w^6_{11}$, $w^3_{12}$, $w^4_{12}$, $w^5_{12}$, $w^7_{12}$, $w^4_{13}$, $w^6_{13}$, $w^8_{13}$, $w^1_{14}$, $w^5_{14}$, $w^6_{14}$, $w^7_{14}$, $w^2_{15}$, $w^6_{15}$, $w^7_{15}$, $w^8_{15}$, $w^1_{16}$, $w^7_{16}$ and $w^8_{16}$ are encoded as 4-bit "small magnitude" element (i.e., weight $322^2$, white background). The weights with zero values are encoded as "zero" magnitude unsigned integer values (not depicted for clarity).

Figure 8C:
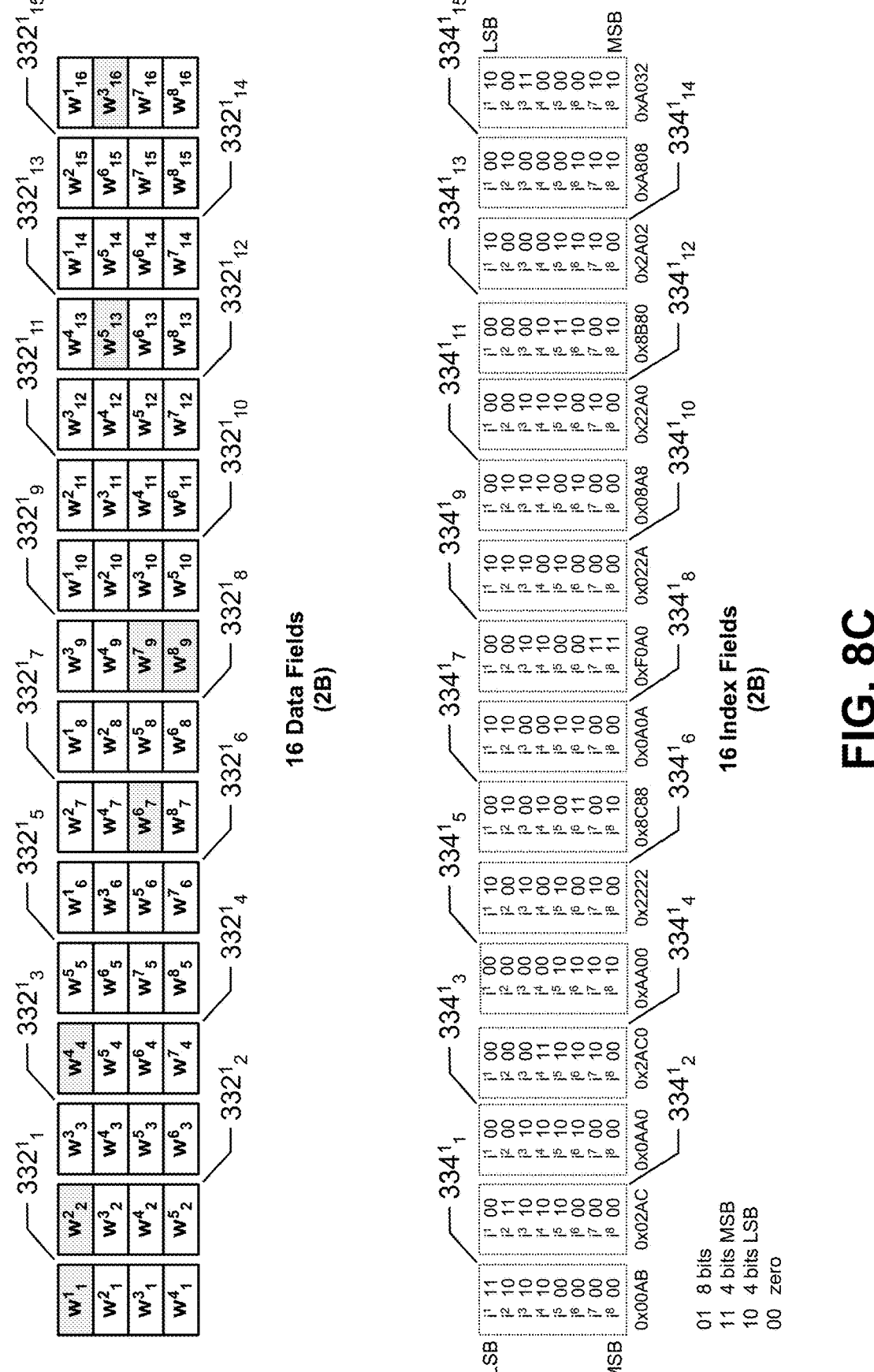

As depicted in FIG. 8C, the non-zero encoded weights of each basic block matrix $312^1_j$ have been formed into respective data fields $332^1_j$, and the associated index fields $334^1_j$ have been created. Each index field $334^1_j$ includes eight, 2-bit index values associated with the eight weights of the respective basic block matrix $312^1_j$, i.e., $i^1$, $i^2$, $i^3$, $i^4$, $i^5$, $i^6$, $i^7$ and $i^8$. Index $i^1$ is located in the LSB position, while index $i^8$ is located in the MSB position.

Data field $332^1_1$ includes weights $w^1_1$, $w^2_1$, $w^3_1$ and $w^4_1$ with non-zero values (weights $w^5_1$, $w^6_1$, $w^7_1$ and $w^8_1$ have zero values). Weight $w^1_1$ has an associated index $i^1$ of "11" within index field $334^1_1$, weight $w^2_1$ has an associated index $i^2$ of "10" within index field $334^1_1$, weight $w^3_1$ has an associated index $i^3$ of "10" within index field $334^1_1$, and weight $w^4_1$ has an associated index $i^4$ of "10" within index field $334^1_1$. Weights $w^5_1$, $w^6_1$, $w^7_1$ and $w^8_1$ have associated indices $i^5$, $i^6$, $i^7$ and $i^8$ (respectively) of "00" within index field $334^1_1$. The hexadecimal value for index field $334^1_1$ is 0x00AB.

Data field $332^1_2$ includes weights $w^2_2$, $w^3_2$, $w^4_2$ and $w^5_2$ (weights $w^1_2$, $w^6_2$, $w^7_2$ and $w^8_2$ have zero values). Weight $w^2_2$ has an associated index $i^2$ of "11" within index field $334^1_2$, weight $w^3_2$ has an associated index $i^3$ of "10" within index field $334^1_2$, weight $w^4_2$ has an associated index $i^4$ of "10" within index field $334^1_2$, and weight $w^5_2$ has an associated index $i^5$ of "10" within index field $334^1_2$. Weights $w^1_2$, $w^6_2$, $w^7_2$ and $w^8_2$ have associated indices $i^1$, $i^6$, $i^7$ and $i^8$ (respectively) of "00" within index field $334^1_2$. The hexadecimal value for index field $334^1_2$ is 0x02AC.

Data field $332^1_3$ includes weights $w^3_3$, $w^4_3$, $w^5_3$ and $w^6_3$ (weights $w^1_3$, $w^2_3$, $w^7_3$ and $w^8_3$ have zero values). Weight $w^3_3$ has an associated index $i^3$ of "10" within index field $334^1_3$, weight $w^4_3$ has an associated index $i^4$ of "10" within index field $334^1_3$, weight $w^5_3$ has an associated index $i^5$ of "10" within index field $334^1_3$, and weight $w^6_3$ has an associated index $i^6$ of "10" within index field $334^1_3$. Weights $w^1_3$, $w^2_3$, $w^7_3$ and $w^8_3$ have associated indices $i^1$, $i^2$, $i^7$ and $i^8$ (respectively) of "00" within index field $334^1_3$. The hexadecimal value for index field $334^1_3$ is 0x0AA0.

Data field $332^1_4$ includes weights $w^4_4$, $w^5_4$, $w^6_4$ and $w^7_4$ (weights $w^1_4$, $w^2_4$, $w^3_4$ and $w^8_4$ have zero values). Weight $w^4_4$ has an associated index $i^4$ of "11" within index field $334^1_4$, weight $w^5_4$ has an associated index $i^5$ of "10" within index field $334^1_4$, weight $w^6_4$ has an associated index $i^6$ of "10" within index field $334^1_4$, and weight $w^7_4$ has an associated index $i^7$ of "10" within index field $334^1_4$. Weights $w^1_4$, $w^2_4$, $w^3_4$ and $w^8_4$ have associated indices $i^1$, $i^2$, $i^3$ and $i^8$ (respectively) of "00" within index field $334^1_4$. The hexadecimal value for index field $334^1_4$ is 0x2AC0.

Data field $332^1_5$ includes weights $w^5_5$, $w^6_5$, $w^7_5$ and $w^8_5$ (weights $w^1_5$, $w^2_5$, $w^3_5$ and $w^4_5$ have zero values). Weight $w^5_5$ has an associated index $i^5$ of "10" within index field $334^1_5$, weight $w^6_5$ has an associated index $i^6$ of "10" within index field $334^1_5$, weight $w^7_5$ has an associated index $i^7$ of "10" within index field $334^1_5$, and weight $w^8_5$ has an associated index $i^8$ of "10" within index field $334^1_5$. Weights $w^1_5$, $w^2_5$, $w^3_5$ and $w^4_5$ have associated indices $i^1$, $i^2$, $i^3$ and $i^4$ (respectively) of "00" within index field $334^1_5$. The hexadecimal value for index field $334^1_5$ is 0xAA00.

Data field $332^1_6$ includes weights $w^1_6$, $w^3_6$, $w^5_6$ and $w^7_6$ (weights $w^2_6$, $w^4_6$, $w^6_6$ and $w^8_6$ have zero values). Weight $w^1_6$ has an associated index $i^1$ of "10" within index field $334^1_6$, weight $w^3_6$ has an associated index $i^3$ of "10" within index field $334^1_6$, weight $w^5_6$ has an associated index $i^5$ of "10" within index field $334^1_6$, and weight $w^7_6$ has an associated index $i^7$ of "10" within index field $334^1_6$. Weights $w^2_6$, $w^4_6$, $w^6_6$ and $w^8_6$ have associated indices $i^2$, $i^4$, $i^6$ and $i^8$ (respectively) of "00" within index field $334^1_6$. The hexadecimal value for index field $334^1_6$ is 0x2222.

Data field $332^1_7$ includes weights $w^2_7$, $w^4_7$, $w^6_7$ and $w^8_7$ (weights $w^1_7$, $w^3_7$ $w^5_7$ and $w^7_7$ have zero values). Weight $w^2_7$ has an associated index $i^2$ of "10" within index field $334^1_7$, weight $w^4_7$ has an associated index $i^4$ of "10" within index field $334^1_7$, weight $w^6_7$ has an associated index $i^6$ of "11" within index field $334^1_7$, and weight $w^8_7$ has an associated index $i^8$ of "10" within index field $334^1_7$. Weights $w^1_7$, $w^3_7$, $w^5_7$ and $w^7_7$ have associated indices $i^1$, $i^3$, $i^5$ and $i^7$ (respectively) of "00" within index field $334^1_7$. The hexadecimal value for index field $334^1_7$ is 0x8C88.

Data field $332^1_8$ includes weights $w^1_8$, $w^2_8$, $w^5_8$ and $w^6_8$ (weights $w^3_8$, $w^4_8$, $w^1_8$ and $w^8_8$ have zero values). Weight $w^1_8$ has an associated index $i^1$ of "10" within index field $334^1_8$, weight $w^2_8$ has an associated index $i^2$ of "10" within index field $334^1_8$, weight $w^5_8$ has an associated index $i^5$ of "10" within index field $334^1_8$, and weight $w^6_8$ has an associated index $i^6$ of "10" within index field $334^1_8$. Weights $w^3_8$, $w^4_8$, $w^7_8$ and was have associated indices $i^3$, $i^4$, $i^7$ and $i^8$ (respectively) of "00" within index field $334^1_8$. The hexadecimal value for index field $334^1_8$ is 0x0A0A.

Data field $332^1_9$ includes weights $w^3_9$, $w^4_9$, $w^7_9$ and $w^8_9$ with non-zero values (weights $w^1_9$, $w^2_9$, $w^5_9$ and $w^6_9$ have zero values). Weight $w^3_9$ has an associated index $i^3$ of "10" within index field $334^1_9$, weight $w^4_9$ has an associated index $i^4$ of "10" within index field $334^1_9$, weight $w^7_9$ has an associated index $i^7$ of "11" within index field $334^1_9$, and weight $w^8_9$ has an associated index is of "11" within index field $334^1_9$. Weights $w^1_9$, $w^2_9$, $w^5_9$ and $w^6_9$ have associated indices $i^1$, $i^2$, i and $i^6$ (respectively) of "00" within index field $334^1_9$. The hexadecimal value for index field $334^1_9$ is 0xF0A0.

Data field $332^1_{10}$ includes weights $w^1_{10}$, $w^2_{10}$, $w^3_{10}$ and $w^5_{10}$ with non-zero values (weights $w^4_{10}$, $w^6_{10}$, $w^7_{10}$ and $w^8_{10}$ have zero values). Weight $w^1_{10}$ has an associated index $i^1$ of "10" within index field $334^1_{10}$, weight $w^2_{10}$ has an associated index $i^2$ of "10" within index field $334^1_{10}$, weight $w^3_{10}$ has an associated index $i^3$ of "10" within index field $334^1_{10}$, and weight $w^5_{10}$ has an associated index $i^5$ of "10" within index field $334^1_{10}$. Weights $w^4_{10}$, $w^6_{10}$, $w^7_{10}$ and $w^8_{10}$ have associated indices $i^4$, $i^6$, $i^7$ and $i^8$ (respectively) of "00" within index field $334^1_{10}$. The hexadecimal value for index field $334^1_{10}$ is 0x022A.

Data field $332^1_{11}$ includes weights $w^2_{11}$, $w^3_{11}$, $w^4_{11}$ and $w^6_{11}$ with non-zero values (weights $w^1_{11}$, $w^5_{11}$, $w^7_{11}$ and $w^8_{11}$ have zero values). Weight $w^2_{11}$ has an associated index $i^2$ of "10" within index field $334^1_{11}$, weight $w^3_{11}$ has an associated index $i^3$ of "10" within index field $334^1_{11}$, weight $w^4_{11}$ has an associated index $i^4$ of "10" within index field $334^1_{11}$, and weight $w^6_{11}$ has an associated index $i^6$ of "10" within index field $334^1_{11}$. Weights $w^1_{11}$, $w^5_{11}$, $w^7_{11}$ and $w^8_{11}$ have associated indices $i^1$, $i^5$, $i^7$ and $i^8$ (respectively) of "00" within index field $334^1_{11}$. The hexadecimal value for index field $334^1_{11}$ is 0x08A8.

Data field $332^1_{12}$ includes weights $w^3_{12}$, $w^4_{12}$, $w^5_{12}$ and $w^7_{12}$ with non-zero values (weights $w^1_{12}$, $w^2_{12}$, $w^6_{12}$ and $w^8_{12}$ have zero values). Weight $w^3_{12}$ has an associated index $i^3$ of "10" within index field $334^1_{12}$, weight $w^4_{12}$ has an associated index $i^4$ of "10" within index field $334^1_{12}$, weight $w^5_{12}$ has an associated index $i^5$ of "10" within index field $334^1_{12}$, and weight $w^7_{12}$ has an associated index $i^7$ of "10" within index field $334^1_{12}$. Weights $w^1_{12}$, $w^2_{12}$, $w^6_{12}$ and $w^8_{12}$ have associated indices $i^1$, $i^2$, $i^6$ and $i^8$ (respectively) of "00" within index field $334^1_{12}$. The hexadecimal value for index field $334^1_{12}$ is 0x22A0.

Data field $332^1_{13}$ includes weights $w^4_{13}$, $w^5_{13}$, $w^6_{13}$ and $w^8_{13}$ with non-zero values (weights $w^1_{13}$, $w^2_{13}$, $w^3_{13}$ and $w^7_{13}$ have zero values). Weight $w^4_{13}$ has an associated index $i^4$ of "10" within index field $334^1_{13}$, weight $w^5_{13}$ has an associated index $i^5$ of "11" within index field $334^1_{13}$, weight $w^6_{13}$ has an associated index $i^6$ of "10" within index field $334^1_{13}$, and weight $w^8_{13}$ has an associated index $i^8$ of "10" within index field $334^1_{13}$. Weights $w^1_{13}$, $w^2_{13}$, $w^3_{13}$ and $w^7_{13}$ have associated indices $i^1$, $i^2$, $i^3$ and $i^7$ (respectively) of "00" within index field $334^1_{13}$. The hexadecimal value for index field $334^1_{13}$ is 0x8B80.

Data field $332^1_{14}$ includes weights $w^1_{14}$, $w^5_{14}$, $w^6_{14}$ and $w^7_{14}$ with non-zero values (weights $w^2_{14}$, $w^3_{14}$, $w^4_{14}$ and $w^8_{14}$ have zero values). Weight $w^1_{14}$ has an associated index $i^1$ of "10" within index field $334^1_{14}$, weight $w^5_{14}$ has an associated index $i^5$ of "10" within index field $334^1_{14}$, weight $w^6_{14}$ has an associated index $i^6$ of "10" within index field $334^1_{14}$, and weight $w^7_{14}$ has an associated index $i^7$ of "10" within index field $334^1_{14}$. Weights $w^2_{14}$, $w^3_{14}$, $w^4_{14}$ and $w^8_{14}$ have associated indices $i^2$, $i^3$, $i^4$ and $i^8$ (respectively) of "00" within index field $334^1_{14}$. The hexadecimal value for index field $334^1_{14}$ is 0x2A02.

Data field $332^1_{15}$ includes weights $w^2_{15}$, $w^6_{15}$, $w^7_{15}$ and $w^8_{15}$ with non-zero values (weights $w^1_{15}$, $w^3_{15}$, $w^4_{15}$ and $w^5_{151}$ have zero values). Weight $w^2_{15}$ has an associated index $i^2$ of "10" within index field $334^1_{15}$, weight $w^6_{15}$ has an associated index $i^6$ of "10" within index field $334^1_{15}$, weight $w^7_{15}$ has an associated index $i^7$ of "10" within index field $334^1_{15}$, and weight $w^8_{15}$ has an associated index $i^8$ of "10" within index field $334^1_{15}$. Weights $w^1_{15}$, $w^3_{15}$, $w^4_{15}$ and $w^5_{15}$ have associated indices $i^1$, $i^3$, $i^4$ and $i^5$ (respectively) of "00" within index field $334^1_{15}$. The hexadecimal value for index field $334^1_{15}$ is 0xA808.

Data field $332^1_{16}$ includes weights $w^1_{16}$, $w^3_{16}$, $w^7_{16}$ and $w^8_{16}$ with non-zero values (weights $w^2_{16}$, $w^4_{16}$, $w^5_{16}$ and $w^6_{16}$ have zero values). Weight $w^1_{16}$ has an associated index $i^1$ of "10" within index field $334^1_{16}$, weight $w^3_{16}$ has an associated index $i^3$ of "11" within index field $334^1_{16}$, weight $w^7_{16}$ has an associated index $i^7$ of "10" within index field $334^1_{16}$, and weight $w^8_{16}$ has an associated index $i^8$ of "10" within index field $334^1_{16}$. Weights $w^2_{16}$, $w^4_{16}$, $w^5_{16}$ and $w^6_{16}$ have associated indices $i^2$, $i^4$, $i^5$ and $i^6$ (respectively) of "00" within index field $334^1_{16}$. The hexadecimal value for index field $334^1_{16}$ is 0xA032.

Figure 8D:
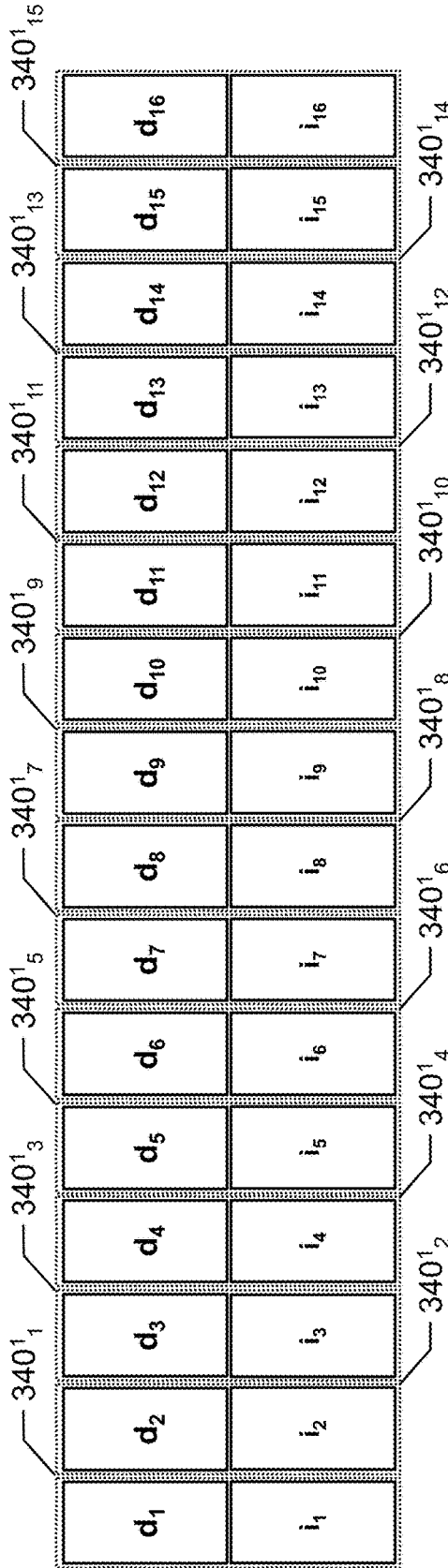
Figure 8D:

FIG. 8D depicts encoded block set $340^1$, which includes encoded blocks $340^1_1$, $340^1_2$, $340^1_3$, $340^1_4$, $340^1_5$, $340^1_6$, $340^1_7$, $340^1_8$, $340^1_9$, $340^1_{10}$, $340^1_{11}$, $340^1_{12}$, $340^1_{13}$, $340^1_{14}$, $340^1_{15}$ and $340^1_{16}$. Each encoded block $340^1_j$ includes data field $d_j$ and index field $i_j$.

More particularly, encoded block $340^1_1$ includes data field $d_1$ (i.e., data field $332^1_1$) and index field $i_1$ (i.e., index field $334^1_1$), and encoded block $340^1_2$ includes data field $d_2$ (i.e., data field $332^1_2$) and index field $i_2$ (i.e., index field $334^1_2$), encoded block $340^1_3$ includes data field $d_3$ (i.e., data field $332^1_3$) and index field $i_3$ (i.e., index field $334^1_3$), encoded block $340^1_4$ includes data field $d_4$ (i.e., data field $332^1_4$) and index field $i_4$ (i.e., index field $334^1_4$), encoded block $340^1_5$ includes data field $d_5$ (i.e., data field $332^1_5$) and index field $i_5$ (i.e., index field $334^1$), encoded block $340^1_6$ includes data field $d_6$ (i.e., data field $332^1_6$) and index field $i_6$ (i.e., index field $334^1_6$), encoded block $340^1_7$ includes data field $d_7$ (i.e., data field $332^1_7$) and index field $i_7$ (i.e., index field $334^1_7$), encoded block $340^1_8$ includes data field $d_8$ (i.e., data field $332^1_8$) and index field is (i.e., index field $334^1_8$), encoded block $340^1_9$ includes data field $d_9$ (i.e., data field $332^1_9$) and index field $i_9$ (i.e., index field $334^1_9$), encoded block $340^1_{10}$ includes data field $d_{10}$ (i.e., data field $332^1_{10}$) and index field $i_{10}$ (i.e., index field $334^1_{10}$), encoded block $340^1_{11}$ includes data field $d_{11}$ (i.e., data field $332^1_{11}$) and index field $i_{11}$ (i.e., index field $334^1_{11}$), encoded block $340^1_{12}$ includes data field $d_{12}$ (i.e., data field $332^1_{12}$) and index field $i_{12}$ (i.e., index field $334^1_{12}$), encoded block $340^1_{13}$ includes data field $d_{13}$ (i.e., data field $332^1_{13}$) and index field $i_{13}$ (i.e., index field $334^1_{13}$), encoded block $340^1_{14}$ includes data field $d_{14}$ (i.e., data field $332^1_{14}$) and index field $i_{14}$ (i.e., index field $334^1_{14}$), encoded block $340^1_{15}$ includes data field $d_{15}$ (i.e., data field $332^1_{15}$) and index field $i_{15}$ (i.e., index field $334^1_{15}$), encoded block $340^1_{16}$ includes data field $d_{16}$ (i.e., data field $332^1_{16}$) and index field $i_{16}$ (i.e., index field $334^1_{16}$).

Basic block matrix sets $312^2$ and $312^3$ are processed in the same manner.

Figure 9:
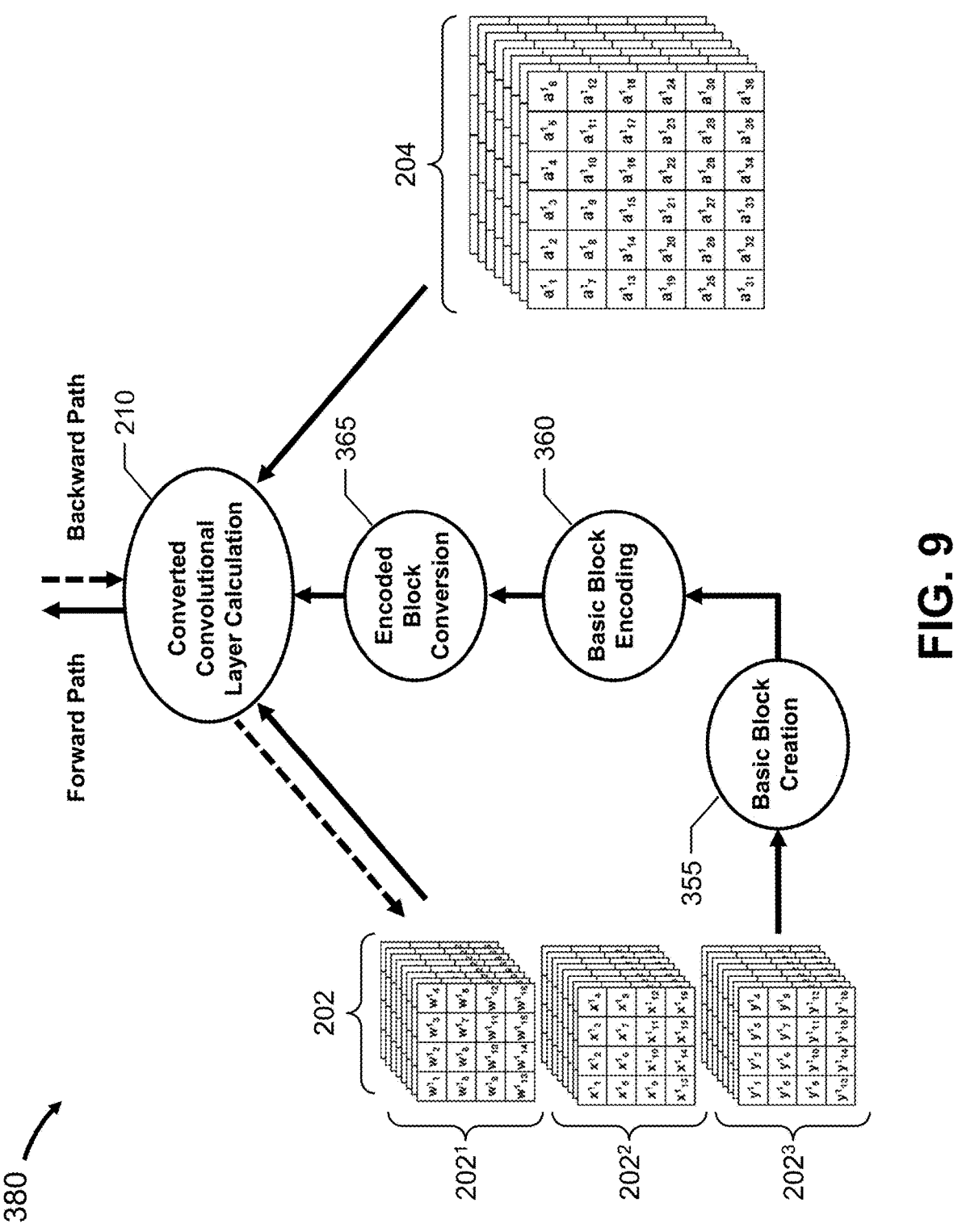
FIG. 9 depicts a data flow diagram for a portion of a training process for a CNN, according to embodiments of the present disclosure.

FIG. 9 depicts a data flow diagram 380 for a portion of a training process for CNN 15, according to an embodiment of the present disclosure.

In order to encode weight tensors $202^1$, $202^2$ and $202^3$ of filter 202 for inference, CNN 15 is first trained using basic block creation process 355, basic block encoding process 360 and encoded block conversion process 365 in the forward path of the convolutional layer calculations. For example, data flow diagram 380 depicts a portion of the training process for CNN 15 that includes converted convolutional layer calculation 210.

During training, basic block creation process 355, basic block encoding process 360 and encoded block conversion process 365 may be implemented by the processor that is hosting the training process for CNN 15, such as, for example, a central processing unit (CPU), graphics processing unit (GPU), neural processing unit (NPU), etc.

During this portion of the forward phase, input data tensor 204 is provided to converted convolutional layer calculation 210. Generally, filter 202, including weight tensors $202^i$, is provided to basic block creation process 355, which decomposes each weight tensor $202^i$ into a basic block set $302^i$ and then reforms each basic block set $302^i$ into a basic block matrix set $312^i$, as described above. Each basic block matrix set $312^i$ is then provided to basic block encoding process 360, which encodes each basic block matrix set $312^i$ into an encoded block set $340^i$ that includes encoded blocks $340^i_j$, as described above. Each encoded block set $340^i$ is then provided to encoded block conversion process 365 which converts the encoded block set $340^i$ into a reconstructed weight tensor $202^i$ by simply performing the steps described above in reverse order.

The reconstructed weight tensors $202^i$ are then provided to converted convolutional layer calculation 210, which convolves the reconstructed weight tensors $202^i$ and the input data tensor 204 to generate output data tensor 206, which is provided to the next layer of CNN 15. Each reconstructed weight tensor $202^i$ may include weights with different values than the weights of the respective weight tensor $202^i$ due to potential losses introduced by basic block encoding process 360.

During the backward phase, the gradients are backpropagated and weight tensors $202^i$ within filter 202 are updated. FIG. 9 depicts the embodiment described in detail above, in which "i" is equal to 3.

During inference, input data tensor 204 and each encoded block set 340$^i$ are read from memory and provided to an MMA, which performs encoded block conversion process 365 to convert each encoded block set 340$^i$ into a reconstructed weight tensor 202$^i$, and then executes the converted convolutional layer calculation 210. For certain layers of CNN 15, the output data tensor 206 may be further processed by the MMA and then provided as the input data tensor 204 to the next convolution layer. Each encoded block set 340$^i$ for the next convolution layer is read from memory, the MMA performs encoded block conversion process 365 to convert each encoded block set 340$^i$ into a reconstructed weight tensor 202$^i$, and then executes the converted convolutional layer calculation 210 for this layer.

In many embodiments, the weight tensors are sufficiently sparse, or many elements have sufficiently small magnitude values, such that transforming each basic block set into an encoded block set is essentially lossless. The encoding described above is very well suited to ANN weights, because ANN weights often have very sparse data but with an occasional large weight, which is important.

In other embodiments, transforming each basic block set to an encoded block set is lossy, and, to minimize the loss, a simple search or optimization technique may be employed during training to optimally assign the type to each element, such as, for example, a neural architecture search (NAS), a differential NAS (DNAS), Bayesian optimization, etc. In these embodiments, a small extra "fine tuning" training phase after a lossy encoding (typically quantization) may be used to recover any loss in accuracy due to the error introduced.

Figure 10:
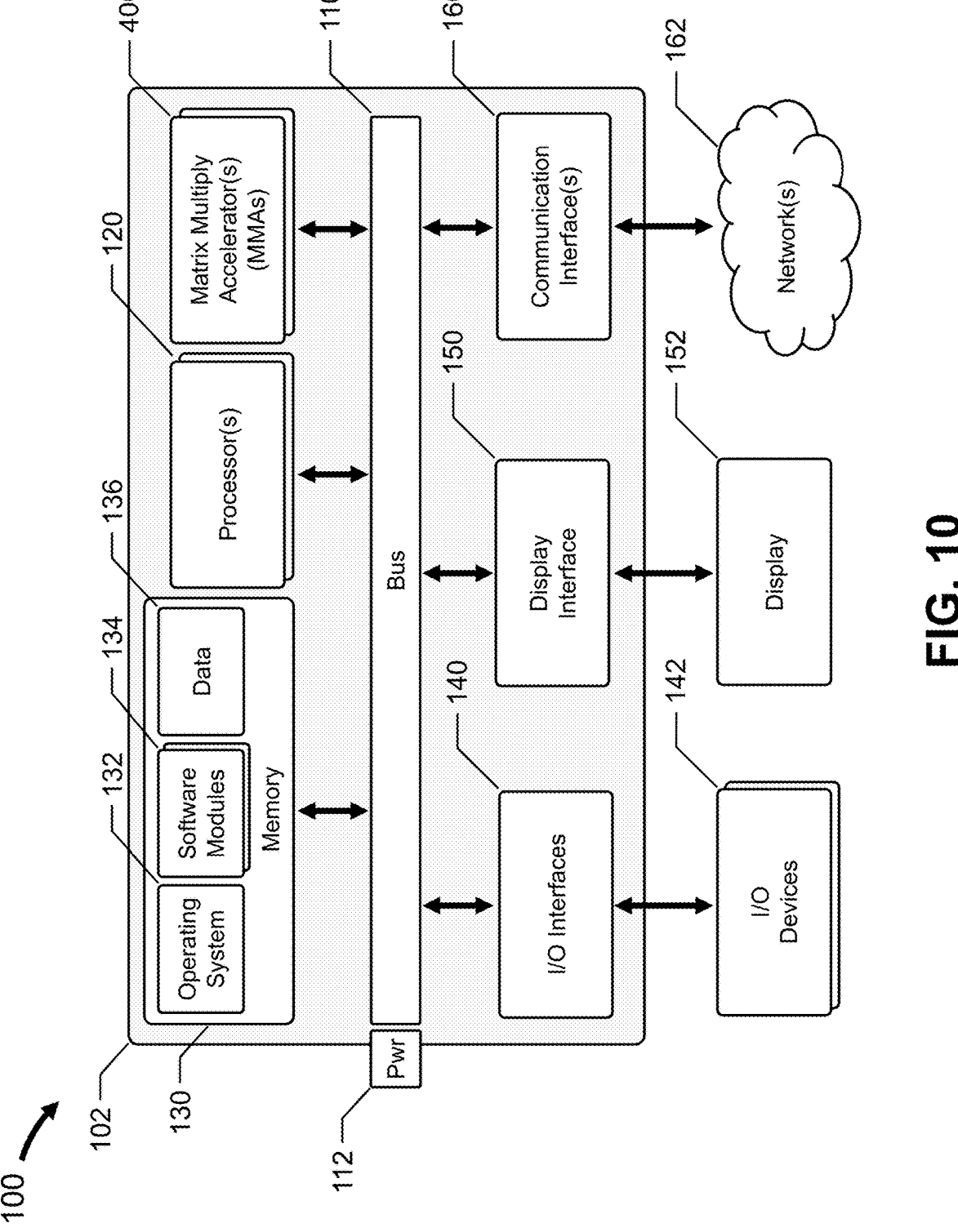
FIG. 10 depicts a block diagram of a system, in accordance with an embodiment of the present disclosure.

FIG. 10 depicts a block diagram of system 100, in accordance with an embodiment of the present disclosure.

Computer 102 includes bus 110 coupled to one or more processors 120, memory 130, I/O interfaces 140, display interface 150, one or more communication interfaces 160 and one or more MMAs 400. Generally, I/O interfaces 140 are coupled to I/O devices 142 using a wired or wireless connection, display interface 150 is coupled to display 152, and communication interface 160 is connected to network 162 using a wired or wireless connection.

Bus 110 is a communication system that transfers data between processor 120, memory 130, I/O interfaces 140, display interface 150, communication interface 160, MMA 400, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 102. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, software modules 134, etc., stored within memory 130. For example, software modules 134 may include an ML application, an ANN application, a CNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 102. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 102 and/or output from computer 102. As discussed above, I/O devices 142 are operably connected to computer 102 using a wired and/or wireless connection. I/O devices 142 may include a local processor coupled to a communication interface that is configured to communicate with computer 102 using the wired and/or wireless connection. For example, I/O devices 142 may include a keyboard, mouse, touch pad, joystick, etc.

Display interface 150 is configured to transmit image data from computer 102 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

MMA 400 is configured to multiply matrices and generate output matrices to support various applications implemented by software modules 134.

Figure 11:
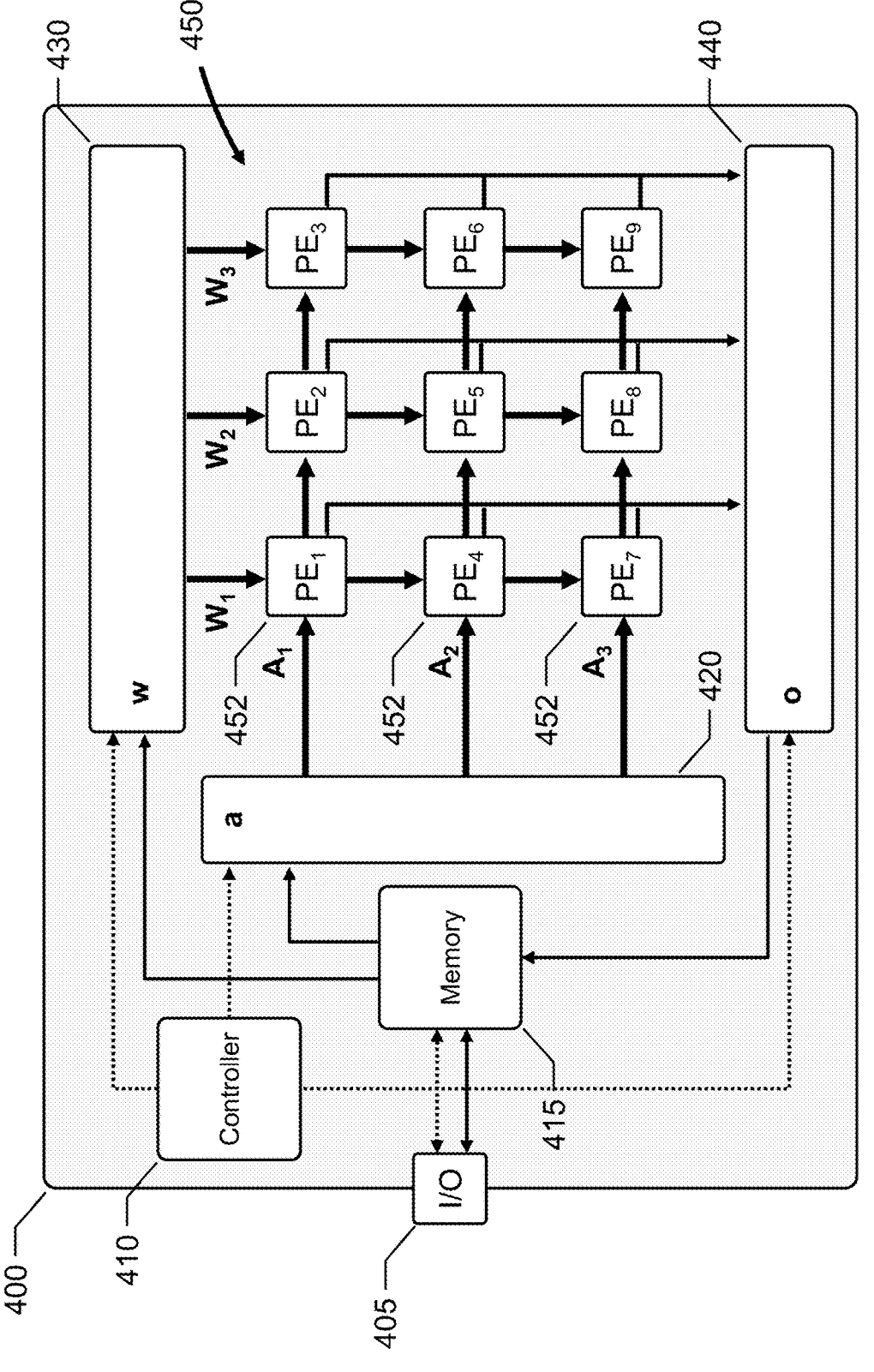
FIG. 11 depicts a block diagram of a matrix multiply accelerator (MMA), in accordance with an embodiment of the present disclosure.

FIG. 11 depicts a block diagram of MMA 400, in accordance with embodiments of the present disclosure.

MMA 400 includes I/O interface 405, controller 410, memory 415, register 420, register 430, register 440 and PE array 450 including a number of PEs 452. Controller 410 is coupled to I/O interface 405, memory 415, registers 420, 430, 440 and PEs 452. Memory 415 is coupled to I/O interface 405 and registers 420, 430, 440. Register 420 is coupled to the first column of PEs 452 of PE array 450, register 430 is coupled to the first row of PEs 452 of PE array 450, and register 430 is coupled to each PE 452 of PE array 450.

I/O interface 405 is coupled to bus 110 and memory 415. I/O interface 405 includes a microcontroller that sends data to, and receives data and commands from, processor 120, memory 130, etc.

Memory 415 may include volatile and/or nonvolatile memory. For example, memory 415 may include any combination of random access memory (RAM), dynamic RAM (DRAM), static RAM (SRAM), read only memory (ROM), flash memory, cache memory, and/or any other type of non-transitory computer-readable medium.

Generally, input data tensors and encoded block sets are received from memory 130, over bus 110 via I/O interface 405, and stored in memory 415, while output data tensors stored in memory 415 and then transmitted, over bus 110 via I/O interface 405, to memory 130.

Controller 410 may be a processor, microprocessor, microcontroller, field programmable gate array (FPGA), etc., that controls the data flow and operation of MMA 400. For example, in response to commands received from one or more software modules 134 executing on processor 120, controller 410 performs load/store (L/S) instructions, memory mapped I/O (MMIO) operations, direct memory access (DMA) operations, etc., to convert each encoded block set into a reconstructed weight tensor, and then convolve each reconstructed weight tensor and an input data tensor to generate an output data matrix, in cooperation with memory 415, registers 420, 430, 440 and PE array 450.

More particularly, controller 410 converts each encoded block set into a reconstructed weight tensor by generating the basic block matrix set based on the encoded block set, and then generating the reconstructed weight tensor based on the basic block matrix set. Controller 410 then convolves each reconstructed weight tensor and the input data tensor to generate the output data matrix by converting the reconstructed weight tensor to a converted weight matrix based on a convolution operation, converting the input data tensor to a converted input data matrix based on the convolution operation, and then multiplying the converted weight matrix and the converted input data matrix to generate the output data matrix.

Register 420 provides activation elements to the PEs 452 in the first column of PE array 450, while register 430 provides weight elements to the first row of PEs 452 of PE array 450. Registers 420 and 430 may be n elements wide and m elements deep, each element being the same size as the data contained within converted output data matrix 216, such as, for example, 8 bit integer data, 16 bit integer data, 32 bit integer data, 16 bit floating point data, 16 bit Bfloat data, 32 bit floating point data, etc. In one embodiment, registers 420 and 430 are 3 elements wide and 128 elements deep, with each element storing 8-bit integer data, and each PE 452 includes an 8-bit MAC unit to comport with the embodiments discussed above.

PE array 450 includes 9 PEs 452 arranged in a 3×3 array (i.e., $PE_1$, $PE_2$, $PE_3$, $PE_4$, $PE_5$, $PE_6$, $PE_7$, $PE_8$ and $PE_9$); other numbers of PEs 452 and arrangements are also contemplated, such as, for example, four PEs 452 arranged in a 2×2 array, nine PEs 452 arranged in a 3×3 array, 25 PEs 452 arranged in a 5×5 array, 36 PEs 452 arranged in a 6×6 array, 49 PEs 452 arranged in a 7×7 array, 64 PEs 452 arranged in a 8×8 array, etc. Non-symmetric arrangements, such as a 2×3 array, a 3×4 array, a 4×5 array, a 4×6 array, etc., may be advantageous for certain applications. Each PE 452 calculates a dot product for one element of converted output data matrix 216.

For example, $PE_1$ 452 is located in the first row and the first column of PE array 450, and calculates the dot products of the $1^{st}$ row of converted weight matrix 212 (i.e., $W_1$) and the $1^{st}$, $4^{th}$ and $7^{th}$ columns of converted input data matrix 214 (i.e., $A_1$) to generate the $o^1_1$, $o^1_4$, and $o^1_7$ elements of converted output data matrix $216^1$, as discussed above with respect to MAC unit $m_1$.

$PE_2$ 452 is located in the first row and the second column of PE array 450, and calculates the dot products of the $2^{nd}$ row of converted weight matrix 212 (i.e., $W_2$) and the $1^{st}$, $4^{th}$ and $7^{th}$ columns of converted input data matrix 214 (i.e., $A_1$) to generate the $o^2_1$, $o^2_4$, and $o^2_7$ elements of converted output data matrix $216^2$, as discussed above with respect to MAC unit $m_2$.

$PE_3$ 452 is located in the first row and the third column of PE array 450, and calculates the dot products of the $3^{rd}$ row of converted weight matrix 212 (i.e., $W_3$) and the $1^{st}$, $4^{th}$ and $7^{th}$ columns of converted input data matrix 214 (i.e., $A_1$) to generate the $o^3_1$, $o^3_4$, and $o^3_7$ elements of converted output data matrix $216^3$, as discussed above with respect to MAC unit $m_3$.

$PE_4$ 452 is located in the second row and the first column of PE array 450, and calculates the dot products of the $1^{st}$ row of converted weight matrix 212 (i.e., $W_1$) and the $2^{nd}$, $5^{th}$ and $8^{th}$ columns of converted input data matrix 214 (i.e., $A_2$) to generate the $o^1_2$, $o^1_5$, and $o^1_8$ elements of converted output data matrix $216^1$, as discussed above with respect to MAC unit $m_4$.

$PE_5$ 452 is located in the second row and the second column of PE array 450, and calculates the dot products of the $2^{nd}$ row of converted weight matrix 212 (i.e., $W_2$) and the $2^{nd}$, $5^{th}$ and $8^{th}$ columns of converted input data matrix 214 (i.e., $A_2$) to generate the $o^2_2$, $o^2_5$, and $o^2_8$ elements of converted output data matrix $216^2$, as discussed above with respect to MAC unit $m_5$.

$PE_6$ 452 is located in the second row and the third column of PE array 450, and calculates the dot products of the $3^{rd}$ row of converted weight matrix 212 (i.e., $W_3$) and the $2^{nd}$, $5^{th}$ and $8^{th}$ columns of converted input data matrix 214 (i.e., $A_2$) to generate the $o^3_2$, $o^3_5$, and $o^3_8$ elements of converted output data matrix $216^3$, as discussed above with respect to MAC unit $m_6$.

$PE_7$ 452 is located in the third row and the first column of PE array 450, and calculates the dot products of the $1^{st}$ row of converted weight matrix 212 (i.e., $W_1$) and the $3^{rd}$, $6^{th}$ and $9^{th}$ columns of converted input data matrix 214 (i.e., $A_3$) to generate the $o^1_3$, $o^1_6$, and $o^1_9$ elements of converted output data matrix $216^1$, as discussed above with respect to MAC unit $m_7$.

$PE_8$ 452 is located in the third row and the second column of PE array 450, and calculates the dot products of the $2^{nd}$ row of converted weight matrix 212 (i.e., $W_2$) and the $3^{rd}$, $6^{th}$ and $9^{th}$ columns of converted input data matrix 214 (i.e., $A_3$) to generate the $o^2_3$, $o^2_6$, and $o^2_9$ elements of converted output data matrix $216^2$, as discussed above with respect to MAC unit me.

$PE_9$ 452 is located in the third row and the third column of PE array 450, and calculates the dot products of the $3^{rd}$ row of converted weight matrix 212 (i.e., $W_3$) and the $3^{rd}$, $6^{th}$ and $9^{th}$ columns of converted input data matrix 214 (i.e., $A_3$) to generate the $o^3$, $o^3_6$, and $o^3_9$ elements of converted output data matrix $216^3$, as discussed above with respect to MAC unit $m_7$.

$PE_9$ 452 is located in the third row and the third column of PE array 450, and calculates the dot products of the $3^{rd}$ row of converted weight matrix 212 (i.e., $W_3$) and the $3^{rd}$, $6^{th}$ and $9^{th}$ columns of converted input data matrix 214 (i.e., $A_3$) to generate the $o_3^3$, $o^3_6$, and $o^3_9$ elements of converted output data matrix $216^3$, as discussed above with respect to MAC unit $m_9$.

The embodiments described herein are combinable.

In one embodiment, a system includes a memory, a processor coupled to the memory and a matrix multiply accelerator (MMA) coupled to the processor and the memory. The memory is configured to store one or more weight tensors, each weight tensor including a number of weights. The processor is configured, for each weight tensor, to generate, based on the weight tensor, a basic block matrix set including a number of basic block matrices, each basic block matrix including a number of weights; to generate, based on the basic block matrix set, an encoded block set, the encoded block set including a number of encoded blocks, each encoded block including a data field and an index field, the data field including a number of encoded weights, the index field including an index associated with each weight in the basic block matrix, the number of encoded weights being less than the number of weights in the basic block matrix, each encoded block having a same size; and to store the encoded block set in the memory. The MMA is configured to convert each encoded block set into a reconstructed weight tensor having a number of weights equal to the number of weights of the respective weight tensor, and convolve each reconstructed weight tensor and an input data tensor to generate an output data matrix.

In another embodiment of the system, each weight tensor has a height, a width and a depth equal to a number of input channels; each basic block matrix has a width of 1 and a height equal to the number of input channels; and each basic block matrix includes one weight from each input channel.

In another embodiment of the system, the index indicates an encoding type of the associated weight, the encoding type including a zero magnitude type, a small magnitude type and a large magnitude type.

In another embodiment of the system, each weight tensor includes n-bit integer elements; the zero magnitude type is an $n/2$-bit integer element; the small magnitude type is an $n/2$-bit integer element; and the large magnitude type is an $n/2$-bit integer element.

In another embodiment of the system, the encoding type includes a full magnitude weight type that is an n-bit integer element.

In another embodiment of the system, generate the encoded block set includes, for each weight in the basic block matrix, determine an encoding type for the weight; generate an index for the weight based on the encoding type; generate an encoded weight based on the encoding type and the weight; add the index to the index field of the encoded block; and, when the encoding type is not a zero magnitude weight type, add the encoded weight to the data field of the encoded block In another embodiment of the system, determine an encoding type for the weight is based on a lower threshold value and an upper threshold value.

In another embodiment of the system, determine an encoding type for the weight includes select the zero magnitude weight type when the weight has a zero value or the weight has a non-zero value that is less than or equal to the lower threshold value; select the small magnitude weight type when the weight has a non-zero value that is greater than the lower threshold value and less than or equal to the upper threshold value; and select the large magnitude weight type when the weight has a non-zero value that is greater than the upper threshold value.

In another embodiment of the system, each weight in the reconstructed weight tensor has a corresponding weight in the respective weight tensor that has a same value; convert each encoded block set into a reconstructed weight tensor includes generate, based on the encoded block set, the basic block matrix set, and generate, based on the basic block matrix set, the reconstructed weight tensor; convolve each reconstructed weight tensor and an input data tensor includes convert the reconstructed weight tensor, based on a convolution operation, to a converted weight matrix, convert the input data tensor, based on the convolution operation, to a converted input data matrix, and multiply the converted weight matrix and the converted input data matrix to generate the output data matrix.

In another embodiment of the system, the MMA includes a memory; a controller configured to convert the reconstructed weight tensor to the converted weight matrix, and convert the input data tensor to the converted input data matrix; a first register configured to store at least a portion of the converted input data matrix; a second register configured to store at least a portion of the converted weight matrix; a third register configured to store at least a portion of the output data matrix; and an array of processing elements (PEs), coupled to the controller and the first, second and third registers, configured to multiply the converted weight matrix and the converted input data matrix, each PE including a multiply-and-accumulate (MAC) circuit configured to generate a dot product between one row of the converted weight matrix and one column of the converted input data matrix.

In one embodiment, a computer-based method includes, at a processor coupled to a memory storing one or more weight tensors, for each weight tensor, generating, based on the weight tensor, a basic block matrix set including a number of basic block matrices, each basic block matrix including a number of weights; generating, based on the basic block matrix set, an encoded block set, the encoded block set including a number of encoded blocks, each encoded block including a data field and an index field, the data field including a number of encoded weights, the index field including an index associated with each weight in the basic block matrix, the number of encoded weights being less than the number of weights in the basic block matrix, each encoded block having a same size; and storing the encoded block set in the memory. The method also includes, at a matrix multiply accelerator (MMA) coupled to the processor and the memory, converting each encoded block set into a reconstructed weight tensor having a number of weights equal to the number of weights of the respective weight tensor; and convolving each reconstructed weight tensor and an input data tensor to generate an output data matrix.

In another embodiment of the method, each weight tensor has a height, a width and a depth equal to a number of input channels; each basic block matrix has a width of 1 and a height equal to the number of input channels; and each basic block matrix includes one weight from each input channel.

In another embodiment of the method, the index indicates an encoding type of the associated weight, the encoding type including a zero magnitude type, a small magnitude type and a large magnitude type.

In another embodiment of the method, each weight tensor includes n-bit integer elements; the zero magnitude type is an $n/2$-bit integer element; the small magnitude type is an $n/2$-bit integer element; and the large magnitude type is an $n/2$-bit integer element.

In another embodiment of the method, the encoding type includes a full magnitude weight type that is an n-bit integer element.

In another embodiment of the method, generating the encoded block set includes, for each weight in the basic block matrix, determining an encoding type for the weight; generating an index for the weight based on the encoding type; generating an encoded weight based on the encoding type and the weight; adding the index to the index field of the encoded block; and when the encoding type is not a zero magnitude weight type, adding the encoded weight to the data field of the encoded block.

In another embodiment of the method, determining an encoding type for the weight is based on a lower threshold value and an upper threshold value.

In another embodiment of the method, determining an encoding type for the weight includes selecting the zero magnitude weight type when the weight has a zero value or the weight has a non-zero value that is less than or equal to the lower threshold value; selecting the small magnitude weight type when the weight has a non-zero value that is greater than the lower threshold value and less than or equal to the upper threshold value; and selecting the large magnitude weight type when the weight has a non-zero value that is greater than the upper threshold value.

In another embodiment of the method, each weight in the reconstructed weight tensor has a corresponding weight in the respective weight tensor that has a same value.

In another embodiment of the method, converting each encoded block set into a reconstructed weight tensor includes generating, based on the encoded block set, the basic block matrix set, and generating, based on the basic block matrix set, the reconstructed weight tensor; convolving each reconstructed weight tensor and the input data tensor includes converting the reconstructed weight tensor, based on a convolution operation, to a converted weight matrix, converting the input data tensor, based on the convolution operation, to a converted input data matrix, and multiplying the converted weight matrix and the converted input data matrix to generate the output data matrix.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system, comprising:

a first memory configured to store one or more encoded block sets corresponding to one or more weight tensors, each weight tensor including a number of n-bit integer weights;

a matrix multiply accelerator including a second memory;

a processor, operatively coupled to the first memory and the second memory, the processor configured to:

store an encoded block set from the first memory to the second memory, the encoded block including a data field and an index field, the data field including a number of encoded weights, the index field including an index associated with each of the plurality of n-bit integer weights, where:

the index field includes a plurality of indices, each index indicating an encoding type of an associated weight of the plurality of n-bit integer weights, the encoding type selected from:

a zero magnitude type, indicating a weight with value zero;

a small magnitude type, indicating a weight with zero-valued most significant n/2 bits; and a large magnitude type, indicating a weight with zero-valued least significant n/2 bits; and the data field includes:

the most significant n/2 bits of each weight of the large magnitude encoding type; and the least significant n/2 bits of each weight of the small magnitude encoding type;

where the matrix multiply accelerator (MMA) is configured to:

read, from the second memory, an encoding type of a weight from the index field of an encoded block;

when the encoding type is large magnitude encoding type or the small magnitude encoding type:

read n/2 bits from the data field of the encoded block; and reconstruct an n-bit integer weight from the n/2 bits; and when the encoding type is the zero magnitude encoding type:

reconstruct an n-bit integer weight with value zero.

2. The system according to claim 1, where the processor is further configured to:

for each weight tensor:

generate, based on the weight tensor, a basic block matrix set including a number of basic block matrices, each basic block matrix including a number of weights, generate, based on the basic block matrix set, an encoded block set, the encoded block set including a number of encoded blocks, each encoded block including a data field and an index field, the data field including a number of encoded weights, the index field including an index associated with each weight in the basic block matrix, the number of encoded weights being less than the number of weights in the basic block matrix, each encoded block having a same size, and store the encoded block set in the memory;

and where the matrix multiply accelerator (MMA) is further configured to:

convert each encoded block set into a reconstructed weight tensor having a number of weights equal to the number of weights of the respective weight tensor, and convolve each reconstructed weight tensor and an input data tensor to generate an output data matrix, the MMA further including a controller and an array of processing elements (PEs) coupled to the controller, where the controller of the MMA is configured to:

convert the reconstructed weight tensor to a converted weight matrix, and convert the input data tensor to a converted input data matrix; and the array of PEs of the MMA configured to multiply the converted weight matrix and the converted input data matrix, each PE including a multiply-and-accumulate (MAC) circuit configured to generate a dot product between one row of the converted weight matrix and one column of the converted input data matrix.

3. The system according to claim 2, where:

each weight tensor has a height, a width and a depth equal to a number of input channels;

each basic block matrix has a width of 1 and a height equal to the number of input channels; and each basic block matrix includes one weight from each input channel.

4. The system according to claim 2, where said generate the encoded block set includes:

for each weight in the basic block matrix:

determine an encoding type for the weight;

generate an index for the weight based on the encoding type;

generate an encoded weight based on the encoding type and the weight;

add the index to the index field of the encoded block; and when the encoding type is not a zero magnitude weight type, add the encoded weight to the data field of the encoded block.

5. The system according to claim 4, where:

said determine an encoding type for the weight is based on a lower threshold value and an upper threshold value.

6. The system according to claim 5, where said determine an encoding type for the weight includes:

select the zero magnitude weight type when the weight has a zero value or the weight has a non-zero value that is less than or equal to the lower threshold value;

select the small magnitude weight type when the weight has a non-zero value that is greater than the lower threshold value and less than or equal to the upper threshold value; and select the large magnitude weight type when the weight has a non-zero value that is greater than the upper threshold value.

7. The system according to claim 2, where:

each weight in the reconstructed weight tensor has a corresponding weight in the respective weight tensor that has a same value;

said convert each encoded block set into a reconstructed weight tensor includes:

generate, based on the encoded block set, the basic block matrix set, and generate, based on the basic block matrix set, the reconstructed weight tensor;

said convolve each reconstructed weight tensor and an input data tensor includes:

convert the reconstructed weight tensor, based on a convolution operation, to the converted weight matrix, convert the input data tensor, based on the convolution operation, to the converted input data matrix, and multiply the converted weight matrix and the converted input data matrix to generate the output data matrix.

8. The system according to claim 1, where:

the encoding type includes a full magnitude weight type that is an n-bit integer element.

9. A system comprising:
a memory configured to store one or more weight tensors, each weight tensor including a number of weights;
a processor, coupled to the memory, configured to:
  for each weight tensor:
    generate, based on the weight tensor, a basic block matrix set including a number of basic block matrices, each basic block matrix including a number of weights,
    generate, based on the basic block matrix set, an encoded block set, the encoded block set including a number of encoded blocks, each encoded block including a data field and an index field, the data field including a number of encoded weights, the index field including an index associated with each weight in the basic block matrix, the number of encoded weights being less than the number of weights in the basic block matrix, each encoded block having a same size, and
    store the encoded block set in the memory; and
a matrix multiply accelerator (MMA), coupled to the processor and the memory, configured to:
  convert each encoded block set into a reconstructed weight tensor having a number of weights equal to the number of weights of the respective weight tensor, and
  convolve each reconstructed weight tensor and an input data tensor to generate an output data matrix,
where each weight in the reconstructed weight tensor has a corresponding weight in the respective weight tensor that has a same value;
said convert each encoded block set into a reconstructed weight tensor includes:
  generate, based on the encoded block set, the basic block matrix set, and
  generate, based on the basic block matrix set, the reconstructed weight tensor;
said convolve each reconstructed weight tensor and an input data tensor includes:
  convert the reconstructed weight tensor, based on a convolution operation, to a converted weight matrix,
  convert the input data tensor, based on the convolution operation, to a converted input data matrix, and
  multiply the converted weight matrix and the converted input data matrix to generate the output data matrix,
where the MMA includes:
  a second memory;
  a controller configured to:
    convert the reconstructed weight tensor to the converted weight matrix, and
    convert the input data tensor to the converted input data matrix;
  a first register configured to store at least a portion of the converted input data matrix;
  a second register configured to store at least a portion of the converted weight matrix;
  a third register configured to store at least a portion of the output data matrix; and
  an array of processing elements (PEs), coupled to the controller and the first, second and third registers, configured to multiply the converted weight matrix and the converted input data matrix, each PE including a multiply-and-accumulate (MAC) circuit configured to generate a dot product between one row of the converted weight matrix and one column of the converted input data matrix.

10. A computer-based method, comprising:
at a processor coupled to a first memory storing one or more encoded block sets generated from one or more weight tensors:
  store an encoded block set from the first memory to a second memory of a matrix multiply accelerator (MMA), the encoded block set generated from a weight tensor,
  the encoded block set including a number of encoded blocks, each encoded block including a data field and an index field, the data field including a number of encoded weights, the index field including an index associated with each of a plurality of n-bit weights of the weight tensor, where
  each weight tensor includes n-bit integer elements;
  the index indicates an encoding type of the associated weight, the encoding type including a zero magnitude type, a small magnitude type and a large magnitude type,
  the zero magnitude type is an n/2-bit integer element;
  the small magnitude type is an n/2-bit integer element; and
  the large magnitude type is an n/2-bit integer element;
at the matrix multiply accelerator (MMA):
  reading, from the second memory, an encoding type of a weight from the index field of an encoded block;
  when the encoding type is large magnitude encoding type or the small magnitude encoding type:
    reading n/2 bits from the data field of the encoded block; and
    reconstructing an n-bit integer weight from the n/2 bits; and
  when the encoding type is the zero magnitude encoding type:
    reconstructing an n-bit integer weight with value zero.

11. The computer-based method according to claim 10, further comprising:
for each weight tensor of one or more weight tensors:
  generating, based on the weight tensor, a basic block matrix set including a number of basic block matrices, each basic block matrix including a number of weights; and
  generating the encoded block set based on the basic block matrix set,
where:
  each weight tensor has a height, a width and a depth equal to a number of input channels;
  each basic block matrix has a width of 1 and a height equal to the number of input channels; and
  each basic block matrix includes one weight from each input channel.

12. The computer-based method according to claim 10, further comprising at the MMA:
converting each encoded block set in the second memory into a reconstructed weight tensor having a number of weights equal to the number of weights of the respective weight tensor,
convolving each reconstructed weight tensor and an input data tensor to generate an output data matrix, at a controller of the MMA:
converting the reconstructed weight tensor to the converted weight matrix, and
converting the input data tensor to the converted input data matrix, and at an array of processing elements (PEs) of the MMA:

multiplying the converted weight matrix and the converted input data matrix, with each PE of the array of PEs including a multiply-and-accumulate (MAC) circuit, the MAC circuit of each PE generating a dot product between one row of the converted weight matrix and one column of the converted input data matrix.

13. The computer-based method according to claim 10, where:

the encoding type includes a full magnitude weight type that is an n-bit integer element.

14. The computer-based method according to claim 10, further comprising:

for each weight tensor of one or more weight tensors:

generating, based on the weight tensor, a basic block matrix set including a number of basic block matrices, each basic block matrix including a number of weights; and generating the encoded block set based on the basic block matrix set, where generating an encoded block of the encoded block set includes:

for each weight in the basic block matrix of the basic block matrix set:

determining an encoding type for the weight;

generating an index for the weight based on the encoding type;

generating an encoded weight based on the encoding type and the weight;

adding the index to the index field of the encoded block; and when the encoding type is not a zero magnitude weight type, adding the encoded weight to the data field of the encoded block.

15. The computer-based method according to claim 14, where:

said determining an encoding type for the weight is based on a lower threshold value and an upper threshold value.

16. The computer-based method according to claim 15, where said determining an encoding type for the weight includes:

selecting the zero magnitude weight type when the weight has a zero value or the weight has a non-zero value that is less than or equal to the lower threshold value;

selecting the small magnitude weight type when the weight has a non-zero value that is greater than the lower threshold value and less than or equal to the upper threshold value; and selecting the large magnitude weight type when the weight has a non-zero value that is greater than the upper threshold value.

17. The computer-based method according to claim 16, where:

each weight in the reconstructed weight tensor has a corresponding weight in the respective weight tensor that has a same value.

18. The computer-based method according to claim 16, where:

said converting each encoded block set into a reconstructed weight tensor includes:

generating, based on the encoded block set, the basic block matrix set, and generating, based on the basic block matrix set, the reconstructed weight tensor;

said convolving each reconstructed weight tensor and the input data tensor includes:

converting the reconstructed weight tensor, based on a convolution operation, to a converted weight matrix, converting the input data tensor, based on the convolution operation, to a converted input data matrix, and multiplying the converted weight matrix and the converted input data matrix to generate the output data matrix.

\* \* \* \* \*